(12) United States Patent
Oda et al.

(10) Patent No.: US 6,433,781 B1
(45) Date of Patent: Aug. 13, 2002

(54) ORIENTATION-DETECTING APPARATUS, ORIENTATION-DETECTING METHOD, ORIENTATION-DETECTING SENSOR DEVICE AND ORIENTATION-DESIGNATING DEVICE

(75) Inventors: Yasuo Oda; Masamitsu Ito; Masamitsu Fukushima, all of Saitama (JP)

(73) Assignee: Wacom Co., Ltd. (JP)

( * ) Notice: Subject to any disclaimer, the term of this patent is extended or adjusted under 35 U.S.C. 154(b) by 0 days.

(21) Appl. No.: 09/400,923

(22) Filed: Sep. 21, 1999

(30) Foreign Application Priority Data

Sep. 21, 1998 (JP) ............................................. 10-283553

(51) Int. Cl.$^7$ ................................................. G09G 5/08
(52) U.S. Cl. ........................ 345/167; 345/163; 345/156
(58) Field of Search ................................ 345/156, 157, 345/167, 163

(56) References Cited

U.S. PATENT DOCUMENTS 5,543,711 A * 8/1996 Srinivasan et al. ......... 324/318
5,825,308 A * 10/1998 Rosenberg ................... 341/20
5,853,327 A * 12/1998 Gilboa ......................... 463/39
6,144,370 A * 11/2000 Eleyan et al. ............... 345/167

* cited by examiner

Primary Examiner—Bipin Shalwala
Assistant Examiner—Ricardo Osorio
(74) Attorney, Agent, or Firm—Liniak, Berenato, Longacre & White, LLC

(57) ABSTRACT

An orientation-detecting apparatus has an orientation-designating device which is provided with a plurality of orientation-designating coils whose coil planes face in different directions. Each of the orientation-designating coils forms a resonance circuit having a resonant frequency different from the resonant frequencies of the other resonance circuits. An orientation-detecting sensor includes a plurality of orientation-detecting coils L, M, L', and M' which are radially disposed and are electromagnetically coupled to the orientation-designating coils. The orientation-designating device is placed at the center position O of the orientation-detecting sensor. By transmitting and receiving signals between the orientation-designating coils and the orientation-detecting coils L, M, L', and M', orientations of the orientation-designating device in three-dimensional space are detected as absolute values.

40 Claims, 83 Drawing Sheets

FIG. 23

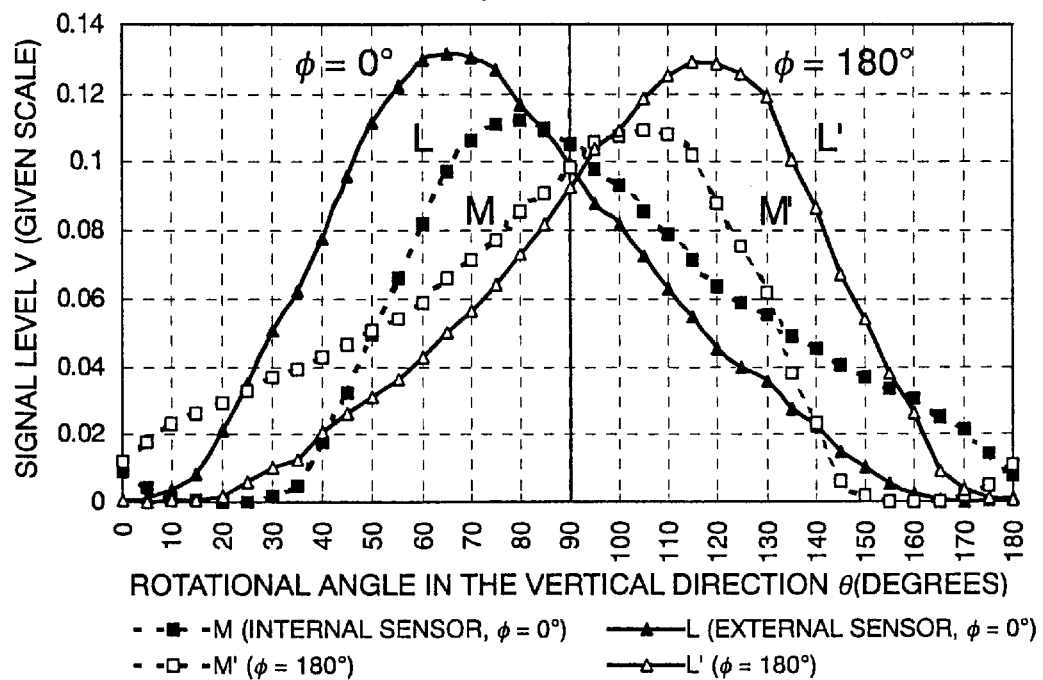

$\theta$ DEPENDENCY OF SIGNAL LEVELS OBTAINED BY INTERNAL SECTOR SENSOR M AND EXTERNAL SECTOR SENSOR L
(47$\phi$-SPHERICAL-SHELL-COVERED COIL THAT IS NOT ECCENTRIC WITH RESPECT TO PLANES PASSING THROUGH THE CENTER OF SPHERE, 375 kHz, $\phi$ = 0° AND 180°, THE BOTTOM OF 70$\phi$-SPHERE IS PLACED 5 mm ABOVE SENSOR)

DEPENDENCY OF SIGNALS RECEIVED BY M AND L SENSORS UPON TILT ANGLE $\theta$ ON THE CONDITION THAT M' AND L' ARE DISPLACED FROM M AND L BY 180°

DEPENDENCY OF THE DIFFERENCE BETWEEN RATIOS M/L AND
M'/L' OF SIGNAL LEVELS OBTAINED BY SENSORS M AND L,
AND ((M + 2L')-(M' + 2L))/((M + 2L') + (M' + 2L))
UPON TILT ANGLE $\theta$ DEPENDENCY OF SIGNAL RECEIVED BY CIRCULAR SENSOR C UPON TILT ANGLE $\theta$ θ DEPENDENCY OF EQUATION C/(M + M' + C) USED FOR DETECTING ROUGH TILT ANGLE θ FOR PERFORMING WEIGHT CALCULATIONS

WEIGHT COEFFICIENT FOR DIRECT DETECTION AND INDIRECT DETECTION

DIRECT DETECTION ANGLE, INDIRECT DETECTION ANGLE, AND
WEIGHTED AVERAGE

FIG. 31

φ DEPENDENCY OF SIGNAL LEVELS OBTAINED BY INTERNAL SECTOR SENSOR M AND EXTERNAL SECTOR SENSOR L (44φ-SPHERICAL-SHELL-COVERED COIL THAT IS ECCENTRIC 5 mm FROM THE CENTER AXIS OF SPHERE, 375 kHz, θ = 60°, THE BOTTOM OF 70φ-SPHERE IS PLACED 5 mm ABOVE SENSOR)

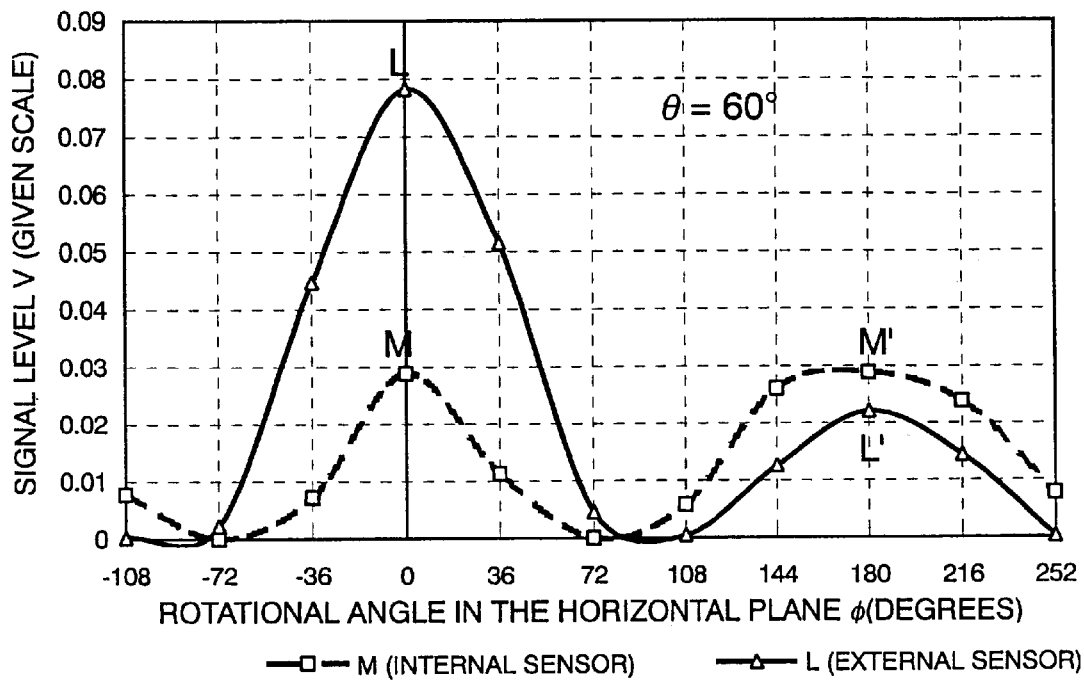

DEPENDENCY OF SIGNALS RECEIVED BY M AND L SENSORS UPON AZIMUTH ANGLE φ ON THE CONDITION THAT M' AND L' ARE DISPLACED FROM M AND L BY 180°

DEPENDENCY OF SIGNALS RECEIVED BY M AND L SENSORS UPON TILT ANGLE $\theta$ ON THE CONDITION THAT M' AND L' ARE DISPLACED FROM M AND L BY 180°

FIG. 33

θ DEPENDENCY OF RATIOS M/L AND M'/L' OF SIGNAL LEVELS OBTAINED BY INTERNAL SECTOR SENSOR M AND EXTERNAL SECTOR SENSOR L, AND THE DIFFERENCE AND SUM OF RATIO M/L AND RATIO M'/L'

(44φ-SPHERICAL-SHELL-COVERED COIL THAT IS ECCENTRIC 5 mm FROM THE CENTER AXIS OF SPHERE, 375 kHz, φ = 0°, THE BOTTOM OF 70φ-SPHERE IS PLACED 5 mm ABOVE SENSOR)

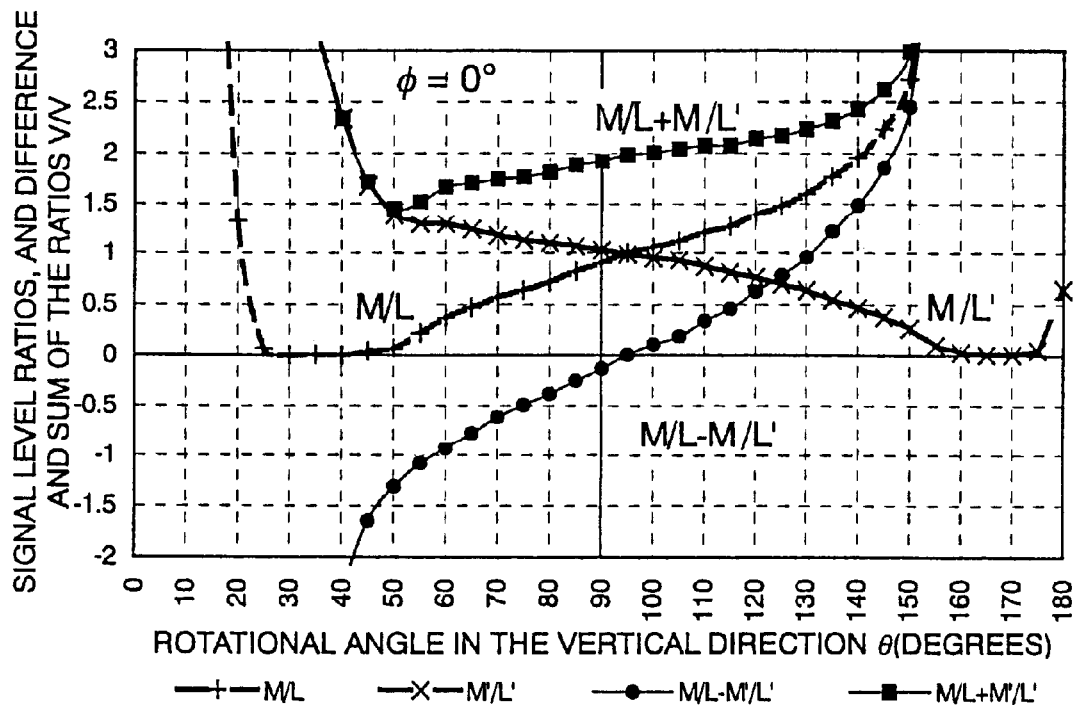

DEPENDENCY OF RATIOS M/L AND M'/L' OF SIGNAL LEVELS OBTAINED BY SENSORS M AND L, AND THE DIFFERENCE M/L - M'/L' AND THE SUM M/L + M'/L' UPON TILT ANGLE θ

DEPENDENCY OF THE DIFFERENCE BETWEEN RATIOS M/L AND M'/L' OF SIGNAL LEVELS OBTAINED BY SENSORS M AND L, AND ((M + 2L')-(M' + 2L))/((M + 2L') + (M' + 2L)) UPON TILT ANGLE $\theta$ DEPENDENCY OF SIGNAL RECEIVED BY CIRCULAR SENSOR C UPON TILT ANGLE $\theta$ DEPENDENCY OF SIGNALS RECEIVED BY M AND L SENSORS UPON AZIMUTH ANGLE $\phi$ ON THE CONDITION THAT M' AND L' ARE DISPLACED FROM M AND L BY 180°

DEPENDENCY OF SIGNALS RECEIVED BY M AND L SENSORS UPON TILT ANGLE $\theta$ ON THE CONDITION THAT M' AND L' ARE DISPLACED FROM M AND L BY 180°

DEPENDENCY OF SIGNAL RECEIVED BY CIRCULAR SENSOR C UPON TILT ANGLE $\theta$

DEPENDENCY OF SIGNALS RECEIVED BY M AND L SENSORS UPON TILT ANGLE $\theta$ ON THE CONDITION THAT M' AND L' ARE DISPLACED FROM M AND L BY 180°

DEPENDENCY OF SIGNAL RECEIVED BY CIRCULAR SENSOR C UPON TILT ANGLE $\theta$

FIG. 46

θ DEPENDENCY OF SIGNAL LEVELS OBTAINED BY INTERNAL
SECTOR SENSOR M AND EXTERNAL SECTOR SENSOR L
(49φ-CIRCULAR COIL CONTAINING 45φ-SPHERICAL AMORPHOUS MAGNETIC
ALLOY POWDER THAT IS NOT ECCENTRIC WITH RESPECT TO PLANES
PASSING THROUGH THE CENTER OF SPHERE, 687.5 kHz, φ = 0° AND 180°,
THE BOTTOM OF 70φ-SPHERE IS PLACED 5 mm ABOVE SENSOR)

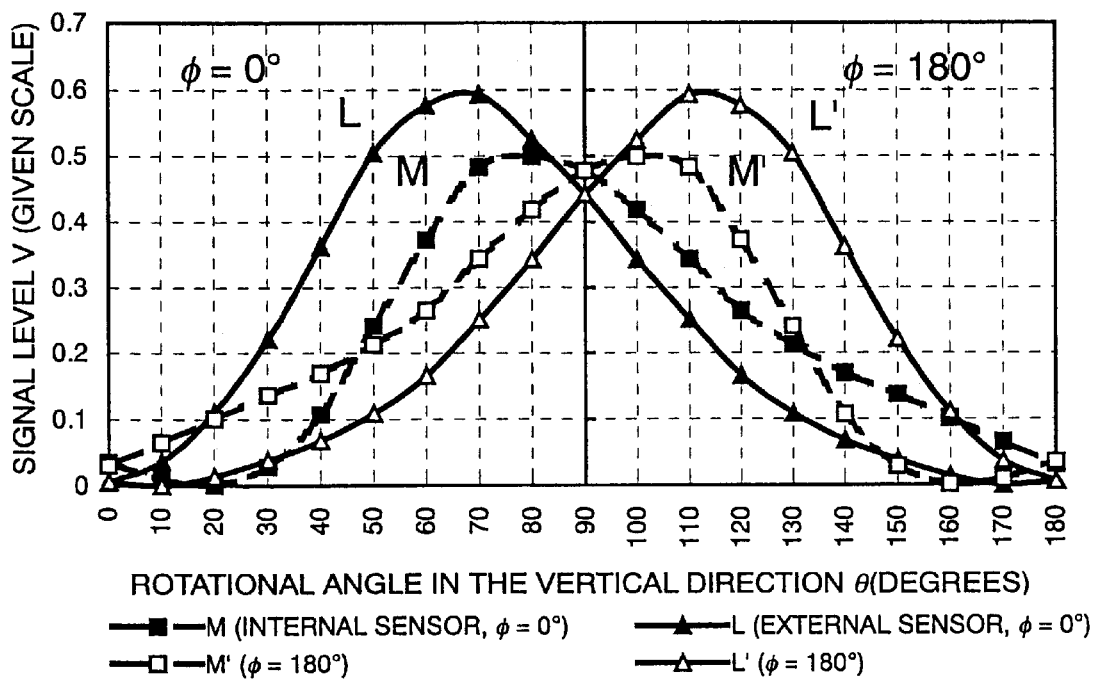

DEPENDENCY OF SIGNALS RECEIVED BY M AND L SENSORS UPON
TILT ANGLE θ ON THE CONDITION THAT M' AND L' ARE DISPLACED
FROM M AND L BY 180°

DEPENDENCY OF SIGNAL RECEIVED BY CIRCULAR SENSOR C UPON TILT ANGLE $\theta$

FIG. 48

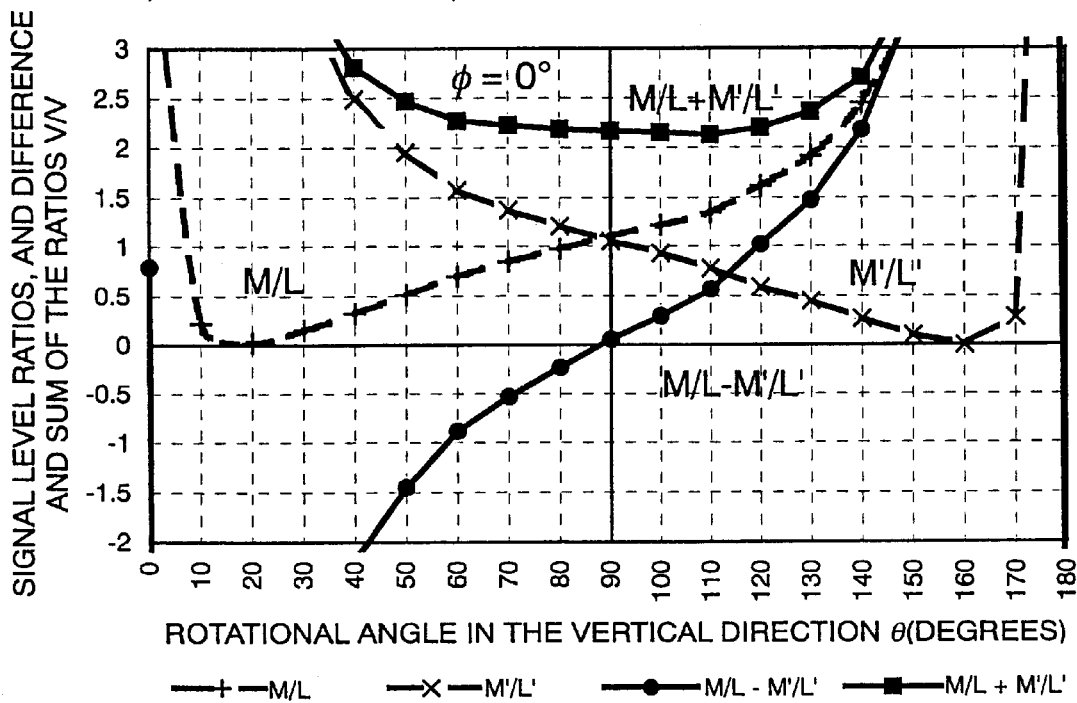

θ DEPENDENCY OF RATIOS M/L AND M'/L' OF SIGNAL LEVELS OBTAINED BY INTERNAL SECTOR SENSOR M AND EXTERNAL SECTOR SENSOR L, AND THE DIFFERENCE AND SUM OF RATIO M/L AND RATIO M'/L'
(49φ-CIRCULAR COIL CONTAINING 45φ-SPHERICAL AMORPHOUS MAGNETIC ALLOY POWDER THAT IS NOT ECCENTRIC WITH RESPECT TO PLANES PASSING THROUGH THE CENTER OF SPHERE, 687.5 kHz, φ = 0°, THE BOTTOM OF 70φ-SPHERE IS PLACED 5 mm ABOVE SENSOR)

DEPENDENCY OF RATIOS M/L AND M'/L' OF SIGNAL LEVELS OBTAINED BY SENSORS M AND L, AND THE DIFFERENCE M/L - M'/L' AND THE SUM M/L + M'/L' UPON TILT ANGLE θ

FIG. 49

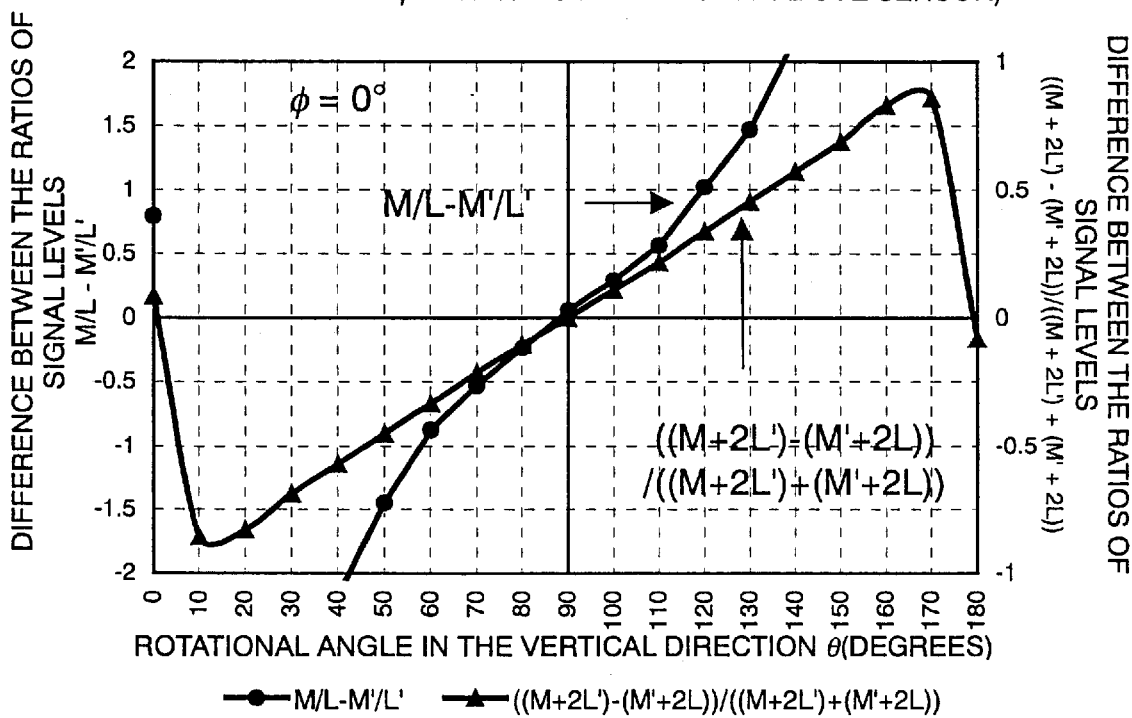

θ DEPENDENCY OF THE DIFFERENCE BETWEEN RATIO M/L AND M'/L' OF SIGNAL LEVELS OBTAINED BY INTERNAL SECTOR SENSOR M AND EXTERNAL SECTOR SENSOR L
(49φ-CIRCULAR COIL CONTAINING 45φ-SPHERICAL AMORPHOUS MAGNETIC ALLOY POWDER THAT IS NOT ECCENTRIC WITH RESPECT TO PLANES PASSING THROUGH THE CENTER OF SPHERE, 687.5 kHz, φ = 0°, THE BOTTOM OF 70φ-SPHERE IS PLACED 5 mm ABOVE SENSOR)

DEPENDENCY OF THE DIFFERENCE BETWEEN RATIOS M/L AND M'/L' OF SIGNAL LEVELS OBTAINED BY SENSORS M AND L, AND ((M + 2L')-(M' + 2L))/((M + 2L') + (M' + 2L)) UPON TILT ANGLE θ

DEPENDENCY OF SIGNALS RECEIVED BY M AND L SENSORS UPON AZIMUTH ANGLE $\phi$ ON THE CONDITION THAT M' AND L' ARE DISPLACED FROM M AND L BY 180°

DEPENDENCY OF SIGNALS RECEIVED BY M AND L SENSORS UPON TILT ANGLE $\theta$ ON THE CONDITION THAT M' AND L' ARE DISPLACED FROM M AND L BY 180°

DEPENDENCY OF SIGNAL RECEIVED BY CIRCULAR SENSOR C UPON TILT ANGLE $\theta$

FIG. 55

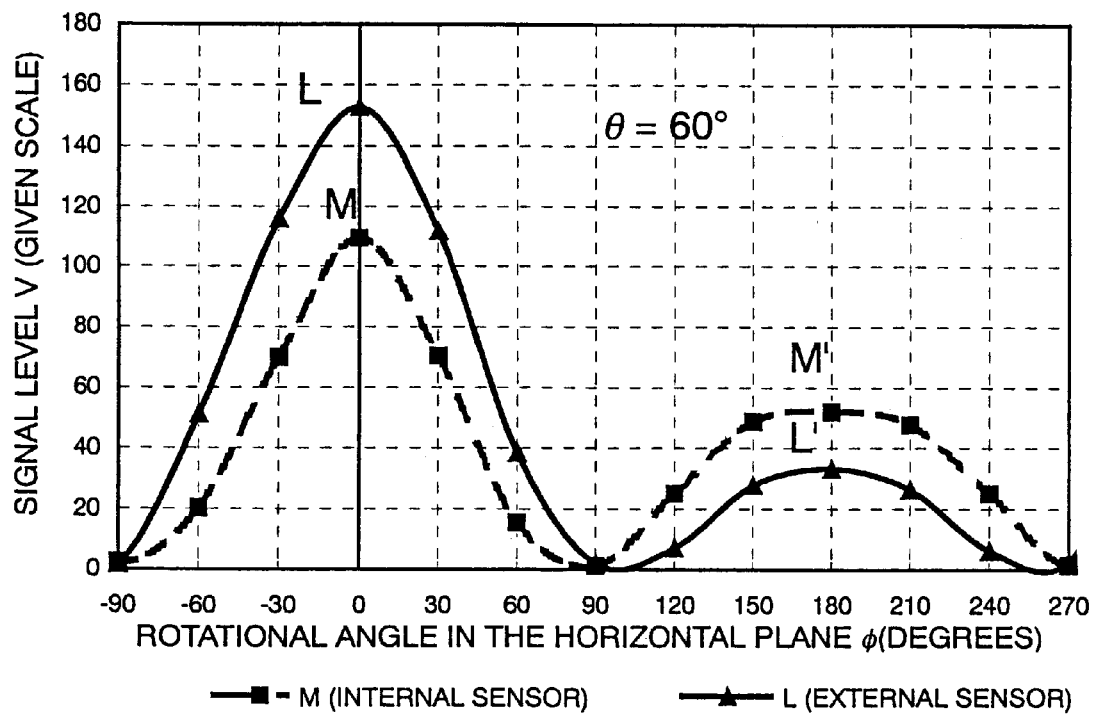

φ DEPENDENCY OF SIGNAL LEVELS OBTAINED BY INTERNAL SECTOR SENSOR M AND EXTERNAL SECTOR SENSOR L
(TWO 49φ- AND 15-TURN COILS WHICH ARE 10 mm SEPARATED FROM EACH OTHER, ARE IN PHASE BY BEING CONNECTED IN SERIES TO EACH OTHER AND ARE NOT ECCENTRIC WITH RESPECT TO PLANES PASSING THROUGH THE CENTER OF SPHERE, 687.5 kHz, θ = 60°, THE BOTTOM OF 70φ-SPHERE IS PLACED 5 mm ABOVE SENSOR)

DEPENDENCY OF SIGNALS RECEIVED BY M AND L SENSORS UPON AZIMUTH ANGLE φ ON THE CONDITION THAT M' AND L' ARE DISPLACED FROM M AND L BY 180° (APPROXIMATELY 1.3 TIMES GREATER THAN SIGNALS OBTAINED BY COILS M AND L HAVING THE SAME DIAMETER AND THE SAME NUMBER OF TURNS)

FIG. 56

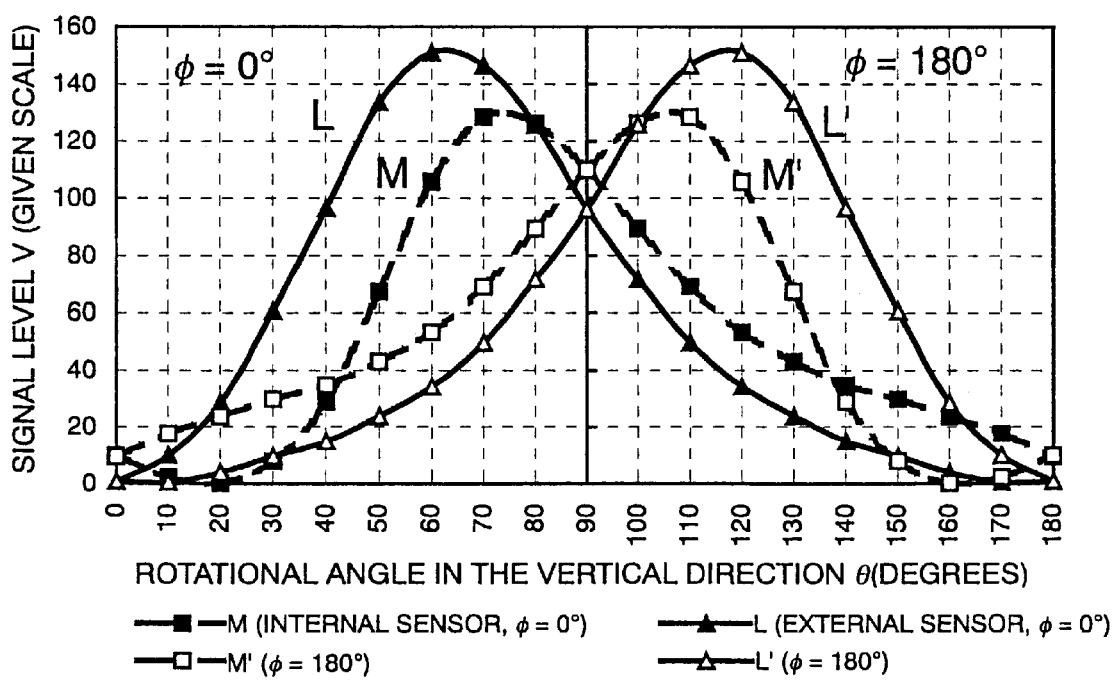

θ DEPENDENCY OF SIGNAL LEVELS OBTAINED BY INTERNAL SECTOR SENSOR M AND EXTERNAL SECTOR SENSOR L
(TWO 49φ- AND 15-TURN COILS WHICH ARE 10 mm SEPARATED FROM EACH OTHER, ARE IN PHASE BY BEING CONNECTED IN SERIES TO EACH OTHER AND ARE NOT ECCENTRIC WITH RESPECT TO PLANES PASSING THROUGH THE CENTER OF SPHERE, 687.5 kHz, φ = 0° AND 180°, THE BOTTOM OF 70φ-SPHERE IS PLACED 5 mm ABOVE SENSOR)

DEPENDENCY OF SIGNALS RECEIVED BY M AND L SENSORS UPON TILT ANGLE θ ON THE CONDITION THAT M' AND L' ARE DISPLACED FROM M AND L BY 180° (APPROXIMATELY 1.3 TIMES GREATER THAN SIGNALS OBTAINED BY COILS M AND L HAVING THE SAME DIAMETER AND THE SAME NUMBER OF TURNS)

DEPENDENCY OF RATIOS M/L AND M'/L' OF SIGNAL LEVELS OBTAINED BY SENSORS M AND L, AND THE DIFFERENCE M/L − M'/L' AND THE SUM M/L + M'/L' UPON TILT ANGLE $\theta$

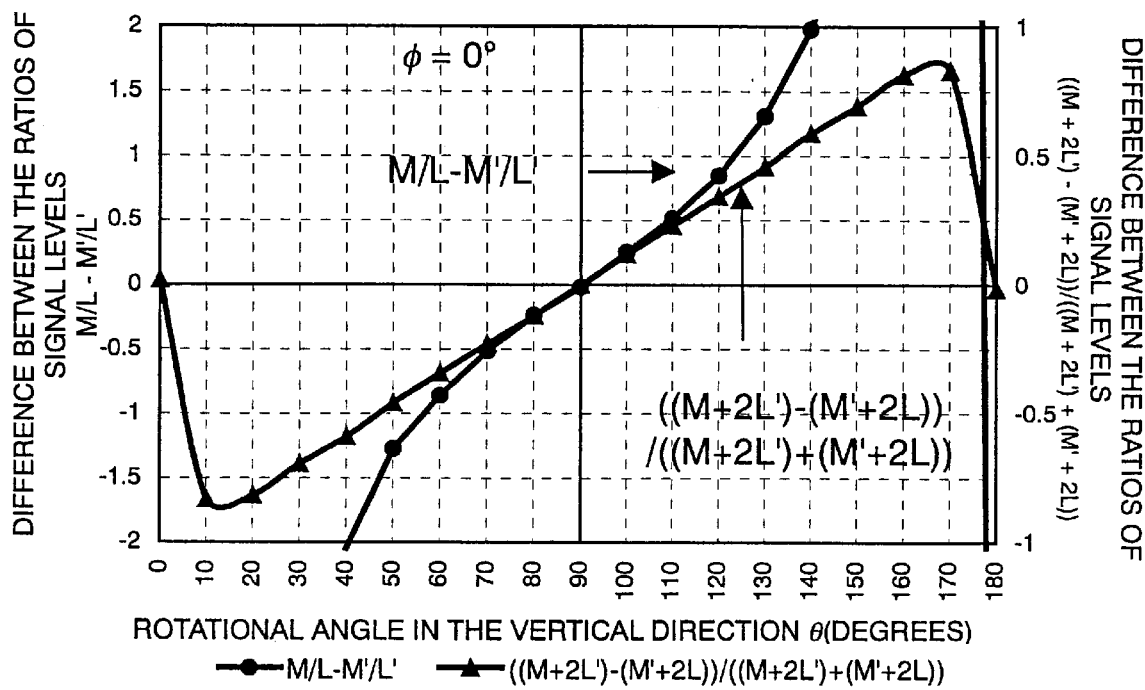

FIG. 58

θ DEPENDENCY OF THE DIFFERENCE BETWEEN RATIO M/L AND M'/L' OF SIGNAL LEVELS OBTAINED BY INTERNAL SECTOR SENSOR M AND EXTERNAL SECTOR SENSOR L
(TWO 49φ- AND 15-TURN COILS WHICH ARE 10 mm SEPARATED FROM EACH OTHER, ARE IN PHASE BY BEING CONNECTED IN SERIES TO EACH OTHER AND ARE NOT ECCENTRIC WITH RESPECT TO PLANES PASSING THROUGH THE CENTER OF SPHERE, 687.5 kHz, φ = 0°, THE BOTTOM OF 70φ-SPHERE IS PLACED 5 mm ABOVE SENSOR)

DEPENDENCY OF THE DIFFERENCE BETWEEN RATIOS M/L AND M'/L' OF SIGNAL LEVELS OBTAINED BY SENSORS M AND L, AND ((M + 2L')-(M' + 2L))/((M + 2L') + (M' + 2L)) UPON TILT ANGLE θ

DEPENDENCY OF SIGNAL RECEIVED BY CIRCULAR SENSOR C UPON TILT ANGLE θ (APPROXIMATELY 1.4 TIMES GREATER THAN SIGNAL OBTAINED BY COIL C HAVING THE SAME DIAMETER AND THE SAME NUMBER OF TURNS)

FIG. 61

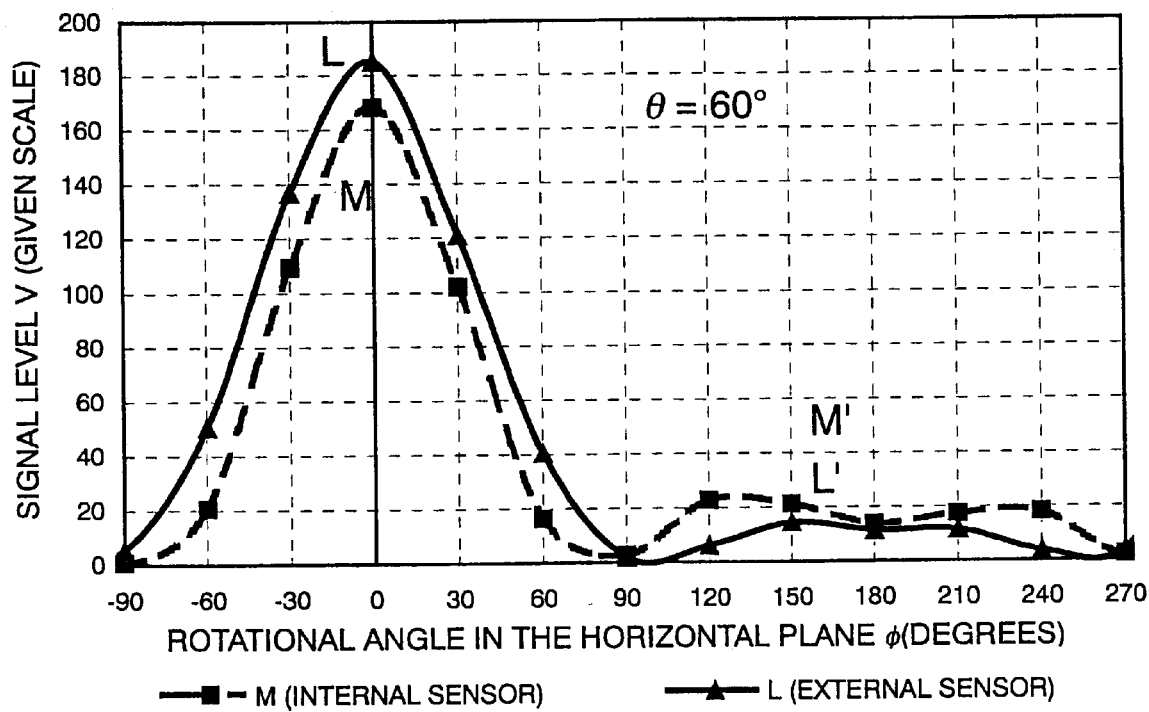

φ DEPENDENCY OF SIGNAL LEVELS OBTAINED BY INTERNAL SECTOR SENSOR M AND EXTERNAL SECTOR SENSOR L
(DONUT-SHAPED COIL WHICH HAS 40φ-SMALL CIRCLE AND 65φ-LARGE CIRCLE DIFFERENTIALLY OPERATED BY BEING CONNECTED IN SERIES AND WHICH IS NOT ECCENTRIC WITH RESPECT TO PLANES PASSING THROUGH THE CENTER OF SPHERE, 687.5 kHz, θ = 60°, THE BOTTOM OF 70φ-SPHERE IS PLACED 5 mm ABOVE SENSOR)

DEPENDENCY OF SIGNALS RECEIVED BY M AND L SENSORS UPON AZIMUTH ANGLE φ ON THE CONDITION THAT M' AND L' ARE DISPLACED FROM M AND L BY 180°

DEPENDENCY OF SIGNALS RECEIVED BY M AND L SENSORS UPON TILT ANGLE θ ON THE CONDITION THAT M' AND L' ARE DISPLACED FROM M AND L BY 180°

FIG. 63

θ DEPENDENCY OF RATIOS M/L AND M'/L' OF SIGNAL LEVELS
OBTAINED BY INTERNAL SECTOR SENSOR M AND EXTERNAL
SECTOR SENSOR L, AND THE DIFFERENCE AND SUM OF
RATIO M/L AND RATIO M'/L'
(DONUT-SHAPED COIL WHICH HAS 40φ-SMALL CIRCLE AND 65φ-LARGE
CIRCLE DIFFERENTIALLY OPERATED BY BEING CONNECTED IN
SERIES AND WHICH IS NOT ECCENTRIC WITH RESPECT TO PLANES
PASSING THROUGH THE CENTER OF SPHERE, 687.5 kHz, φ = 0°, THE
BOTTOM OF 70φ-SPHERE IS PLACED 5 mm ABOVE SENSOR)

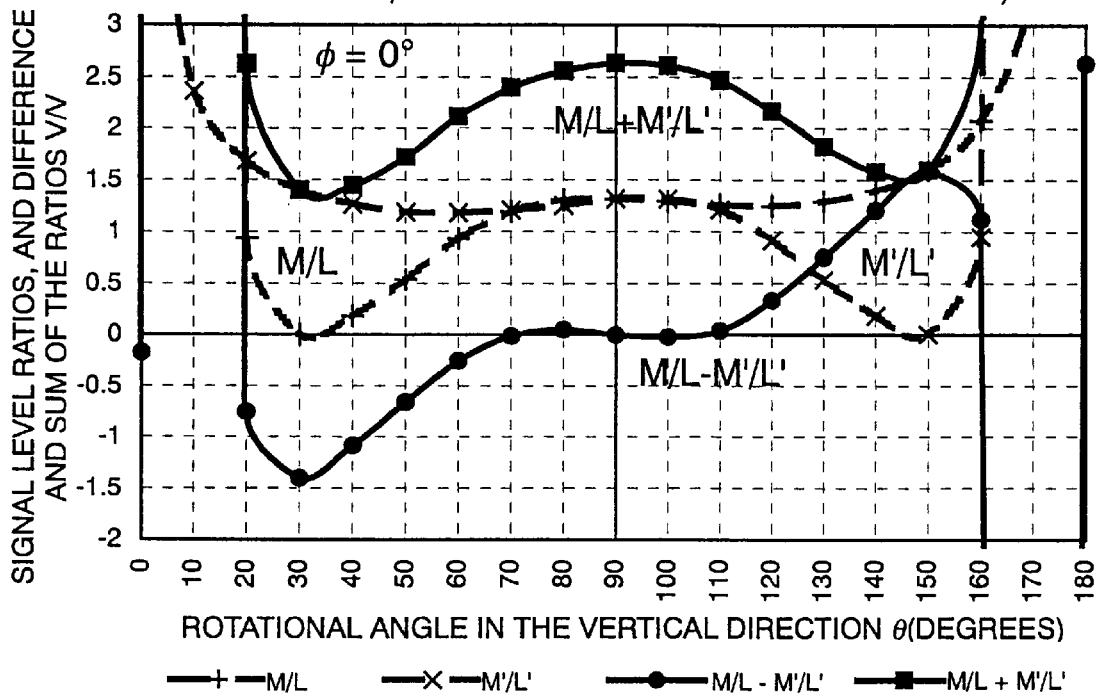

DEPENDENCY OF RATIOS M/L AND M'/L' OF SIGNAL LEVELS
OBTAINED BY SENSORS M AND L, AND THE DIFFERENCE M/L -
M'/L' AND THE SUM M/L + M'/L' UPON TILT ANGLE θ

DEPENDENCY OF THE DIFFERENCE BETWEEN RATIOS M/L AND M'/L' OF SIGNAL LEVELS OBTAINED BY SENSORS M AND L, AND ((M + 2L')-(M' + 2L))/((M + 2L') + (M' + 2L)) UPON TILT ANGLE $\theta$

FIG. 67

φ DEPENDENCY OF SIGNAL LEVELS OBTAINED BY INTERNAL
SECTOR SENSOR M AND EXTERNAL SECTOR SENSOR L
(DONUT-SHAPED COIL WHICH HAS 40φ-SMALL CIRCLE AND 65φ-LARGE
CIRCLE CONNECTED IN SERIES TO EACH OTHER SO AS TO BE IN
PHASE AND WHICH IS NOT ECCENTRIC WITH RESPECT TO PLANES
PASSING THROUGH THE CENTER OF SPHERE, 687.5 kHz, θ = 60°, THE
BOTTOM OF 70φ-SPHERE IS PLACED 5 mm ABOVE SENSOR)

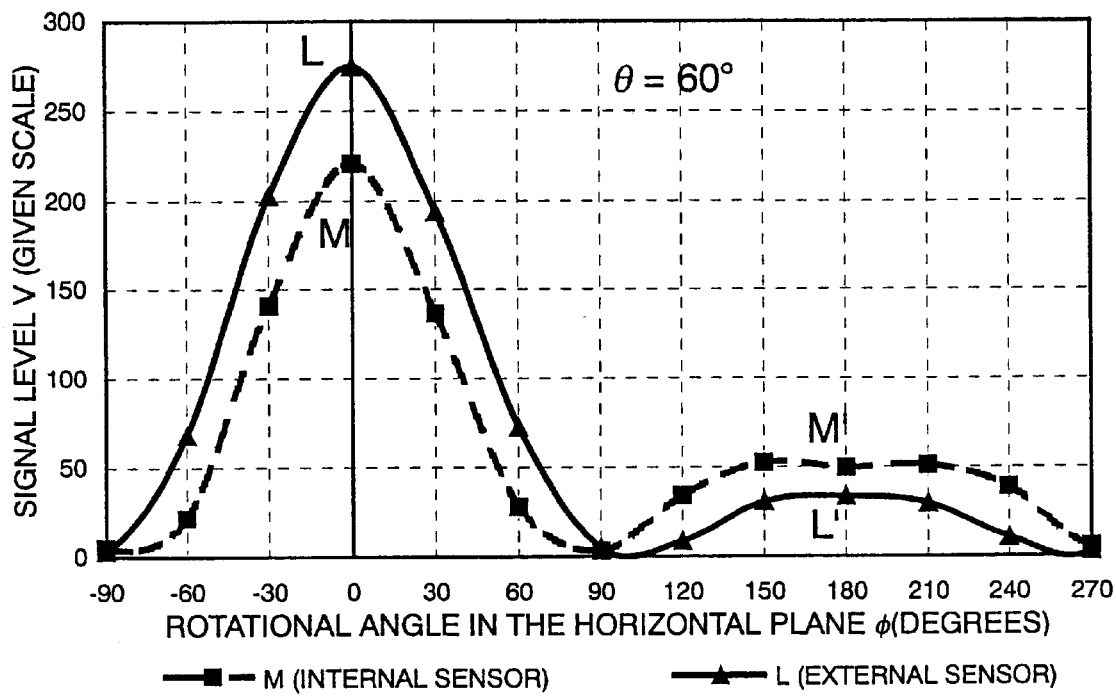

DEPENDENCY OF SIGNALS RECEIVED BY M AND L SENSORS UPON
AZIMUTH ANGLE φ ON THE CONDITION THAT M' AND L' ARE
DISPLACED FROM M AND L BY 180°

DEPENDENCY OF SIGNALS RECEIVED BY M AND L SENSORS UPON TILT ANGLE $\theta$ ON THE CONDITION THAT M' AND L' ARE DISPLACED FROM M AND L BY 180°

DEPENDENCY OF RATIOS M/L AND M'/L' OF SIGNAL LEVELS OBTAINED BY SENSORS M AND L, AND THE DIFFERENCE M/L - M'/L' AND THE SUM M/L + M'/L' UPON TILT ANGLE $\theta$ DEPENDENCY OF THE DIFFERENCE BETWEEN RATIOS M/L AND M'/L' OF SIGNAL LEVELS OBTAINED BY SENSORS M AND L, AND ((M + 2L')-(M' + 2L))/((M + 2L') + (M' + 2L)) UPON TILT ANGLE $\theta$ DEPENDENCY OF SIGNAL RECEIVED BY CIRCULAR SENSOR C UPON TILT ANGLE $\theta$

Z COIL
Y COIL
101
103
104
X COIL 101
103
104
θ
X

FIG. 73

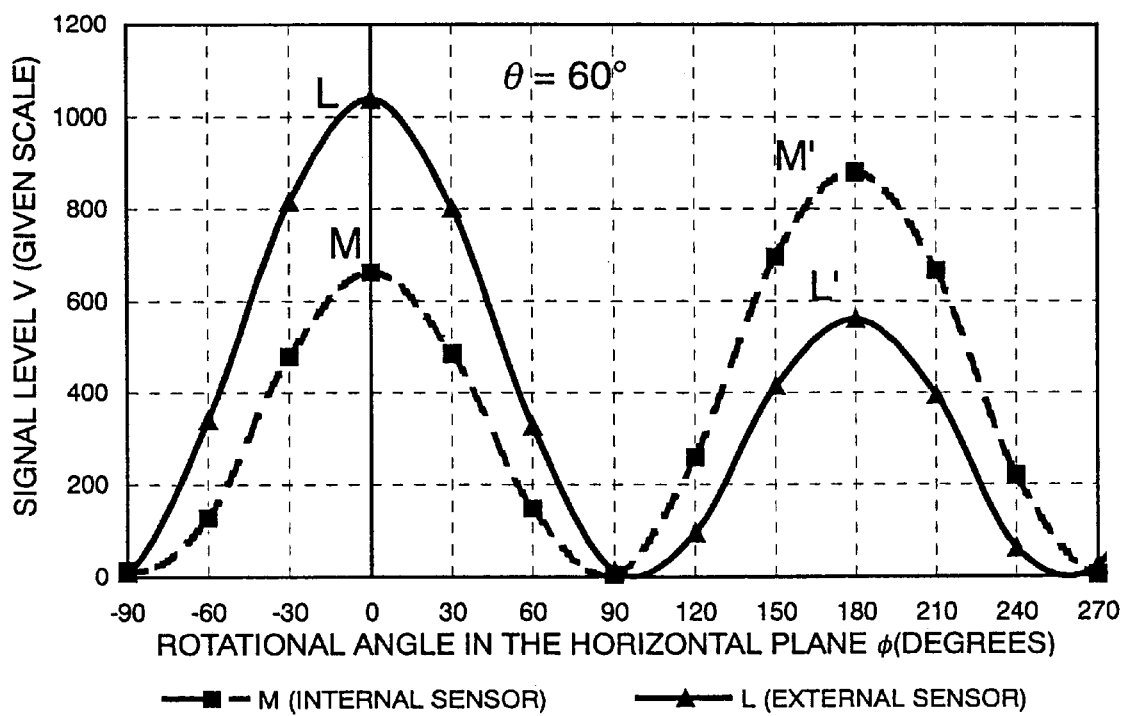

DEPENDENCY OF SIGNALS RECEIVED BY M AND L SENSORS UPON AZIMUTH ANGLE $\phi$ ON THE CONDITION THAT M' AND L' ARE DISPLACED FROM M AND L BY 180° (APPROXIMATELY 2.3 TIMES GREATER THAN SIGNALS OBTAINED BY CIRCULAR COILS M AND L HAVING THE SAME AVERAGE DIAMETER AND THE SAME NUMBER OF TURNS. $\phi$ DETECTION PRECISION IS IMPROVED SINCE SIGNAL DISTRIBUTION APPROXIMATES PARABOLA.)

FIG. 74

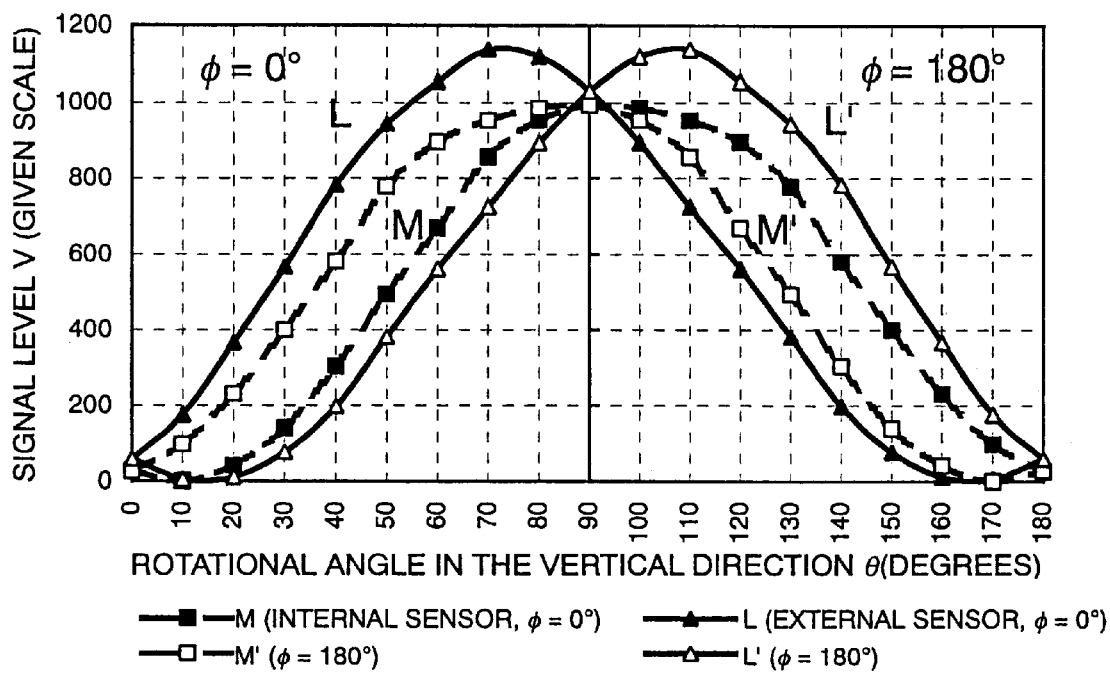

θ DEPENDENCY OF SIGNAL LEVELS OBTAINED BY INTERNAL SECTOR SENSOR M AND EXTERNAL SECTOR SENSOR L
(68φ- AND 30-TURN COIL HAVING AVERAGE DIAMETER OF 54.6φ WHICH IS NOT ECCENTRIC WITH RESPECT TO PLANES PASSING THROUGH THE CENTER OF SPHERE, 687.5 kHz, φ = 0° AND 180°, THE BOTTOM OF 70φ-SPHERE IS PLACED 5 mm ABOVE SENSOR)

DEPENDENCY OF SIGNALS RECEIVED BY M AND L SENSORS UPON TILT ANGLE θ ON THE CONDITION THAT M' AND L' ARE DISPLACED FROM M AND L BY 180° (APPROXIMATELY 2.3 TIMES GREATER THAN SIGNALS OBTAINED BY CIRCULAR COILS M AND L HAVING THE SAME AVERAGE DIAMETER AND THE SAME NUMBER OF TURNS)

DEPENDENCY OF RATIOS M/L AND M'/L' OF SIGNAL LEVELS OBTAINED BY SENSORS M AND L, AND THE DIFFERENCE M/L - M'/L' AND THE SUM M/L + M'/L' UPON TILT ANGLE $\theta$ DEPENDENCY OF THE DIFFERENCE BETWEEN RATIOS M/L AND M'/L' OF SIGNAL LEVELS OBTAINED BY SENSORS M AND L, AND ((M + 2L')-(M' + 2L))/((M + 2L') + (M' + 2L)) UPON TILT ANGLE $\theta$

FIG. 77

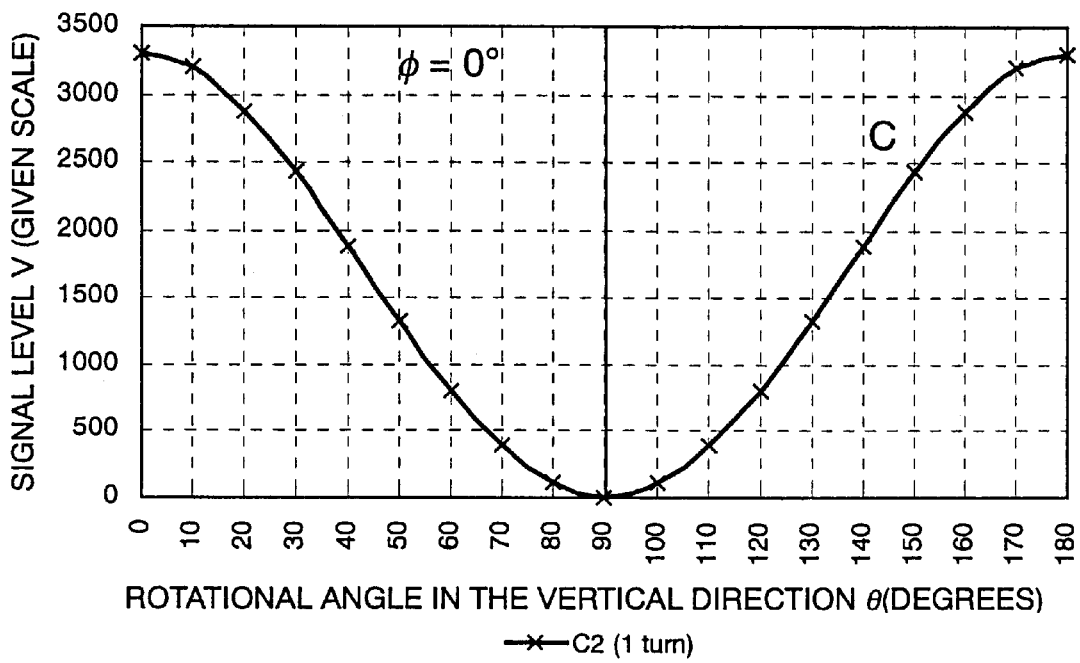

θ DEPENDENCY OF SIGNAL LEVEL OBTAINED BY 80φ-CIRCULAR SENSOR
(68φ- AND 30-TURN COIL HAVING AVERAGE DIAMETER OF 54.6φ WHICH IS NOT ECCENTRIC WITH RESPECT TO PLANES PASSING THROUGH THE CENTER OF SPHERE, 687.5 kHz, φ = 0°, THE BOTTOM OF 70φ-SPHERE IS PLACED 5 mm ABOVE SENSOR)

DEPENDENCY OF SIGNAL RECEIVED BY CIRCULAR SENSOR C UPON TILT ANGLE θ (APPROXIMATELY 4.5 TIMES GREATER THAN SIGNALS OBTAINED BY CIRCULAR COILS M AND L HAVING THE SAME AVERAGE DIAMETER AND THE SAME NUMBER OF TURNS)

ORIENTATION-DETECTING APPARATUS, ORIENTATION-DETECTING METHOD, ORIENTATION-DETECTING SENSOR DEVICE AND ORIENTATION-DESIGNATING DEVICE

This application claims priority under 35 U.S.C. Section 119 on Japanese Application No. 10-283553, filed Sep. 21, 1998, the disclosure of which is hereby incorporated herein by reference.

BACKGROUND OF THE INVENTION

1. Field of the Invention

The present invention relates to an orientation-detecting apparatus, an orientation-detecting method, an orientation-detecting sensor device, and an orientation-designating device, all of which are used for detecting three-dimensional orientations by using an electromagnetic coupling unit.

2. Description of the Related Art

Hitherto, trackballs have been used as devices for detecting the orientation of an object in three-dimensional space. By using an encoder for detecting the rotation of a trackball about the X-axis and the Y-axis, the amount by which the trackball is rotated about the X- and Y-axes directions is detected.

In the above-described conventional trackballs, however, the rotation made about the X-, Y-, and Z-axes cannot be detected. Additionally, the rotation can be detected only as a relative value, and not as an absolute value, since the trackball detects rotational displacements about the axes.

SUMMARY OF THE INVENTION

Accordingly, it is an object of the present invention to detect orientations in three-dimensional space as absolute values.

In order to achieve the above object, according to one aspect of the present invention, there is provided an orientation-detecting apparatus including an orientation-designating device having a plurality of orientation-designating coils whose coil planes face in different directions. An orientation-detecting sensor includes a plurality of orientation-detecting coils which are radially disposed from a center position and are electromagnetically coupled to the orientation-designating coils. A selector selectively switches the orientation-detecting coils. Signals having a plurality of frequencies are transmitted and received between the selected orientation-detecting coil and the corresponding orientation-designating coil by electromagnetic coupling therebetween. A signal receiver receives a signal received by the orientation-detecting coil or the orientation-designating coil. A calculator calculates an orientation of the orientation-designating device from the signal received by the signal receiver. With this arrangement, the orientation of the orientation-designating device disposed at the center position is detected.

According to another aspect of the present invention, there is provided an orientation-detecting method. In this method, an orientation-designating device is disposed at a center position of orientation-detecting sensor, the orientation-designating device including a plurality of orientation-designating coils whose coil planes face in different directions, the orientation-detecting sensor including a plurality of orientation-detecting coils which are radially disposed from the center position and are electromagnetically coupled to the orientation-designating coils. Signals are transmitted and received between the orientation-detecting coil selected by a selector and the corresponding orientation-designating coil by electromagnetic coupling therebetween. The signal detected or received by the selected orientation-detecting coil or the orientation-designating coil is then received by a signal receiver. An orientation of the orientation-designating device in three-dimensional space is detected by calculating the orientation of the orientation-designating device by a calculator based on the signal received by the signal-receiver. The orientation of the orientation-designating device in three-dimensional space is detected according to values obtained by detecting azimuth angles $\phi$ and tilt angles $\theta$ or direction vectors of the plurality of orientation-designating coils.

According to still another aspect of the present invention, there is provided an orientation-detecting sensor device which is magnetically coupled to a plurality of orientation-designating coils, whose coil planes face in different directions, provided for an orientation-designating device. The orientation-detecting sensor device includes a plurality of orientation-detecting coils radially disposed from a center position.

According to a further aspect of the present invention, there is provided an orientation-designating device including a plurality of orientation-designating coils which are electromagnetically coupled to an orientation-detecting sensor formed of a plurality of orientation-detecting coils. The plurality of orientation-designating coils are disposed in such a manner that coil planes of the orientation-designating coils face in different directions.

BRIEF DESCRIPTION OF THE DRAWINGS

FIG. 23 is a characteristic diagram obtained when the orientation-designating device shown in FIG. 7 is used;

FIG. 31 is a characteristic diagram obtained when the orientation-designating device shown in FIGS. 30A, 30B, and 30C is used;

FIG. 33 is a characteristic diagram obtained when the orientation-designating device shown in FIGS. 30A, 30B, and 30C is used;

FIG. 46 is a characteristic diagram obtained when the orientation-designating device shown in FIG. 44 is used;

FIG. 48 is a characteristic diagram obtained when the orientation-designating device shown in FIG. 44 is used;

FIG. 49 is a characteristic diagram obtained when the orientation-designating device shown in FIG. 44 is used;

FIG. 55 is a characteristic diagram obtained when the orientation-designating device shown in FIGS. 54A and 54B is used;

FIG. 56 is a characteristic diagram obtained when the orientation-designating device shown in FIGS. 54A and 54B is used;

FIG. 58 is a characteristic diagram obtained when the orientation-designating device shown in FIGS. 54A and 54B is used;

FIG. 61 is a characteristic diagram obtained when the orientation-designating device shown in FIGS. 60A and 60B is used;

FIG. 63 is a characteristic diagram obtained when the orientation-designating device shown in FIGS. 60A and 60B is used;

FIG. 67 is a characteristic diagram obtained when the orientation-designating device shown in FIGS. 66A and 66B is used;

FIG. 73 is a characteristic diagram obtained when the orientation-designating device shown in FIGS. 72A and 72B is used;

FIG. 74 is a characteristic diagram obtained when the orientation-designating device shown in FIGS. 72A and 72B is used;

FIG. 77 is a characteristic diagram obtained when the orientation-designating device shown in FIGS. 72A and 72B is used;

DESCRIPTION OF THE PREFERRED EMBODIMENTS

Figure 1:
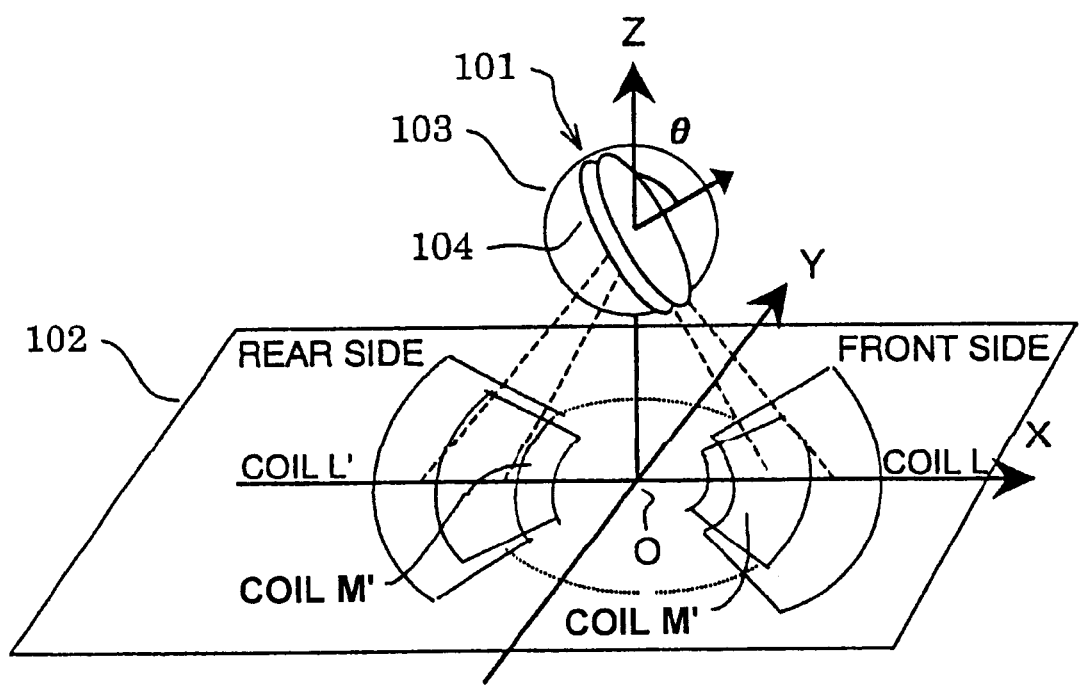
FIG. 1 is a schematic view illustrating an embodiment of the present invention.

Embodiments of the present invention are described below with reference to the drawings. In the drawings, the same components are designated by like reference numerals.

Figure 2:
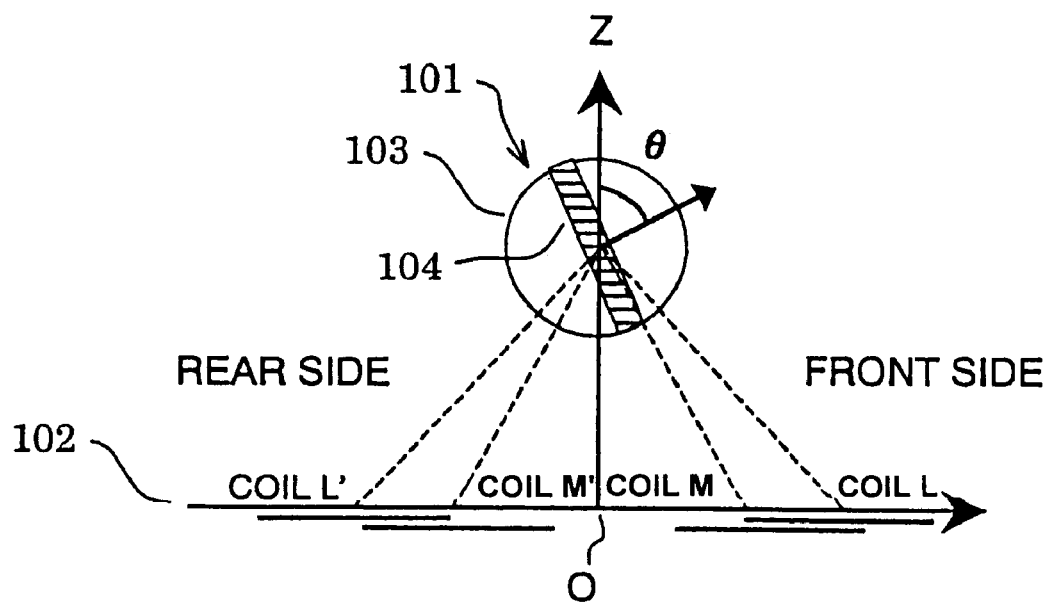
FIG. 2 is a front view illustrating the embodiment shown in FIG. 1.

Referring to the schematic configuration of a first embodiment of the present invention shown in FIG. 1 and to the front view of the embodiment shown in FIG. 2, an orientation-detecting apparatus is formed of an orientation-designating device 101, an orientation-detecting sensor 102, and an orientation detecting unit (not shown). The orientation-detecting sensor 102 and the orientation-detecting unit form an orientation-detecting sensor device.

The orientation-designating device 101 has a sphere 103, within which three orientation-designating coils wound in the mutually orthogonal X-axis, the Y-axis, and the Z-axis directions are provided. Only a single orientation-designating coil 104 is shown in FIGS. 1 and 2. A capacitor (not shown) is connected to each orientation-designating coil, thereby forming a resonance circuit having a resonant frequency that is different from the resonant frequencies of other resonance circuits. In detecting an orientation, the orientation-designating device 101 is placed in a recessed portion (not shown) provided at a center position O of the orientation-detecting sensor 102, which serves as an orientation detecting unit.

The configuration and the arrangement of orientation-detecting coils for use in the orientation-detecting sensor 102 are discussed briefly below, though they will be described in detail later. The orientation-detecting coils are formed of a plurality of sets of sector coils, each set consisting of large and small sector coils, circular coils, and donut-shaped coils, all the coils being radially disposed from the center position O. In FIGS. 1 and 2, two large sector coils (external sector coils) L and L' located farther away from the center position O and two small sector coils (internal sector coils) M and M' located closer to the center position O are shown. To clearly distinguish the orientation-detecting coils from the orientation-designating coils, the orientation-detecting coils are referred to as the "sensor coils" when necessary. In certain embodiments, these sensor coils may receive or detect waves sent from designating coils.

The sector coils L and M form a pair, and the sector coils L' and M' form another pair, both pairs being planarly and radially disposed from the center position O. The sector coils L and M are displaced from the sector coils L' and M' by 180 degrees in the horizontal plane (azimuth angle φ) around the center position O, i.e., the sector coils L and M and the sector coils L' and M' are positioned symmetrically to each other with respect to the center position O. Twelve pairs of large and small sector coils are positioned at angular intervals of 30 degrees around the center position O. Each sector coil is connected to a circuit (not shown).

Regardless of the angle of the orientation-designating coil 104 in the vertical direction (the tilt angle θ), the orientation-detecting coils are located symmetrically to each other with respect to the center position O to achieve high symmetrical characteristics of the signal intensity concerning a rotation by the azimuth angle φ in the horizontal plane.

The orientation-detecting coils are disposed with a twist. In order to prevent detection errors generated by the influence of external disturbances, an electromagnetic shielding plate formed of a heat-treated nickel-alloy No. 42 plate is placed under the substrate with a 5-mm space therebetween.

Figure 3:
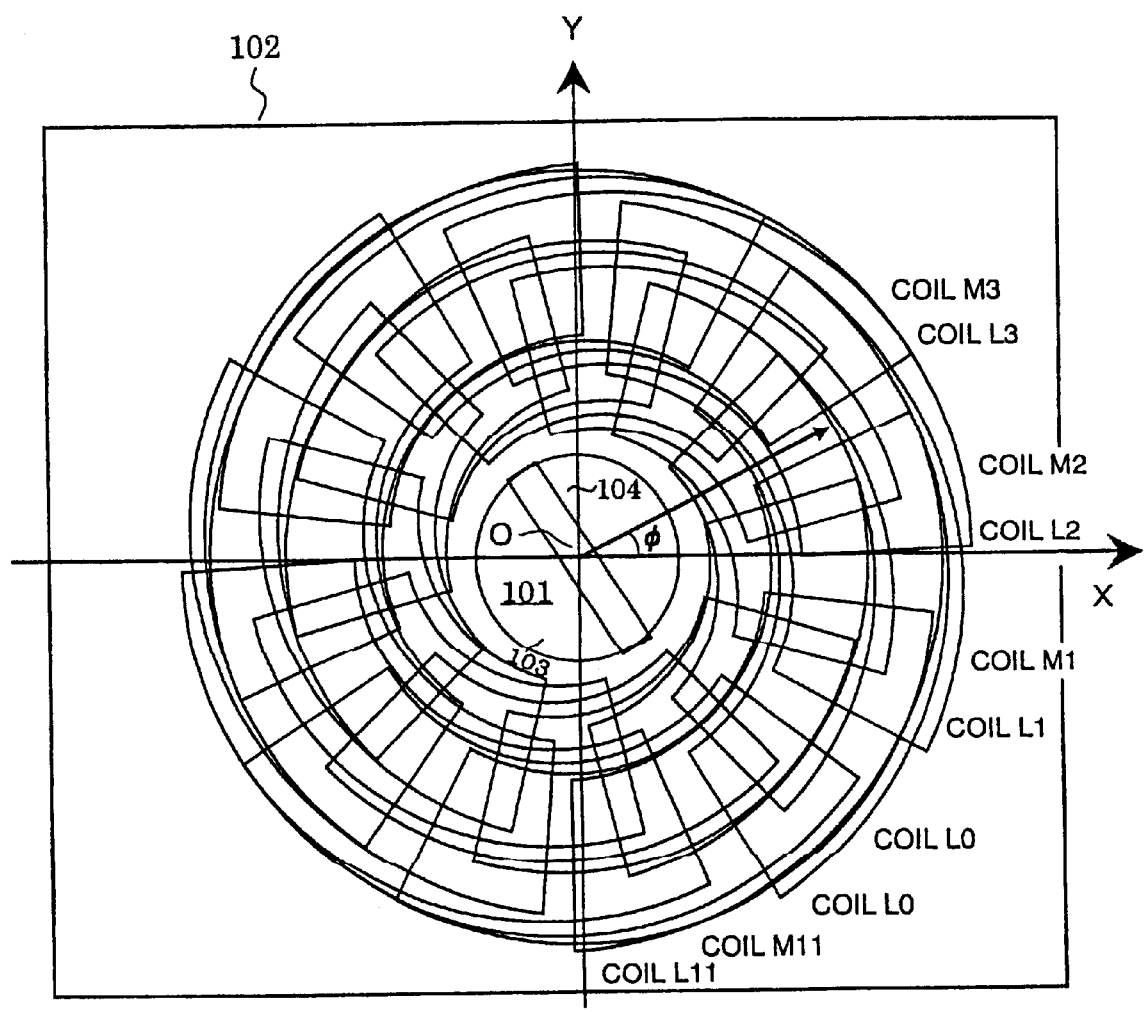
FIG. 3 is a plan view illustrating the overall arrangement of sector coils according to an embodiment of the present invention.

Referring to the plan view illustrating the overall arrangement of the sector coils shown in FIG. 3, the sector coils consist of large sector coils, i.e., coil L0 through coil L11, located farther away from the center position O, and small sector coils, i.e., coil M0 through coil M11, placed closer to the center position O. The coils L0 through L11 form pairs with the coils M0 through M11, respectively, and the twelve pairs of coils L and coils M are radially disposed from the center position O at an angular interval of 30 degrees in the direction of the azimuth angle φ.

Figure 4:
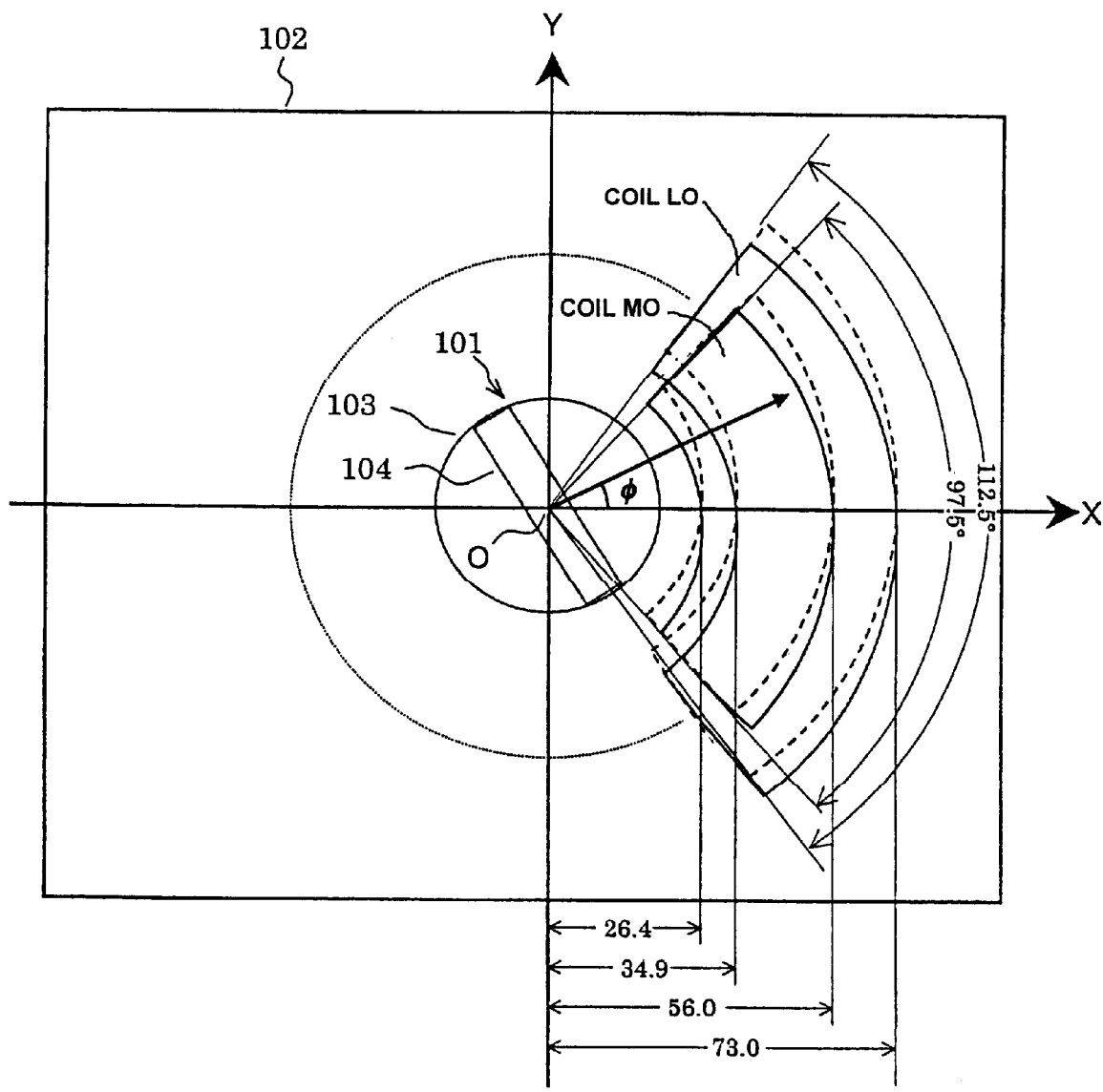
FIG. 4 is a plan view illustrating a detailed configuration of the sector coils according to an embodiment of the present invention.

FIG. 4 is a plan view illustrating the details of each sector coil shown in FIG. 3. The coils L0 through L11 are formed in the same configuration, and the coils M0 through M11 are also formed in the same configuration. A pair of coil L0 and coil M0 is shown in FIG. 4 as a typical example. The coil L0 has an angular width of 112.5 degrees in the direction of the azimuth angle φ at the center position O and extends from 34.9 mm to 73.0 mm in the radial direction. The coil M0 has an angular width of 97.5 degrees in the direction of the azimuth angle φ at the center position O and extends from 26.4 mm to 56.0 mm in the radial direction.

The individual sector coils are disposed with a twist, as indicated by the solid lines in FIG. 4, with respect to arcs centered on the center position O, as shown by the dotted lines. The reason for this is to form a plurality of sector coils along the circumference of the center position O when the sector coils are formed by a print pattern on a substrate. Each sector coil is formed by winding a plurality of layers of a multi-layered substrate a plurality of times, which will be described in detail later, thereby forming a single sector coil. The averaged sector coil of the plurality of coils forms an arc with respect to the center position O, thereby forming ideal sectors, which are axially symmetrical to each other.

Figure 5:
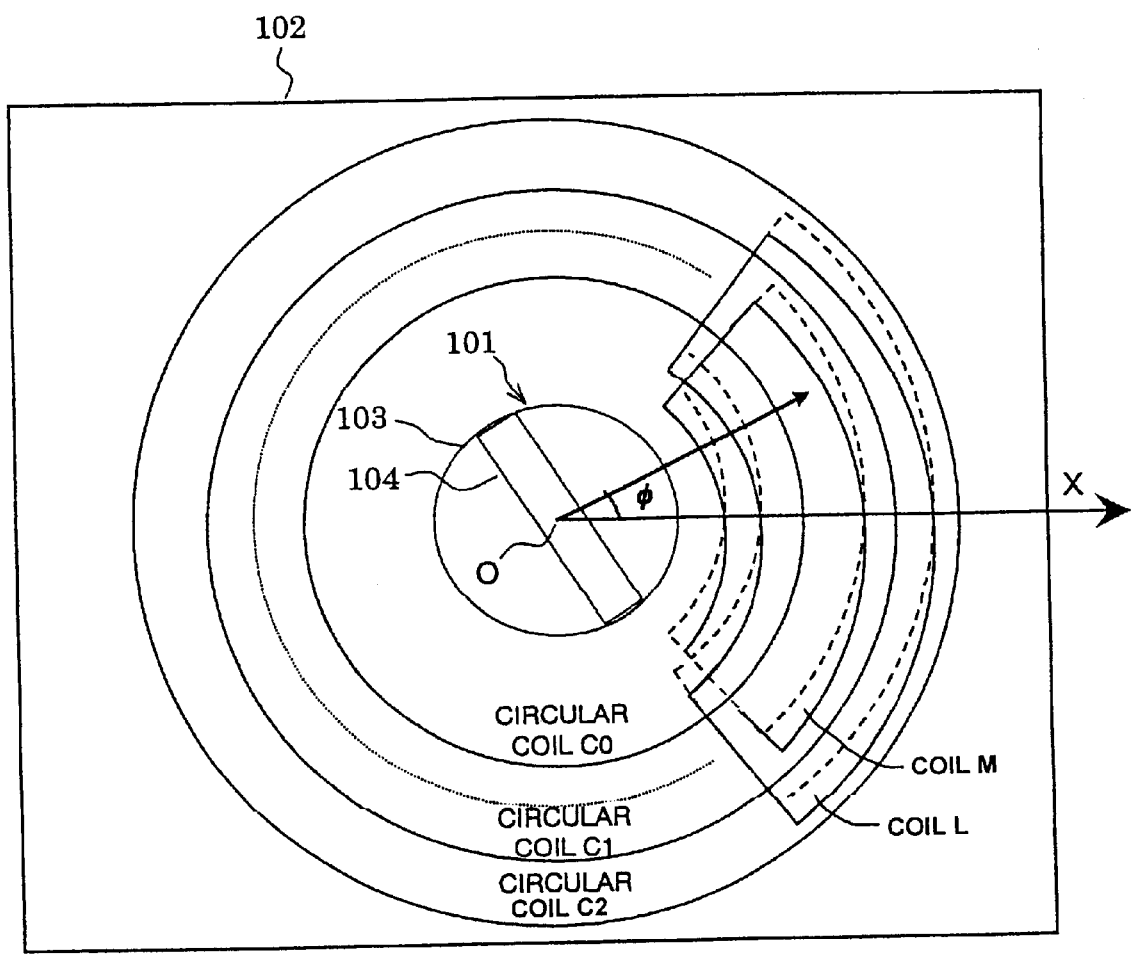
FIG. 5 is a plan view illustrating a detailed configuration of circular coils according to an embodiment of the present invention.

FIG. 5 is a plan view illustrating circular coils forming the orientation-detecting sensor 102. The circular coils C0, C1, and C2 are concentrically disposed around the center position O in such a manner that they overlap with the sector coils L and M but are insulated therefrom. The circular coils C0, C1, and C2 are used together with the sector coils L and M. Additionally, each of the circular coils C0, C1, and C2 is connected to a circuit (not shown).

Figure 6:
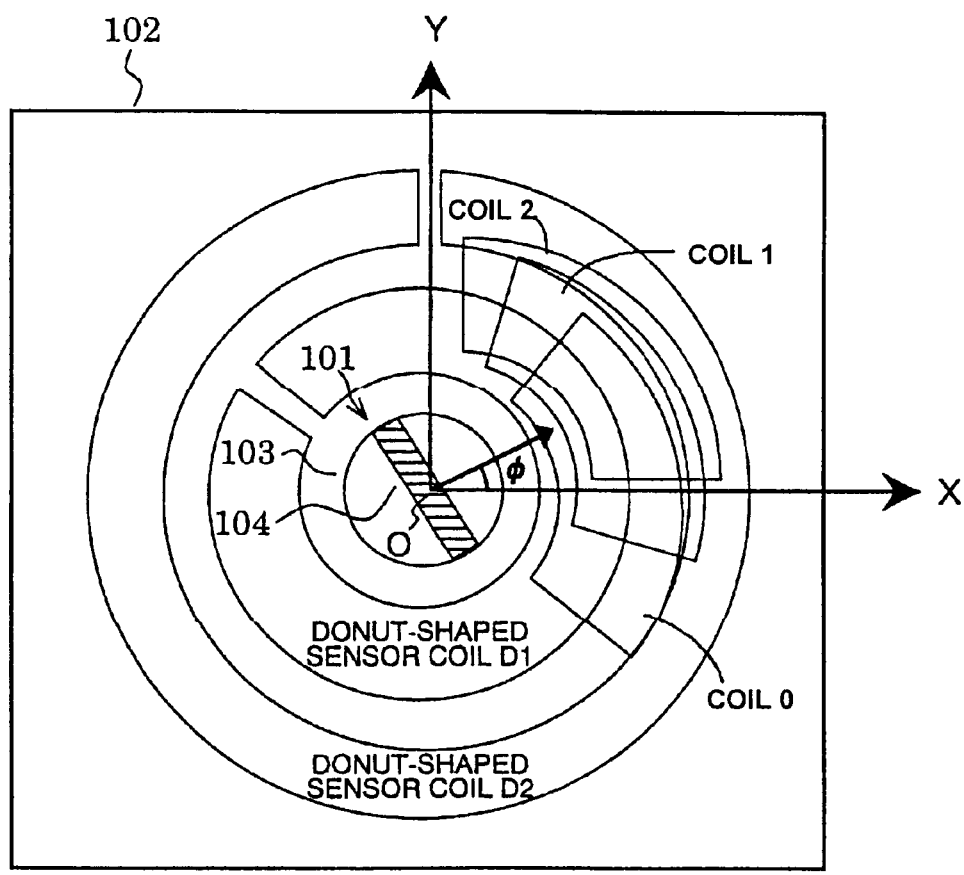
FIG. 6 is a plan view illustrating a detailed configuration of donut-shaped coils according to an embodiment of the present invention.

FIG. 6 is a plan view illustrating donut-shaped sensor coils forming the orientation-detecting sensor 102. Donut-shaped sensor coils D1 and D2 are concentrically disposed around the center position O in such a manner that they overlap with the sector coils L and M and the circular coils C0 through C2 but are insulated therefrom. The donut-shaped sensor coils D1 and D2 are used together with the sector coils and/or the circular coils C. Each of the donut-shaped sensor coils D1 and D2 is connected to a circuit (not shown).

The configuration and the arrangement of the sector coils L and M are described in greater detail below with reference to FIGS. 1 through 6. The plurality of sector coils L and M overlap each other so as to maximize the level of a received signal. When rotating the sector coils L and M in the direction of the azimuth angle φ, the arcs of the coils L and M disadvantageously overlap with those of the adjacent coils L and M, thereby disturbing the proper arrangement of the sector coils L and M. Thus, if the sector coils L and M are slightly twisted before being rotated, they can be disposed, as shown in FIG. 3, without overlapping the arcs. The sector coil M is placed in such a manner that it is covered with the corresponding sector coil L so that the peak signal of the sector coil M matches that of the sector coil L. The sector coils are disposed while being overlapped with each other so that the center plane of the orientation-designating coil 104 of the orientation-designating device 101 is contained in three sets of the sector coils. With this arrangement, the envelope of a signal transmitted from the sector coils exhibits parabolic characteristics.

The arrangement of the plurality of sector coils L and M are as illustrated in FIG. 3, and the vertex angles are determined in such a manner that the radial portions are not overlapped with each other. This makes it possible to arrange a plurality of sector coils M and L by using a multi-layered substrate, which will be discussed later. A plurality of circular coils C and a plurality of donut-shaped sensor coils D may be disposed in gaps formed between the arcs of the sector coils M and the sector coils L.

Figure 7A:
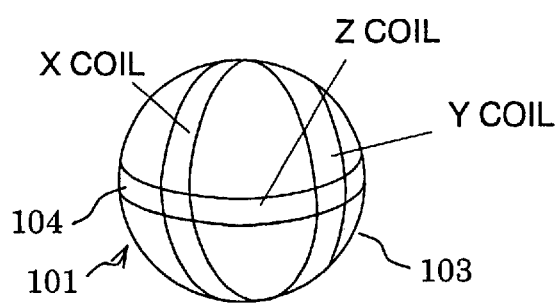
FIGS. 7A, 7B, and 7C illustrate an orientation-designating device according to a first embodiment of the present invention.
Figure 7B:
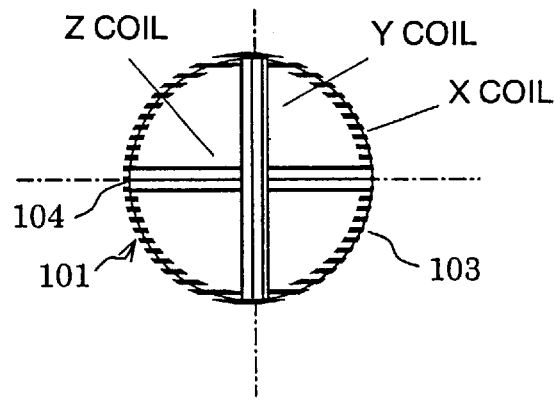
Figure 7C:
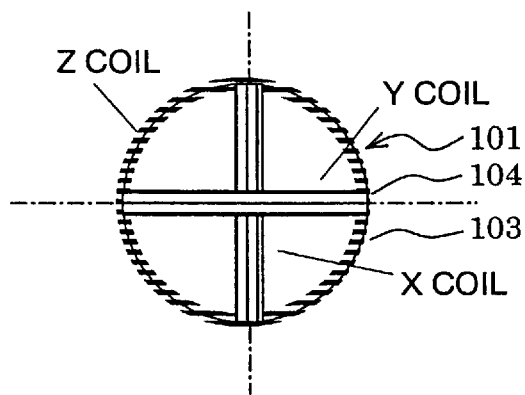

FIG. 7A is a perspective view illustrating the orientation-designating device 101, which serves as an orientation-designating unit, according to the first embodiment of the present invention. FIG. 7B is a sectional view taken through the plane of, and FIG. 7C is a sectional view taken through the plane of a Z-axis coil (Z Coil) of the orientation-designating device 101. The orientation-designating device 101 includes the sphere 103, and three orientation-designating coils 104, i.e., the X-axis coil (X Coil), the Y-axis coil (Y Coil), and the Z-axis coil (Z Coil). The coil planes of the three orientation-designating coils 104 are formed in the X-axis, Y-axis, and Z-axis directions, respectively, which are orthogonal to each other, and intersect at the center of the sphere 103. Each of the coils is connected to a capacitor (not shown) and forms a resonance circuit having a resonant frequency that is different from the resonant frequencies of the other resonance circuits. Each coil is covered with a spherical shell (not shown).

Figure 8:
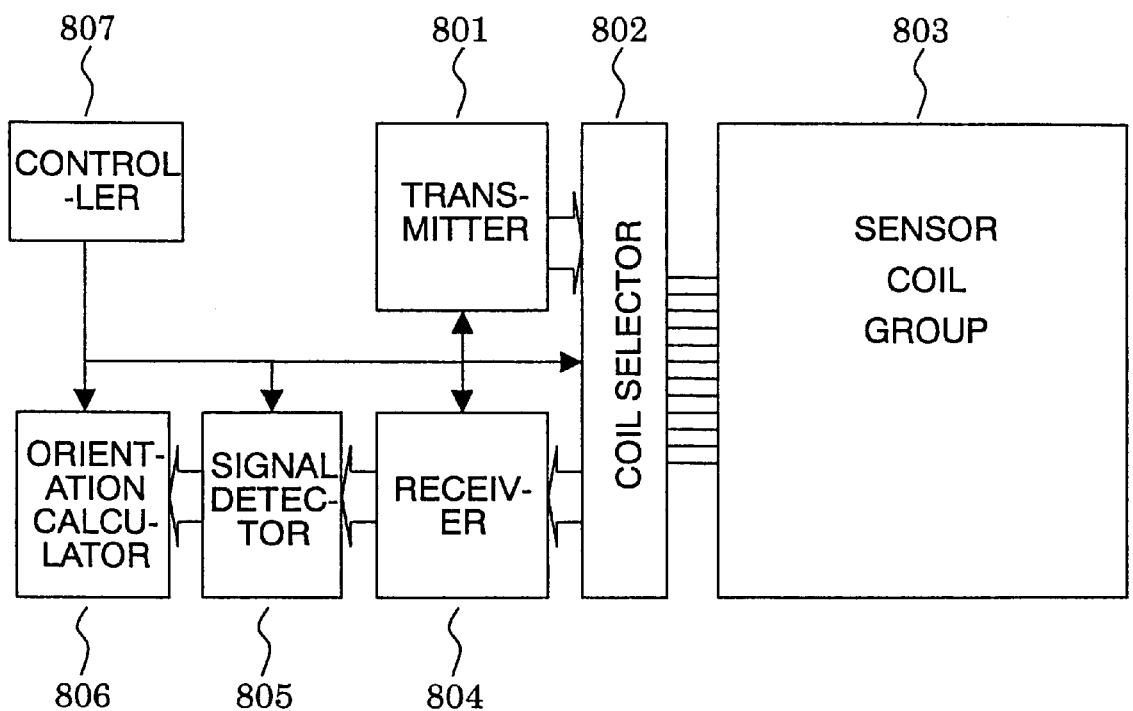
FIG. 8 is a block diagram illustrating an orientation-detecting unit according to an embodiment of the present invention.

FIG. 8 is a block diagram illustrating the orientation-detecting unit according to an embodiment of the present invention. The orientation-detecting unit is formed of the following elements. A transmitter 801, which serves as a signal forming device, sequentially and periodically transmits signals having the three resonant frequencies output from the orientation-designating device 101. A coil selector 802, which serves as a selection unit, sequentially and selectively supplies the signals from the transmitter 801 to the coils by changing the coils of a sensor coil group 803 consisting of the above-described sensor coils, the circular coils, and the donut-shaped coils. The sensor coils receive/detect electromagnetic wave(s) from device 101. The coil selector 802 also outputs the signal transmitted from the orientation-designating device 101 and received by the selected coil to a receiver 804. A signal receiver 805, which serves as a signal-receiving unit, receives the signal from the receiver 804. An orientation calculator 806, which serves as a calculating unit, calculates the orientation of the orientation-designating device 101 based on the signal from the signal receiver 805. A controller 807 controls the transmitter 801, the coil selector 802, the receiver 804, the signal receiver 805, and the orientation calculator 806.

The orientation calculator 806 and the controller 807 are formed by a central processing unit (CPU), which serves as a control unit. The orientation calculator 806 has a built-in storage device (not shown), which serves as a storage unit, which stores, as a table, various characteristic data (which will be discussed later) of the signal levels received by the sector coils, the circular coils C, and the donut-shaped coils D from the orientation-designating device 101.

Figure 9A:
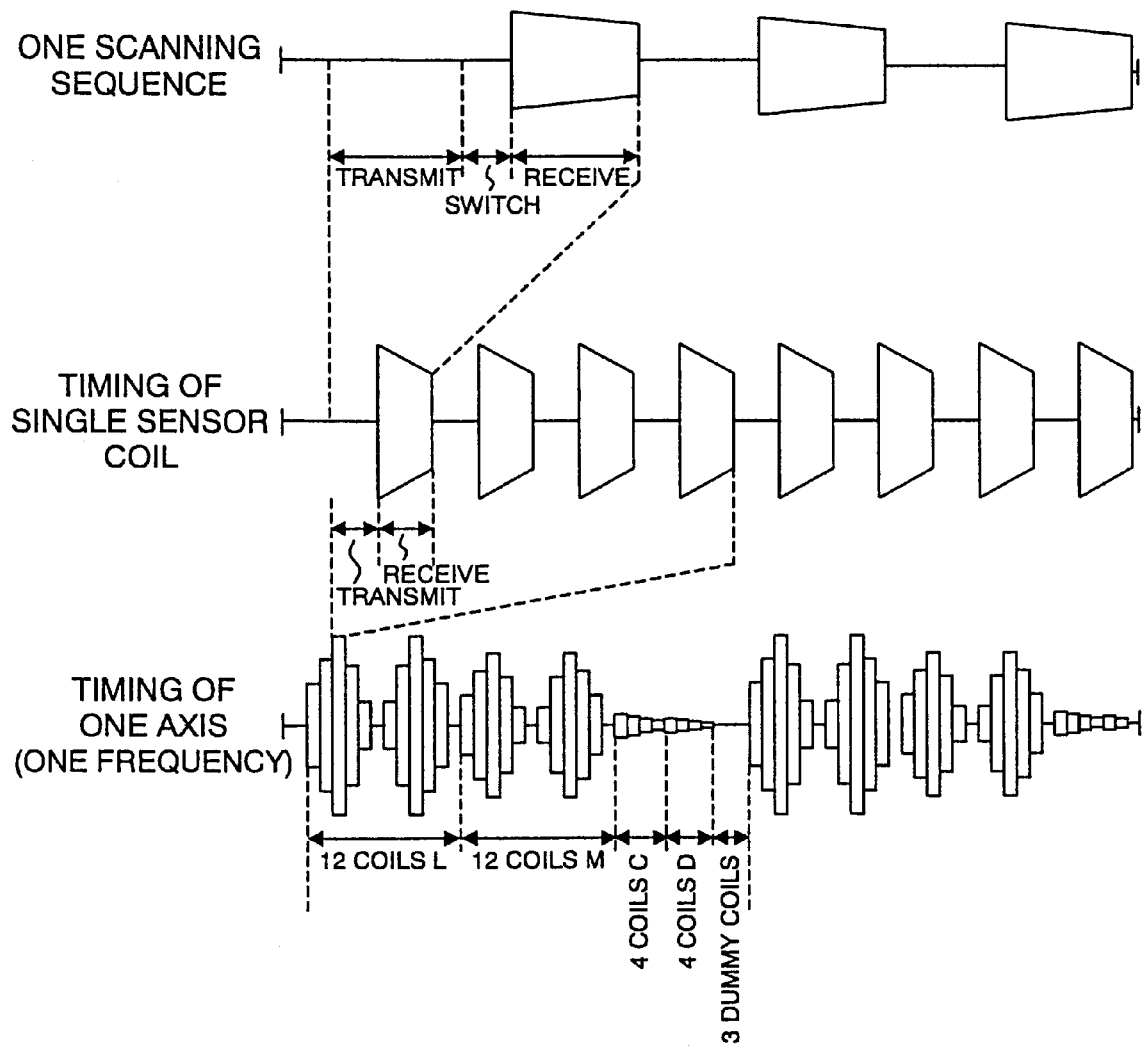
FIGS. 9A and 9B are timing charts illustrating the operation of an embodiment of the present invention.
Figure 9B:
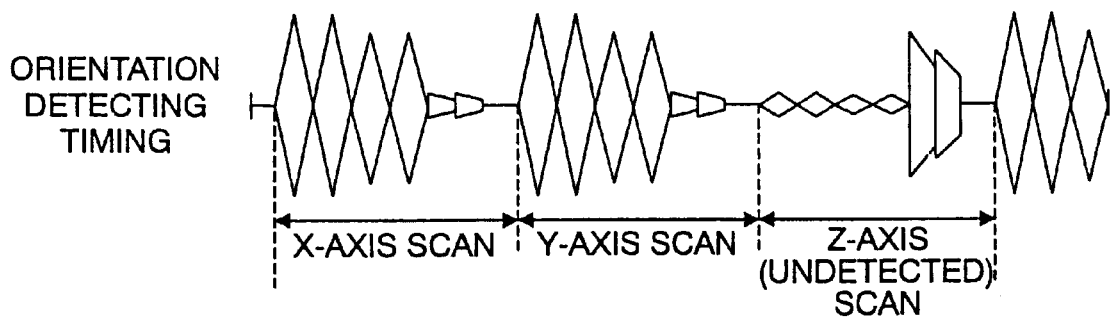

FIGS. 9A and 9B show timing charts illustrating the operation performed by an embodiment of the present invention. To detect the orientation of the orientation-designating device 101, the orientation detecting unit shown in FIG. 8 transmits a signal having a frequency corresponding to each of the resonant frequencies of the X-axis, Y-axis, and Z-axis orientation-designating coils 104 from the transmitter 801 via the wave generating coil selected from the sensor coil group 803 by the coil selector 802, and stores the data indicating the level of the signal received by the selected coil in a buffer memory. The above-mentioned data is processed to determine the orientation of the orientation-designating coil 104, thereby detecting the orientation of the orientation-designating device 101. The aforementioned operation is performed to obtain the signal level data received by the twelve sector coils L, the twelve sector coils M, the four circular coils C, the four donut-shaped coils D. The above-described operation is also performed to transmit the signals having three frequencies corresponding to the resonant frequencies of the X-axis, Y-axis, and Z-axis orientation-designating coils. As will be discussed below, for detecting the presence or the absence of the orientation-designating device 101, the orientation-detecting sensor 102 is wholly scanned (global scanning) by scanning all the coils or scanning part of the coils placed over a fixed interval. For detecting the detailed orientation of the orientation-designating device 101, only the coils exhibiting a predetermined level of signals are scanned (local scanning), each coil being scanned a plurality of times.

Although three dummy coils are scanned according to the timing chart illustrated in FIG. 9A, they are merely optional and are not necessarily scanned. FIG. 9B shows that the X-axis and Y-axis orientation-designating coils 104 are detectable (the received signal levels are high), while the Z-axis orientation-designating coil is not detectable (the received signal level is low).

FIGS. 10 through 21 are flow charts illustrating the operation of the CPU formed of the orientation calculator 806 and the controller 807.

Figure 26:
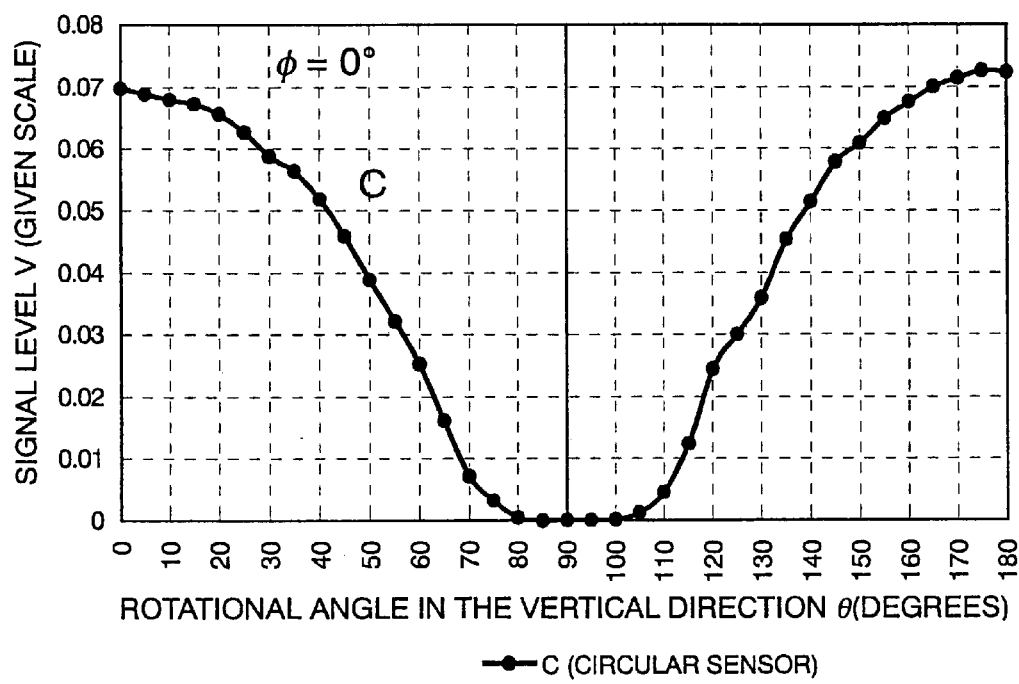
FIG. 26 is a characteristic diagram obtained when the orientation-designating device shown in FIG. 7 is used.
Figure 27:
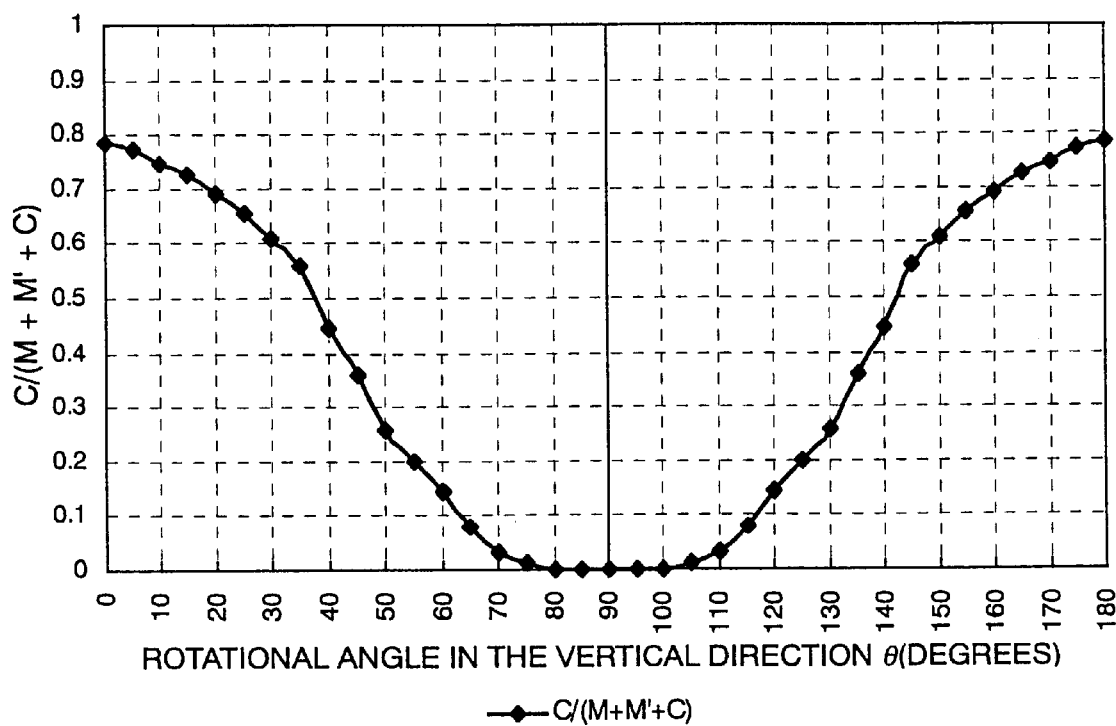
FIG. 27 is a characteristic diagram obtained when the orientation-designating device shown in FIG. 7 is used.
Figure 28:
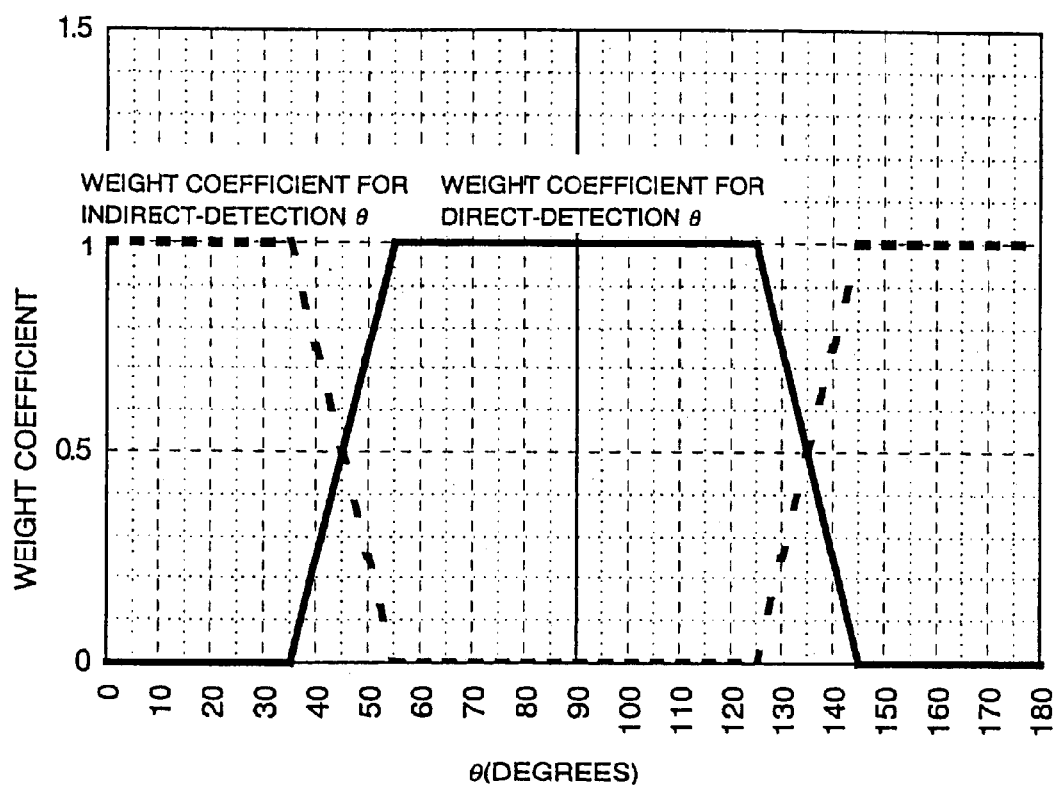
FIG. 28 is a diagram illustrating an orientation-detecting method employed by the orientation-designating device shown in FIG. 7.
Figure 29:
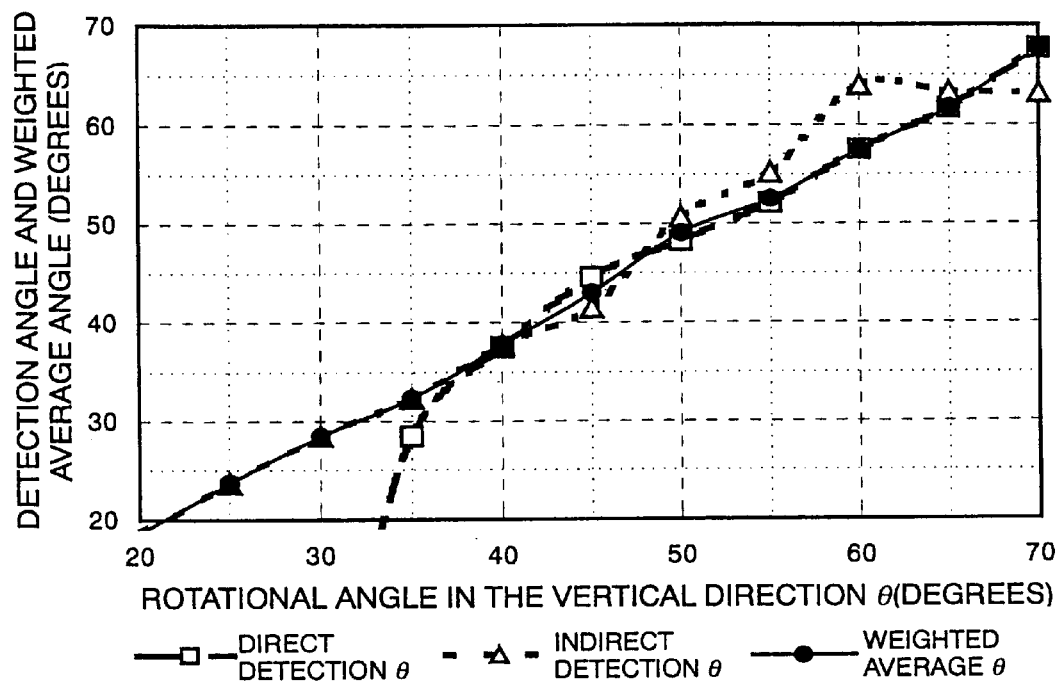
FIG. 29 is a characteristic diagram obtained when the orientation-designating device shown in FIG. 7 is used.

FIGS. 22 through 25 are diagrams illustrating the characteristics of the signals received by the sector coils L, M, L', and M' shown in FIG. 1. FIG. 26 is a diagram illustrating the characteristics of the circular coils shown in FIG. 5. FIGS. 27 through 29 are diagrams illustrating the operation of smoothly detecting the tilt angle $\theta$ by the orientation-designating device 101.

FIGS. 22 through 26 are characteristic diagrams illustrating the dependency of the levels of the signals received by the sector coils M and L upon the azimuth angle $\phi$ under the conditions that the diameter of the orientation-designating coil 104 is 47 mm, the frequency of the transmitting/receiving signals is 375 kHz, the tilt angle $\theta$ is 60 degrees, the diameter of the sphere 103 is 70 mm, and the bottom of the sphere 103 is placed 5 mm above the surface of the orientation-detecting sensor 102.

The operation of the embodiment of the present invention is described below with reference to FIGS. 1 through 29.

The orientation detecting operation is briefly discussed first. The orientation-designating device 101 is placed in a spherical recessed portion of the orientation-detecting sensor 102 in such a manner that the center of the orientation-designating device 101 matches the center position O of the orientation-detecting sensor 102. As stated above, the bottommost portion of the sphere 103 is positioned 5 mm above the surface of the orientation-detecting sensor 102.

In this state, a single resonant-frequency signal of the orientation-designating device 101 is transmitted from the transmitter 801 to the sector coil selected by the coil selector 802. The selected coil generates electromagnetic wave(s), which are received by coil 104. The alternating magnetic field generated from the orientation-designating coil 104 that resonates with the above signal is received by the sector coil, and the level of the received signal is stored in a buffer memory (not shown).

Thereafter, an operation similar to that described above is performed to sequentially select all the sector coils, thereby storing the levels of the received signals. The above-described operation is also performed for the two remaining resonant frequencies so as to store the levels of the received signals.

Figure 22:
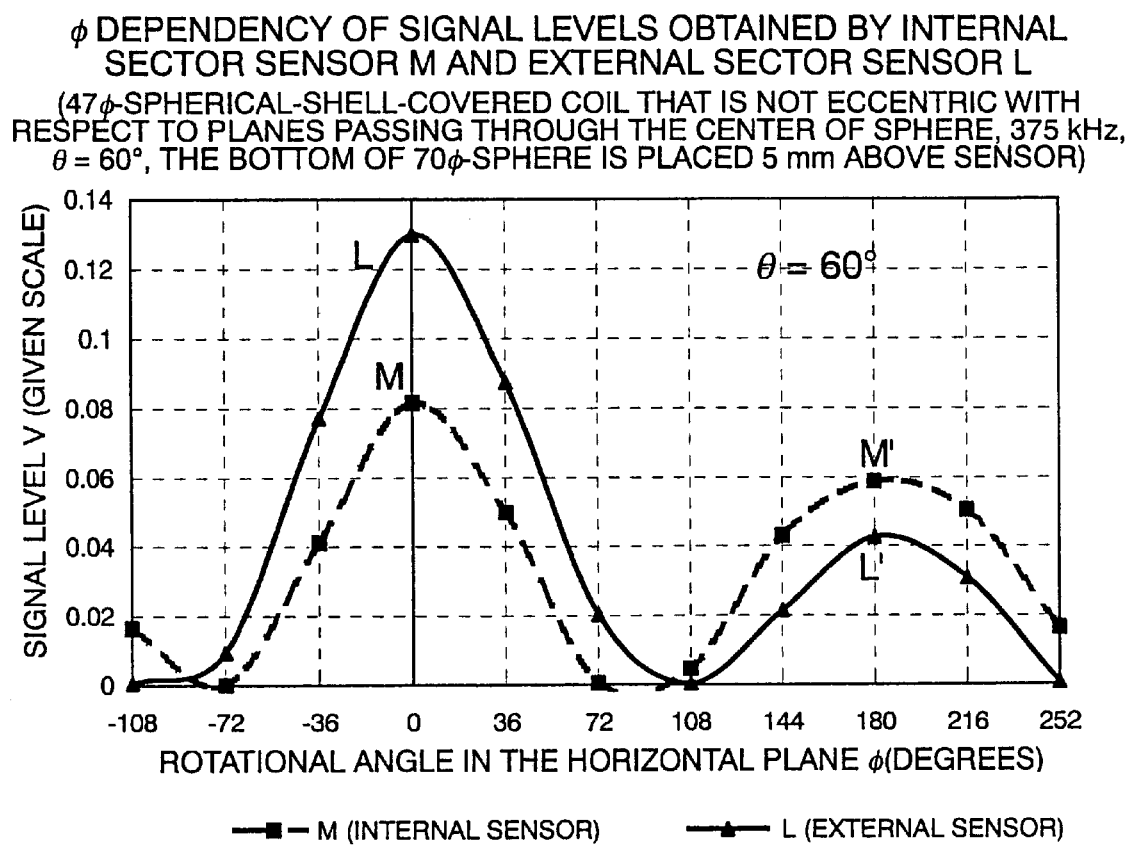
FIG. 22 is a characteristic diagram obtained when the orientation-designating device shown in FIG. 7 is used.

As shown in FIG. 22, the received signal of the large sector coil L exhibits two peaks at L and L', while the signal from the small sector coil M exhibits two peaks at M and M', the azimuth angles $\phi$ and the peak signal values being obtained for all peaks by parabolic approximation of the signals. The azimuth angle $\phi$ at which the peak of large coil L is exhibited represents the azimuth angle $\phi$ of a single orientation-designating coil.

Figure 24:
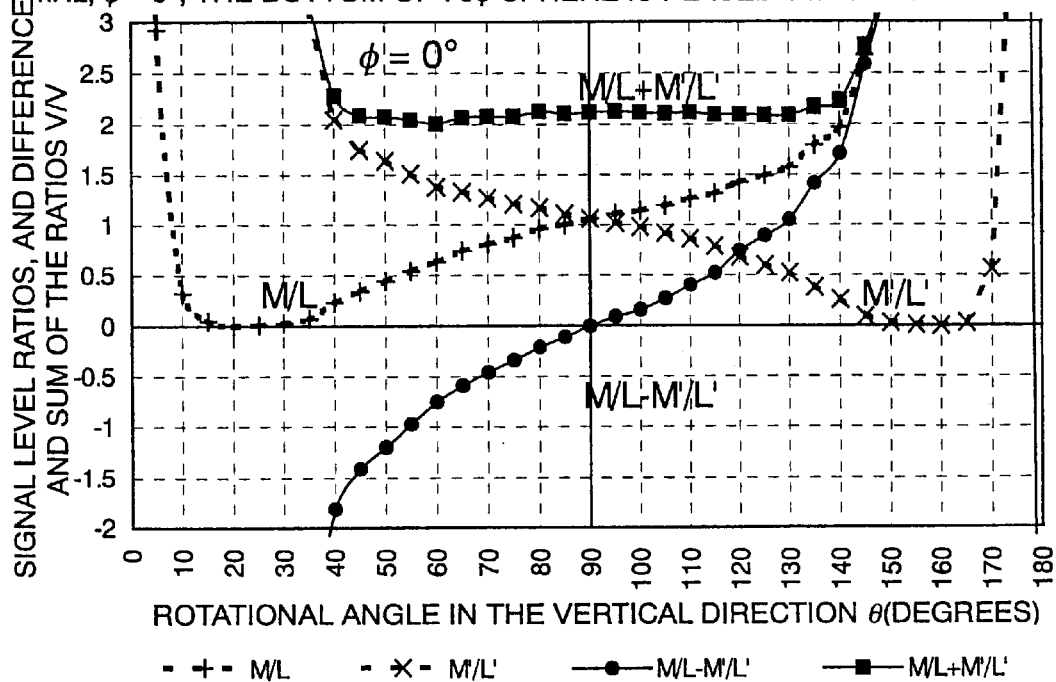
FIG. 24 is a characteristic diagram obtained when the orientation-designating device shown in FIG. 7 is used.

It is now assumed in FIG. 24 that the signal of the small sector coil and that of the large sector coil are indicated by M and L, respectively, and that the signal of the small sector coil and the large sector coil L' that are displaced from the sector coils M and L by 180 degrees in the azimuth angle $\phi$ direction are represented by M' and L', respectively. Then, the value of M/L–M'/L' changes substantially linearly over a wide range of tilt angles $\theta$ (40 degrees<$\theta$<140 degrees). The two greatest signals selected from the signals supplied from the three orientation-designating coils 104 of the orientation-designating device 101 to the sector coils reliably fall within the range of 40 degrees<$\theta$<140 degrees. Thus, by comparing the two greatest signals with the data stored in the storage device of the orientation calculator 806, the tilt angles $\theta$ of the two orientation-designating coils 104 can be detected. Likewise, the above-described azimuth angles $\phi$ of the two orientation-designating coils 104 can also be detected.

The azimuth angle $\phi$ of the third orientation-designating coil 104 is determined by the vector product of the azimuth vectors of the two orientation-designating coils obtained as discussed above.

It is impossible to determine on which side, i.e., the front side or the rear side, $\phi$ is positioned (i.e., $\phi$ or $\phi$+180 degrees), or $\theta$ is positioned (i.e., $\theta$ or 180 degrees–$\theta$). Thus, when power is first turned on or when the orientation-designating device 101 is first placed in the recessed portion, it is automatically set that the Z axis coil is directed in the northern hemisphere (0≦$\theta$≦90 degrees) and the X axis is directed in the eastern hemisphere (–90 degrees≦$\phi$≦90 degrees).

Subsequently, the azimuth angle $\phi$ is detected, and then, a value of $\phi$ closer to the previous value continues to be used. Accordingly, the detection angles of the orientation-designating coils 104 are smoothly changed. If extra sector coils are positioned close to the origin, $\theta$ can be detected in the whole range 0≦$\theta$≦180 degrees, and the provision of only two orientation-designating coils 104 is sufficient to detect the orientation-designating device 101.

According to the foregoing description, the orientations of the orientation-designating device 101 in three-dimensional space, i.e., the direction vectors of the three orientation-designating coils, are obtained as absolute values, thereby making it possible to control absolute orientations of an object on a display unit of a computer or a computer-aided design (CAD) system. The orientations of the orientation-designating device 101 can be input by detecting the absolute rotational angles of the three axes of the orientation-designating device 101. Additionally, since the absolute angles over the whole range can be detected, the position of an object on a display unit can be input as absolute angles.

In addition to the sector coils, circular coils may be disposed around the center position O, and then, all the orientation-designating coils can be detected in a range 0≦$\theta$≦180 degrees, thereby improving the precision. It is also possible to detect the orientation of the orientation-designating device 101 merely by the use of two orientation-designating coils.

In addition to the sector coils and the circular coils, donut-shaped coils may be disposed around the center position O, and then, all the orientation-designating coils can be detected in a range $0 \leq \theta \leq 180$ degrees since the donut-shaped coils serve a function similar to that of the circular coils, thereby enhancing the precision. It is also possible to detect the orientation of the orientation-designating device 101 merely by the use of two orientation-designating coils.

A description is now given of the basic operation performed in detecting the azimuth angle $\phi$ and the tilt angle $\theta$. A method for detecting the azimuth angle $\phi$ is first discussed.

When the orientation-designating coils 104 of the orientation-designating device 101 are not eccentric with respect to planes passing through the center of the sphere 103, as illustrated in FIG. 7, the dependency characteristics of the signals received by the L and M sector coils upon the azimuth angle $\phi$ change, as shown in FIG. 22 ($\phi$ is indicated on the horizontal axis having a 360-degree full scale, and $\theta$ is 60 degrees). The maximum values of the signals received by the sector coils L and M are detected, and those received by the adjacent sector coils are also detected. The peak signal values of those sector coils obtained by quadratic approximation give the rotational angles in the horizontal plane, i.e., the azimuth angles $\phi$.

In this case, the received signals of the sector coils L and M located in front of the orientation-designating coils 104 and the received signals of the sector coils L' and M' located at the rear of the orientation-designating coils 104, which are located symmetrically to the sector coils L and M with respect to the center position O, are influenced by the rotational angle of the orientation-designating coil 104, i.e., the tilt angle This replaces the magnitudes of the received signals from the sector coils L and M by those of the received signals from the sector coils L' and M', and vice versa. Since the sector coil facing the orientation-designating coil 104 exhibits the greatest signal magnitude, the azimuth angle $\phi$ corresponding to the peak signal obtained from the sector coil L represents the azimuth angle $\phi$ of the orientation-designating device 101, as shown in FIG. 22.

The operation of detecting the tilt angle $\theta$ of the orientation-designating device 101 is as follows. The dependency characteristics of the signals received by the sector sensors L and M upon the tilt angle $\theta$ change, as illustrated in FIG. 23 ($\theta$ is indicated on the horizontal axis ranging from 0 to 180 degrees, and $\phi$ is 0 degrees or 180 degrees). The signal levels received by the sector coils L and M are varied while being dependent upon the rotational angle $\theta$ in the vertical direction of the orientation-designating coils 104 of the orientation-designating device 101. FIG. 23 shows that the peak signal is shifted in the order of the sector coil L, the sector coil M, the sector coil M', and the sector coil L' as the tilt angle $\theta$ changes from 0 degrees to 180 degrees.

When the tilt angle $\theta$ formed between the sector coil and the orientation-designating coil 104 changes, the ratio M/L of the received signals from the sector coils M and L and the ratio M'/L' of the received signals from the sector coils L' and M' are varied, as shown in FIG. 24 ($\phi$ is 0 degrees).

The difference between the above-mentioned ratios (M/L−M'/L') changes substantially linearly with respect to the tilt angle $\theta$, as illustrated in FIG. 24. Accordingly, the characteristic data of this change is stored in the storage device of the orientation calculator 806, and by comparing the data obtained by actual measurements with the stored data (by referring to the table), the tilt angle $\theta$ of the orientation-designating device 101 can be calculated.

Figure 25:
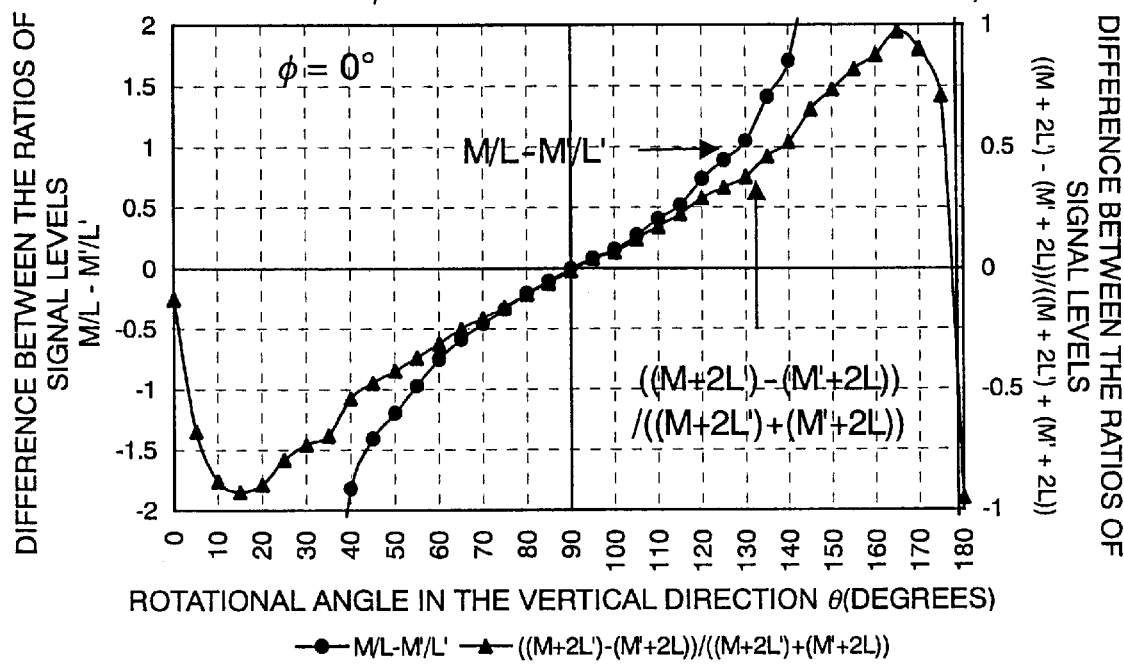
FIG. 25 is a characteristic diagram obtained when the orientation-designating device shown in FIG. 7 is used.

The expression ((M+2L')−(M'+2L))/((M+2L')+(M'+2L)) exhibits a higher level of linearity, as shown in FIG. 25. Thus, by using this expression, the tilt angle $\theta$ can be detected with higher precision.

The dependency characteristics of the signal level received by the circular coil C upon the tilt angle $\theta$ are varied ($\theta$ is indicated on the horizontal axis ranging from 0 to 180 degrees, and $\phi$ is 0 degrees), as illustrated in FIG. 26. It is difficult to detect the tilt angle $\theta$ and the azimuth angle $\phi$ when the tilt angle $\theta$ is in the vicinity of 0 degrees or 180 degrees. The two smallest levels of the received signals selected from the signals received by the circular sensor C from the three orientation-designating coils 104 reliably fall within a range from 40 to 140 degrees. That is, two orientation-designating coils 104 of the orientation-designating device 101 can be selected by detecting the signal levels received by the circular coil C. Then, based on FIGS. 22 and 24 or 25, the tilt angles $\theta$ and the azimuth angles $\phi$ of the two orientation-designating coils 104 can be calculated from the signal levels obtained from the two orientation-designating coils 104 by referring to the data and the table stored in the storage device of the orientation calculator 806.

However, since the tilt angles $\theta$ and the azimuth angles $\phi$ each take two values, it is impossible to determine towards which side, i.e., the front side or the rear side, the orientation-designating device 101 is directed. In this case, the values closer to the previously calculated tilt angle $\theta$ and the azimuth angle $\phi$ can be employed.

Once the tilt angles $\theta$ and the azimuth angles $\phi$ of the two orientation-designating coils 104 are detected, the direction vectors thereof can be calculated. Then, the direction vector of the third orientation-designating coil 104 can be found from the vector product of the two known direction vectors.

The azimuth angle $\phi$ and the tilt angle $\theta$, which were initially detected when power was turned on or when the orientation-designating device 101 was placed in the center position, are initialized in such a manner that the Z-axis orientation-designating coil 104 is directed in the northern hemisphere ($0 \leq \theta \leq 90$ degrees) and the X-axis orientation-designating coil 104 is directed in the eastern hemisphere ($−90$ degrees$\leq \phi \leq 90$ degrees). It is thus possible to detect the orientation of the orientation-designating device 101 in three-dimensional space.

According to the above-described detection method, as stated above, the vector of the third orientation-designating coil 104 is calculated by detecting the two orientation-designating coils 104, thereby determining the vectors of the orientation-designating device 101. In this case, detection errors may occur.

In detecting the orientation of the orientation-designating device 101 when it is newly rotated after the occurrence of detection errors, the following problem may arise. If the direction of the third orientation-designating coil 104 is calculated by utilizing orientation-designating coils 104 different from the previously detected orientation-designating coils 104, the calculated vectors of the orientation-designating device 101 seriously deviate from the correct orientation, and there is a great difference between the calculated vectors and the previously calculated vectors even if the orientation-designating device 101 has been only slightly rotated.

More specifically, in selecting two orientation-designating coils 104 corresponding to the smaller signals obtained by the circular sensor C, the two selected orientation-designating coils 104 are swapped for a range of angles 45 degrees<θ<54 degrees or for a range of angles 126 degrees<θ<135 degrees, due to a geometric restriction of the three orientation-designating coils orthogonal to each other.

In swapping the orientation-designating coils 104, a slight difference is generated between the tilt angle θ and the azimuth angle φ which are directly detected by the orientation-detecting coils (hereinafter referred to as the "direct-detection θ" and "direct-detection φ") and the tilt angle θ and the azimuth angle φ calculated by the vector product of the other two orientation-designating coils 104 (hereinafter referred to as the "indirect-detection θ and "indirect-detection φ"), respectively. To eliminate this difference, the following processing is executed.

More specifically, the swapping angle of the orientation-designating coils 104 is first fixed, and the tilt angles θ are roughly detected. Then, weight coefficients α and β stored in the storage device are obtained by referring to the table.

Then, the tilt angles θ and the azimuth angles φ (direct-detection θ and direct-detection φ) are detected for all the orientation-designating coils 104 that fall within a range of 30 degrees<θ<150 degrees. If direct-detection θ and direct-detection φ of the three orientation-designating coils 104 have been obtained, the tilt angle θ and the azimuth angle φ (indirect-detection θ and indirect-detection φ) of the third orientation-designating coil 104 are also detected by the vector product of the other two orientation-designating coils 104.

Further, the tilt angles θ and the azimuth angles φ are weighted according to the following equations, thereby smoothly obtaining the angles θ and φ. The angle θ is given by:

θ=(direct-detection θ)×(weight coefficient α of the direct detection)+(indirect-detection θ)×(weight coefficient β of the indirect detection)

wherein the sum of the weight coefficient α of the direct-detection and the weight coefficient β of the indirect-detection is one. The angle φ is given by:

φ=(direct-detection φ)×(weight coefficient α of the direct detection)+(indirect-detection φ)×(weight coefficient β of the indirect detection)

wherein the sum of the weight coefficient α of the direct detection and the weight coefficient β of the indirect detection is one.

This is described in greater detail below with reference to FIGS. 27 through 29. To roughly detect the initial tilt angle θ, C/(M+M'+C) shown in FIG. 27 is used, wherein C indicates the signal level received by the circular sensor C, while M and M' represent the signal levels received by the sensor coils M and M', respectively.

Subsequently, trapezoidal weight coefficients that are changed linearly when the tilt angle θ ranges from 35 degrees to 55 degrees and from 125 degrees to 145 degrees are assigned, as shown in FIG. 28. It should be noted that the sum of the direct-detection weight coefficient and the indirect-detection weight coefficient concerning the tilt angle θ is one.

By using the above-described weight coefficients, the tilt angle θ and the azimuth angle φ are calculated according to the aforementioned equations. An example of the tilt angle θ obtained as described above is shown in FIG. 29. FIG. 29 reveals that the tilt angle obtained (weighted average θ) approximates closely to the direct-detection θ, and thus smoothly changes even if the orientation-designating coils 104 are swapped.

Since the donut-shaped coil D has a function similar to that of the circular coil C, the above-described operation may be performed by using the donut-shaped coil D instead of or together with the circular coil C. In this case, at least one of the circular coil C and the donut-shaped coil D should be provided for the orientation-detecting sensor 102.

A detailed description is now given of the operation of the CPU formed of the orientation calculator 806 and the controller 807.

Figure 10:
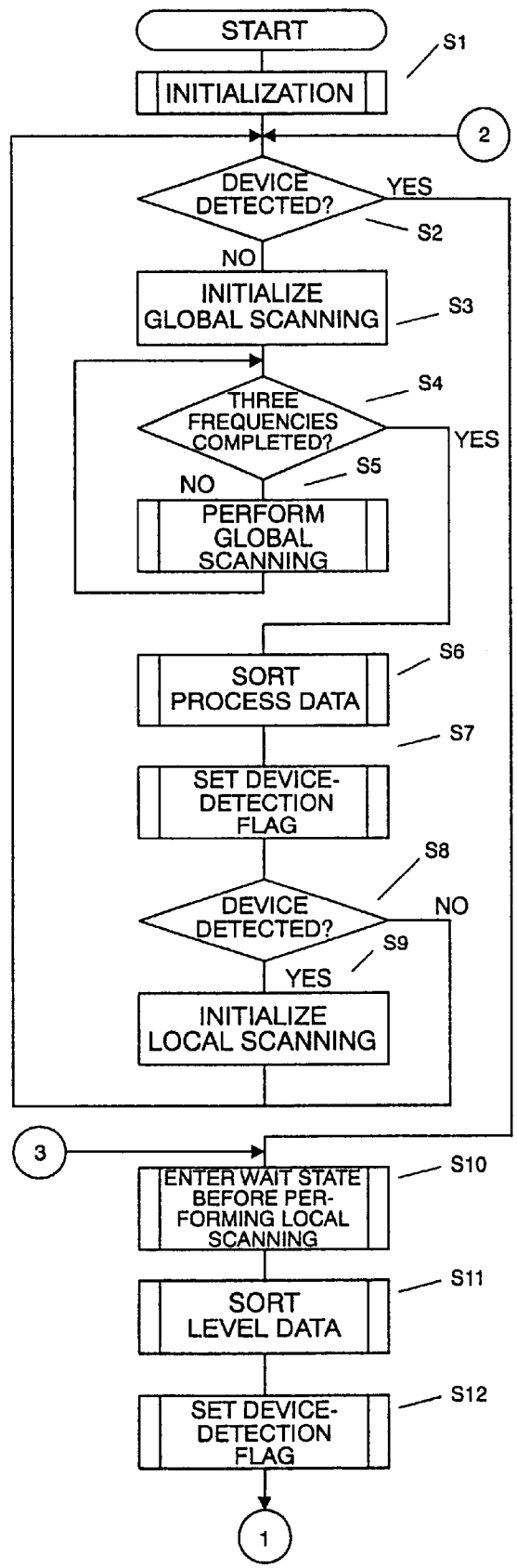
FIGS. 10 and 11 are flow charts illustrating main processing executed by a CPU according to an embodiment of the present invention.
Figure 11:
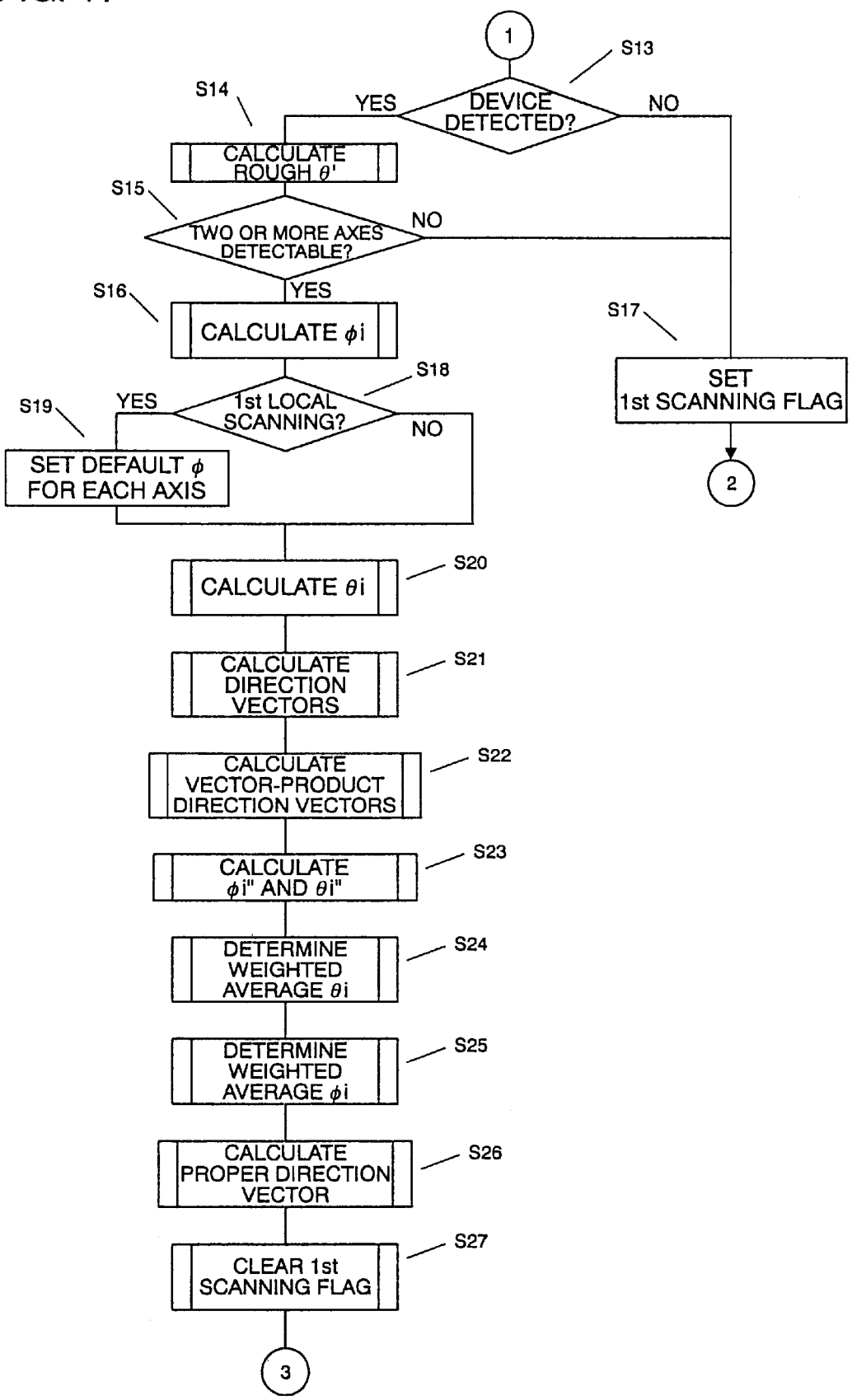

FIGS. 10 and 11 are flow charts illustrating the main processing executed by the CPU. In FIG. 10, the CPU, peripheral devices, and the buffer memory of the orientation calculator 806 are initialized in step S1.

Then, it is determined in step S2 by performing rough scanning on the sensor coils of the orientation-detecting sensor 102 (global scanning) whether the orientation-designating device 101 is placed in the recessed portion. More specifically, if it is found in step S2 by referring to a device-detection flag that the orientation-designating device 101 has been detected, the local-scanning operation, which will be discussed later, is started. If the orientation-detecting device 101 is not detected, the global-scanning operation is initialized in step S3.

As shown in FIGS. 9A and 9B, to detect the orientation of the orientation-designating device 101, the signal frequencies corresponding to the X-axis, Y-axis, and Z-axis orientation-designating coils 104 are sequentially transmitted from the sensor coils of the orientation-detecting device, and the resulting received-signal data obtained by the orientation-designating coils 104 are stored in the buffer memory in steps S4 and S5. The aforementioned operation is performed for the three frequencies corresponding to the resonant frequencies of the X-axis, Y-axis, and Z-axis orientation-designating coils 104.

Thereafter, in step S6, sorting is executed by correcting the level data obtained by the individual sensor coils.

Then, by using the signal received by the circular coil, in step S7, it is determined whether the level data exceeds a threshold, and if the determination result is yes, the device-detection flag is set. It is then determined in step S8 by the device-detection flag whether the orientation-designating device 101 has been detected. if the outcome of step S8 is yes, the process proceeds to step S9 in which the local-scanning operation is initialized, and the preparations are made for shifting the operation from global scanning to local scanning. The aforementioned operation is repeated until it is found in step S2 that the orientation-designating device 101 has been detected.

The operation is then shifted to local scanning. Local scanning is a detailed scanning operation performed, based on the received signal obtained by the above-described global scanning, on part of the signal, such as the peak signal, required for detecting an orientation of the orientation-designating device 101 (for example, part of the signal is scanned a plurality of times).

According to local scanning, by transmitting and receiving signals between the sensor coils and the orientation-designating coils 104, the process waits until all the signal level data has been received in step S10. Upon receiving all the signal level data, the data is corrected and sorted in step S11. A determination is then made by using the signal received by the circular coil whether the level data exceeds a threshold, and if the result is yes, the device-detection flag is set in step S12.

Subsequently, it is determined in step S13 by the device-detection flag whether the orientation-designating device 101 has been detected. If the outcome of step S13 is no, a first scanning flag is set in step S17, and the process returns to step S2 so as to perform the global-scanning operation. Then, the level data corresponding to the frequency of each of the X-axis, Y-axis, and Z-axis orientation-designating coils 104 obtained by the circular sensor coil C is added to the level data obtained by the sector sensor coil M. According to the resulting sum, the tilt angle θ of each axis is roughly calculated, and is set as the angle θ' (see FIG. 27). If the angle θ' falls within the rotational angles from 30 degrees to 150 degrees, a flag corresponding to the detected axis (detection-axis flag) is set in step S14.

It is then determined from the detection-axis flag in step S15 whether two or more axes can be detected. If the result of step S15 is no, the first scanning flag is set in step S17, and the process returns to step S2 so as to perform global scanning.

If it is found in step S15 that two or more axes can be detected, calculations are made in step S16 according to the level data of the detection axes, thereby obtaining the azimuth angles corresponding to the peak signals, i.e., the azimuth angles φ1 and φ2 of the front side and the rear side, respectively.

A determination is then made in step S18 from the first scanning flag whether the operation to be performed is the first local-scanning operation after being shifted from global scanning. If the operation is not the first local-scanning operation, the process proceeds to step S20, which will be discussed later. If the operation is the first local-scanning operation, the process proceeds to step S19 in which a default value is substituted into the azimuth angle φ data obtained by the previous scanning operation so as to determine the front side. Thereafter, the direction of the azimuth angle φ is maintained so as to determine the front side or the rear side of the axis of the orientation-designating device 101.

Then, in step S20, the tilt angles θ1 and θ2 of the front side and the rear side, respectively, of each axis, as viewed from the azimuth angles φ1 and φ2, are determined.

Subsequently, direction vectors 1 and 2 of the detectable axes are determined according to the azimuth angles φ1 and φ2 and the tilt angles θ1 and θ2 of the detectable axes. In step S21, the direction vectors 1 and 2 of an undetectable axis are determined by the vector product of the direction vectors 1 and 2 of the other two detectable axes. As a result, the direction vectors of the three axes can be reliably calculated. Then, in step S22, the vector product direction vectors 1 and 2 of each axis are determined by the vector product of the direction vectors of the other two axes.

Thereafter, in step S23, indirect-detection φ1" and φ2" are determined by inversely calculating the vector product direction vectors 1 and 2 of each axis. Similarly, indirect-detection θ1" and θ2" are obtained from the vector product direction vectors 1 and 2.

Then, in step S24, weighted averages are determined for direct-detection θ1 and θ2 obtained by the signal level data of each axis and indirect-detection θ1" and θ2" calculated from the vector product direction vectors 1 and 2, respectively (see the above-described equation), thereby determining φ1n and θ2n.

Subsequently, in step S25, weighted averages are determined for direct-detection φ1 and φ2 obtained by the signal level data of each axis and indirect-detection φ1" and φ2" calculated from the vector product direction vectors 1 and 2, respectively (see the above-described equation), thereby determining φ1n and φ2n.

Then, in step S26, by using φ1n, φ2n, θ1n, and θ2n obtained as described above, the proper direction vectors 1 and 2 are determined. In this case, the proper direction vectors 1 and 2 are compared with the direction vector detected by the previous scanning operation, and one of the vectors 1 and 2 which is closer to the previous vector is used as the direction vector of the orientation-designating device 101. To compare this direction vector with a direction vector to be obtained by the subsequent scanning operation, it is stored as the direction vector obtained by the previous scanning operation in the buffer.

In step S27, the first scanning flag is cleared, and the process returns to step S10.

Figure 12:
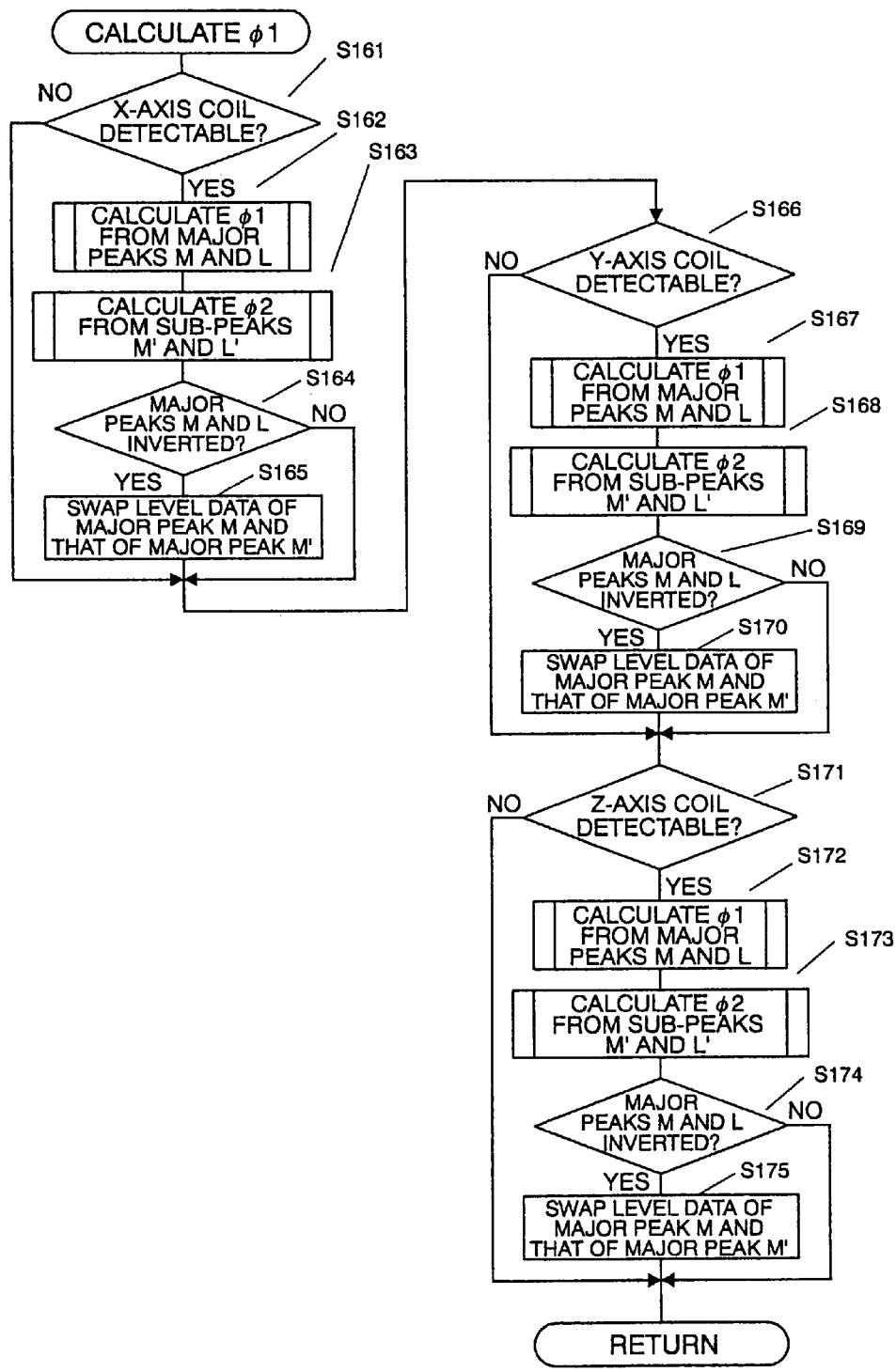
FIG. 12 is a flow chart illustrating sub-processing executed by the CPU according to an embodiment of the present invention.

FIG. 12 is a flow chart illustrating a detailed operation of detecting the azimuth angle φi shown in step S16 of FIG. 11.

It is first determined in step S161 by referring to the detection-axis flag whether the X-axis coil of the orientation-designating device 101 is detectable. If the result of step S161 is no, the process proceeds to step S166.

If it is found in step S161 that the X-axis coil is detectable, the process proceeds to step S162 in which the higher peak of the two peaks of the signal level data obtained by the large sector coil L is determined to be the major peak L, and the higher peak of the two peaks of the signal level data obtained by the small sector coil M is determined to be the major peak M. Then, the azimuth angle φ1 is calculated according to the major peak L.

In step S163, the peak located opposite to the major peak L is determined to be the sub-peak L', and the azimuth angle φ2 is calculated according to the sub-peak L'.

When the maximum peak levels of the sector sensor coil L and that of the sector sensor coil M are determined to be the major peaks, the direction of the major peak L and the direction of the major peak M may be inverted through 180 degrees. Then, to form a pair from the sector sensor coils M and L having the same direction, it is determined in step S164 whether the major peak M and the major peak L are inverted. If the outcome of step S164 is yes, the process proceeds to step S165 in which the level data of the major peak M of the sensor coil M and that of the major peak M' of the sensor coil M' are swapped.

Thereafter, processing similar to that discussed above is executed for the Y-axis coil in steps S166 through S170 and for the Z-axis coil in steps S171 through S175. According to the aforementioned processing, the azimuth angle φi can be obtained.

Figure 13:
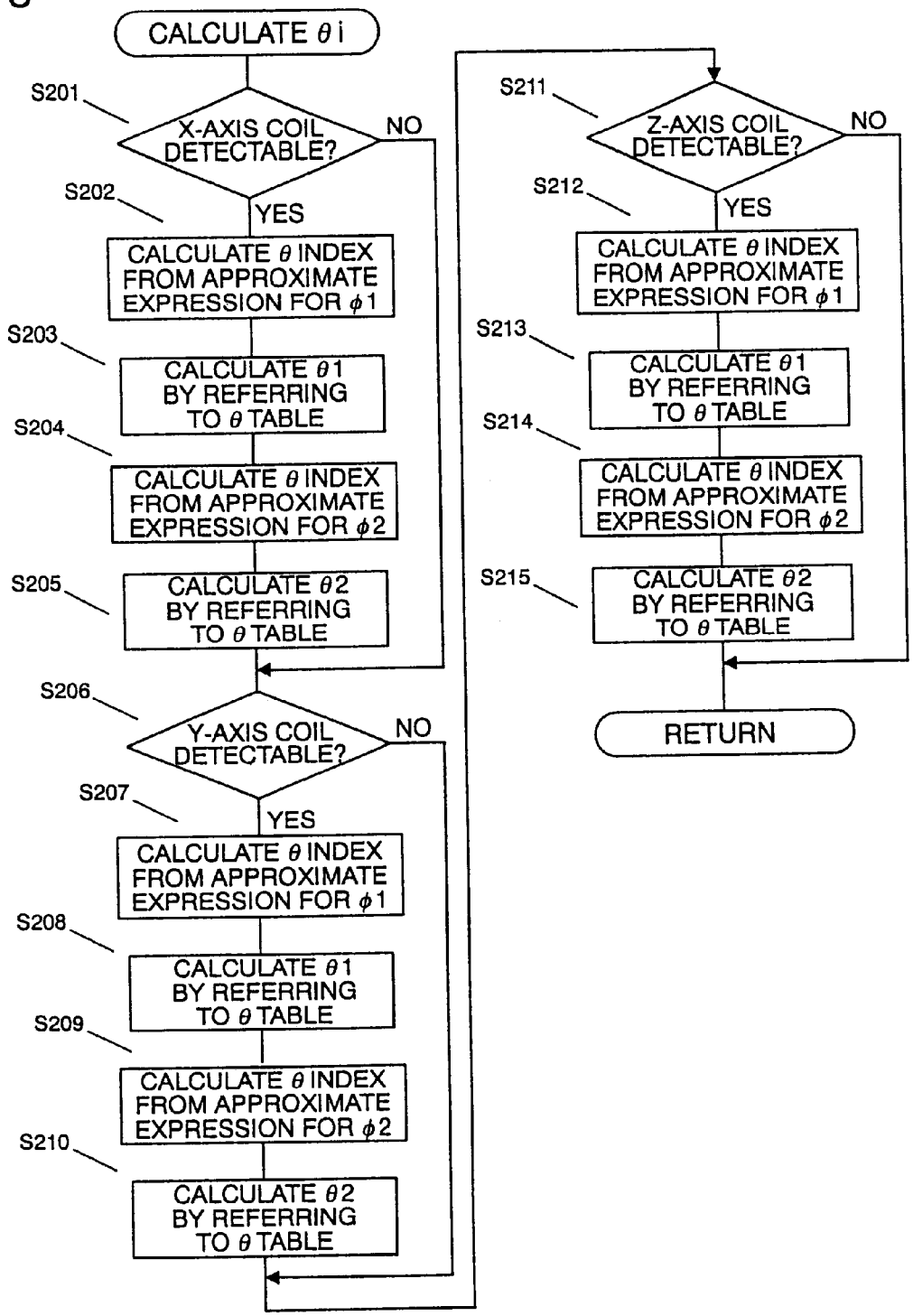
FIG. 13 is a flow chart illustrating sub-processing executed by the CPU according to an embodiment of the present invention.

FIG. 13 is a flow chart illustrating a detailed operation of detecting the tilt angle θi shown in step S20 of FIG. 11.

A determination is first made in step S201 by referring to the detection-axis flag whether the X-axis coil of the orientation-designating device 101 is detectable. If the X-axis coil is undetectable, the process proceeds to step S206.

If it is found in step S201 that the X-axis coil is detectable, the process proceeds to step S202 in which an index is calculated by using the level ratio of the major peak and the sub-peak for the horizontal rotational angle φ1. Then, in step S203, the tilt angle θ1 is determined by referring to the table according to the above-mentioned index.

Thereafter, in step S204, processing similar to that stated above is executed to calculate an index by using the level ratio of the major peak and the sub-peak, and in step S205, the tilt angle θ2 is obtained by referring to the table according to the index.

Likewise, processing similar to that stated above is executed for the Y-axis coil in steps S206 through S210 and for the Z-axis coil in steps S211 through S215. The tilt angle θi is thus obtained according to the aforementioned operation.

Figure 14:
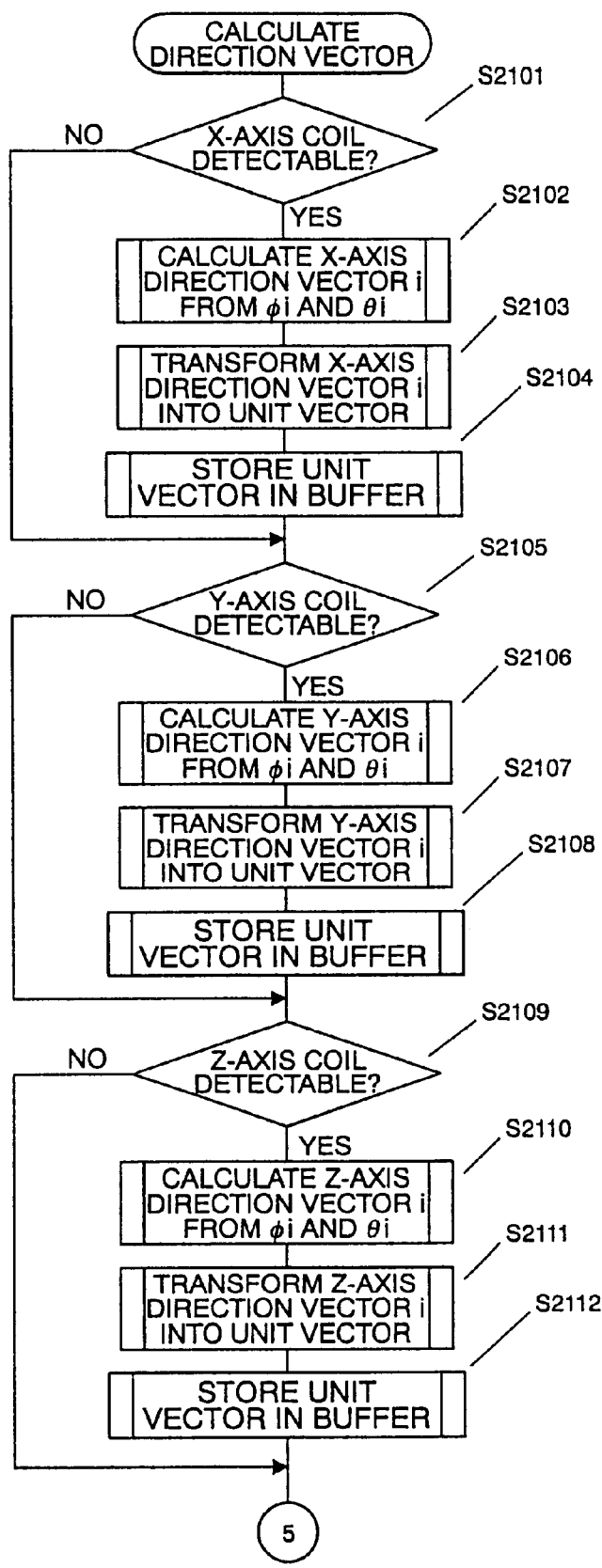
FIG. 14 is a flow chart illustrating sub-processing executed by the CPU according to an embodiment of the present invention.
Figure 15:
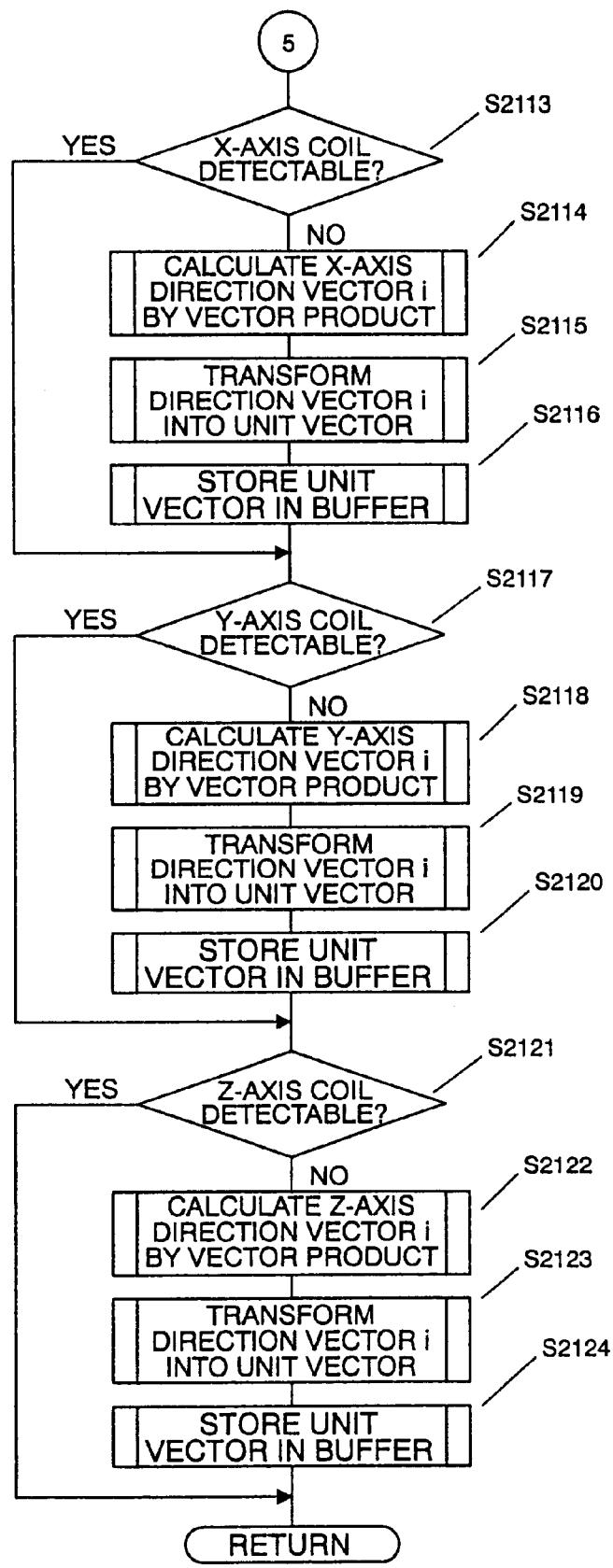
FIG. 15 is a flow chart illustrating sub-processing executed by the CPU according to an embodiment of the present invention.

FIGS. 14 and 15 are flow charts illustrating a detailed operation of calculating the direction vectors shown in step S21 of FIG. 11.

It is first determined in step S2101 by referring to the detection-axis flag whether the X-axis coil is detectable. If the result of step S2101 is no, the process proceeds to step S2105.

If it is found in step S2101 that the X-axis coil is detectable, the process proceeds to step S2102 in which the X-axis direction vector 1 is calculated from the angles $\phi$1 and $\theta$1 of the X-axis coil, and also, the X-axis direction vector 2 is calculated from the angles $\phi$2 and $\theta$2 of the X-axis coil. Then, in step S2103, the X-axis direction vectors 1 and 2 are transformed into unit vectors, and in step S2104, the unit vectors are stored in the buffer as the X-axis detected direction vectors 1 and 2.

Processing similar to that described above is performed for the Y-axis coil in steps S2105 through S2108 and for the Z-axis coil in steps S2109 through S2112.

Subsequently, as illustrated in FIG. 15, it is determined in step S2113 by referring to the detection-axis flag whether the X-axis coil is detectable. If the outcome of step S2113 is yes, the process proceeds to step S2117 by skipping the processing from steps S2114 to S2116.

If it is found in step S2113 that the X-axis coil is undetectable, the process proceeds to step S2114 in which the X-axis direction vectors 1 and 2 are calculated by the vector product of the Y-axis data and the Z-axis data. Then, in step S2115, the X-axis direction vectors 1 and 2 are transformed into unit vectors, and in step S2116, the unit vectors are stored in the buffer as the X-axis detected direction vectors 1 and 2.

Processing similar to that discussed above is executed for the Y-axis coil in steps S2117 through S2120 and for the Z-axis coil in steps S2121 through S2124.

Figure 16:
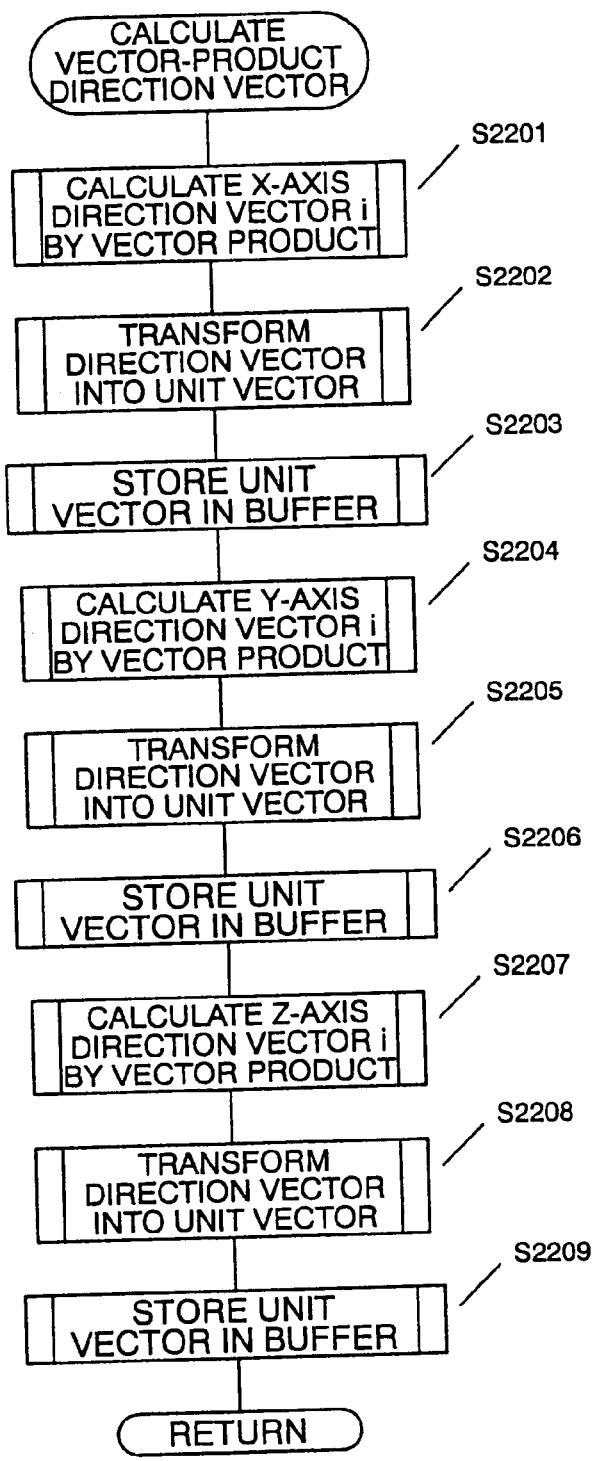
FIG. 16 is a flow chart illustrating sub-processing executed by the CPU according to an embodiment of the present invention.

FIG. 16 is a flow chart illustrating a detailed operation of calculating the vector product direction vector shown in step S22 of FIG. 11. In step S2201, the X-axis direction vectors 1 and 2 are calculated by the vector product of the Y-axis and Z-axis direction vectors. Then, in step S2202, the X-axis direction vectors 1 and 2 are transformed into X-axis unit vectors, and in step S2203, the unit vectors are stored in the buffer as the X-axis vector product direction vectors 1 and 2. Thereafter, processing similar to that discussed above is executed for the Y-axis coil in steps S2204 through S2206 and for the Z-axis coil in steps S2207 through S2209.

Figure 17:
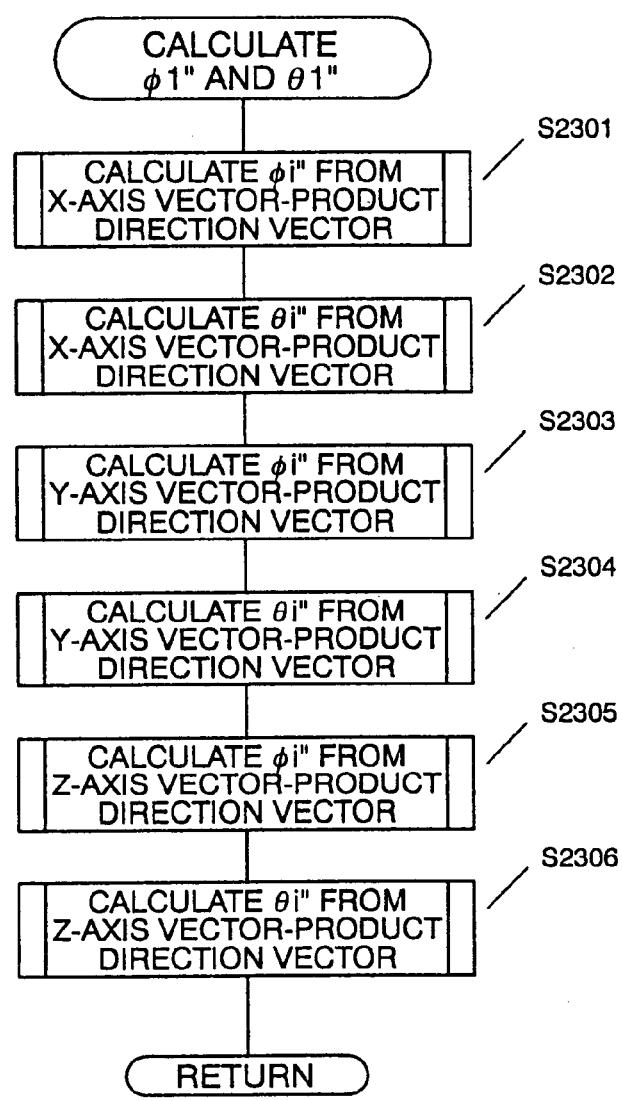
FIG. 17 is a flow chart illustrating sub-processing executed by the CPU according to an embodiment of the present invention.

FIG. 17 is a flow chart illustrating a detailed operation of calculating indirect-detection $\phi$" and $\theta$" shown in step S23 of FIG. 11. In step S2301, indirect-detection $\phi$1" and $\phi$2" are obtained by inversely calculating the X-axis vector-product direction vectors 1 and 2. Then, in step S2302, indirect-detection $\theta$1" and $\theta$2" are obtained by inversely calculating the X-axis vector-product direction vectors 1 and 2. Thereafter, processing similar to that described above is executed for the Y-axis coil in steps S2302 and S2304 and for the Z-axis coil for in steps S2305 and S2306.

Figure 18:
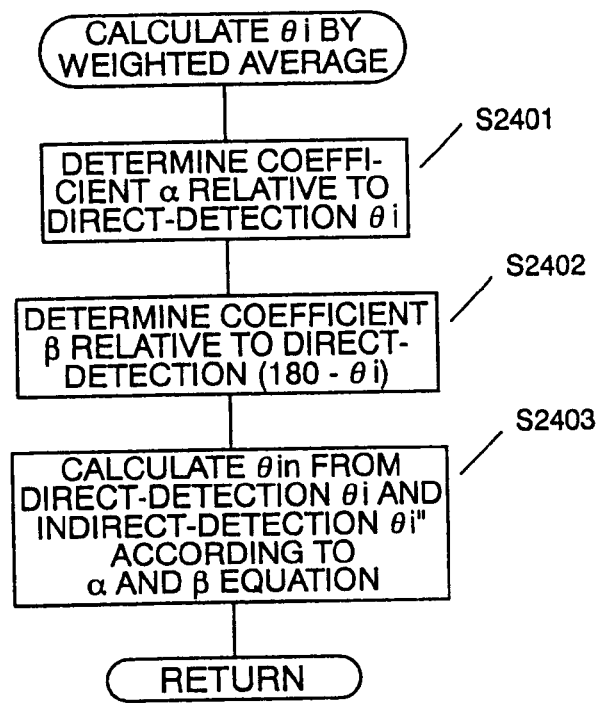
FIG. 18 is a flow chart illustrating sub-processing executed by the CPU according to an embodiment of the present invention.

FIG. 18 is a flow chart illustrating a detailed operation of calculating the tilt angle $\theta$ by using the weighted average shown in step S24 of FIG. 11. In step S2401, the coefficient $\alpha$ is determined relative to the X-axis direct-detection $\theta$1 and $\theta$2. Then, in step S2402, the coefficient $\beta$ is determined relative to the X-axis direct-detection (180 degrees-$\theta$1) and (180 degrees-$\theta$2). Subsequently, in step S2403, $\theta$1$n$ and $\theta$2$n$ are determined from the X-axis direct-detection $\theta$1 and $\theta$2 and indirect-detection $\theta$1" and $\theta$2" according to the aforementioned equation using the coefficients $\alpha$ and $\beta$. Processing similar to that discussed above is performed for the Y-axis coil and the Z-axis coil.

Figure 19:
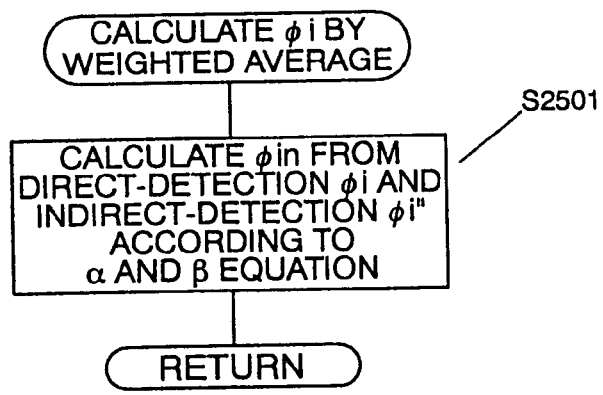
FIG. 19 is a flow chart illustrating sub-processing executed by the CPU according to an embodiment of the present invention.

FIG. 19 is a flow chart illustrating a detailed operation of calculating the azimuth angle $\phi$ by using the weight average shown in step S25 of FIG. 11. In step S2501, $\phi$1$n$ and $\phi$2$n$ are obtained from the X-axis direct-detection $\phi$1 and $\phi$2 and indirect-detection $\phi$1" and $\phi$2" according to the above-described equation using the coefficients $\alpha$ and $\beta$.

Figure 20:
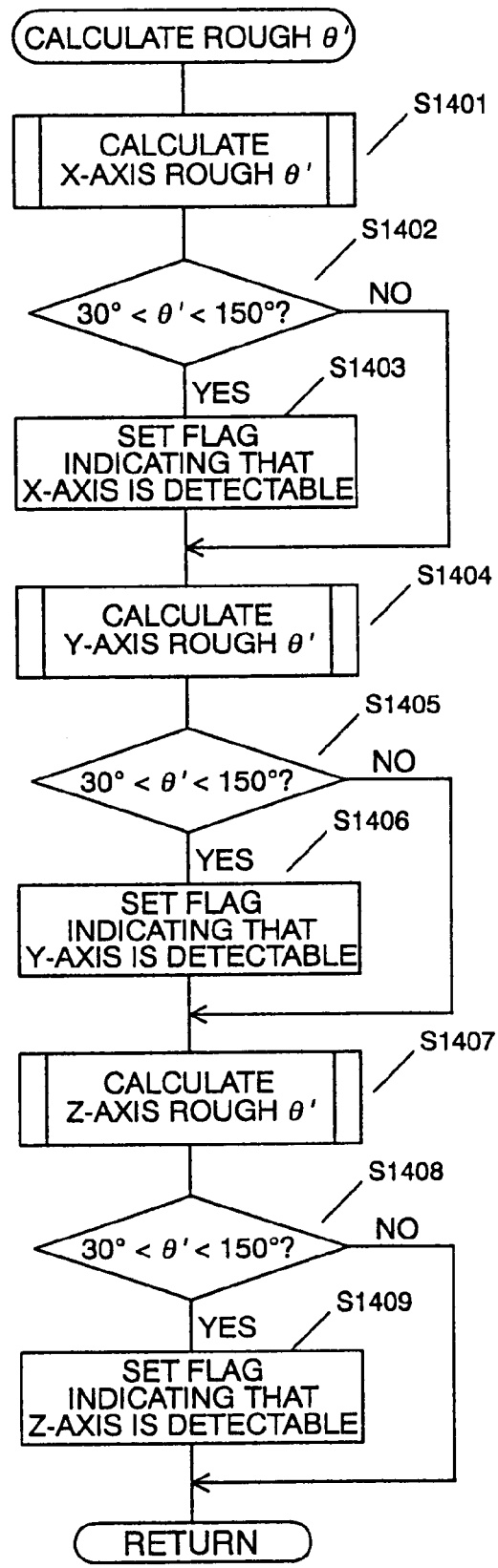
FIG. 20 is a flow chart illustrating sub-processing executed by the CPU according to an embodiment of the present invention.

FIG. 20 is a flow chart illustrating a detailed operation of calculating the rough tilt angle $\theta$' shown in step S14 of FIG. 11.

In step S1401, the ratio of the signal level received by the circular coil C to that of the small sensor coil M from the X-axis coil is determined. It is then determined in step S1402 whether the above level ratio is outside the threshold range, i.e., whether the $\theta$' ranges from 30 degrees to 150 degrees. If the level ratio is outside the threshold range, the process proceeds to step S1404.

If it is found in step S1402 that the level ratio is within the threshold range, a flag indicating that the X-axis is detectable is set in step S1403. Thereafter, processing similar to that described above is performed for the Y-axis coil in steps S1404 through S1406 and for the Z-axis coil in steps S1407 through S1409.

Figure 21:
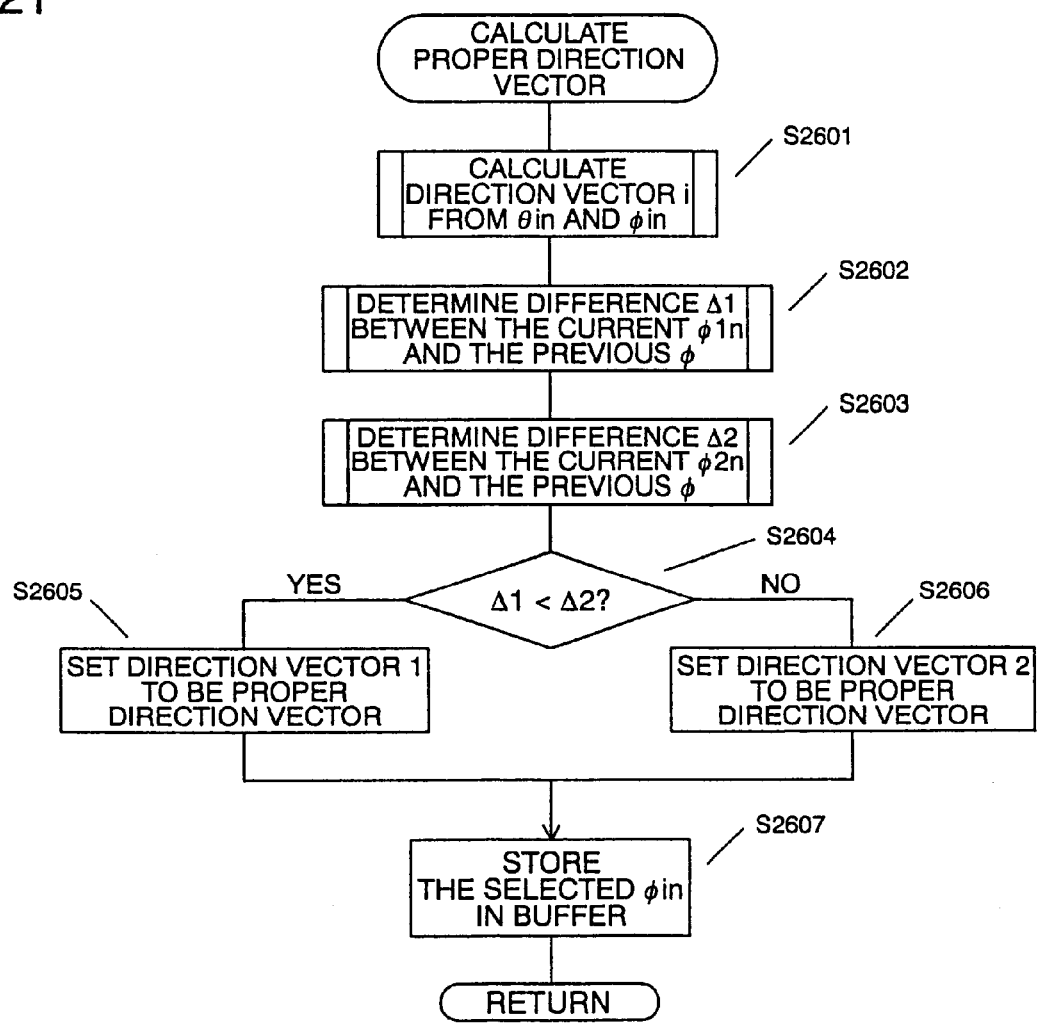
FIG. 21 is a flow chart illustrating sub-processing executed by the CPU according to an embodiment of the present invention.

FIG. 21 is a flow chart illustrating a detailed operation of calculating proper direction vectors shown in step S26 of FIG. 11. In step S2601, the direction vectors 1 and 2 are determined from the X-axis azimuth angles $\phi$1$n$ and $\phi$2$n$ and the X-axis tilt angles $\theta$1$n$ and $\theta$2$n$. Then, in step S2602, a difference $\Delta$1 between the angle $\phi$1$n$ obtained by the current scanning operation and the azimuth angle $\phi$ obtained by the previous scanning operation is determined. Similarly, in step S2603, a difference $\Delta$2 between the $\phi$2$n$ obtained by the current scanning operation and the azimuth angle $\phi$ obtained by the previous scanning operation is determined.

Subsequently, in steps S2604 through S2606, the direction vector calculated from the smaller azimuth angle $\phi$in determined based on the differences $\Delta$1 and $\Delta$2 is set to be a proper vector. To compare the azimuth angle $\phi$ in with an angle to be obtained by the subsequent scanning operation, it is stored in step S2607 in the buffer as the azimuth angle $\phi$ obtained by the previous scanning operation. Processing similar to that stated above is performed for the Y-axis coil and the Z-axis coil.

Figure 30A:
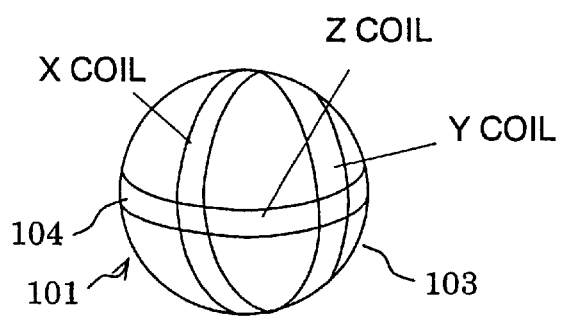
FIGS. 30A, 30B, and 30C illustrate an orientation-designating device according to a second embodiment of the present invention.
Figure 30B:
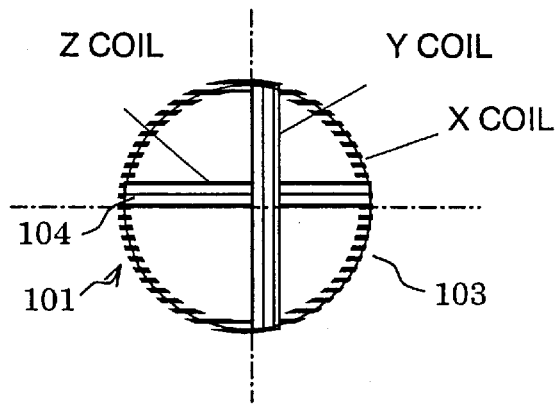
Figure 30C:
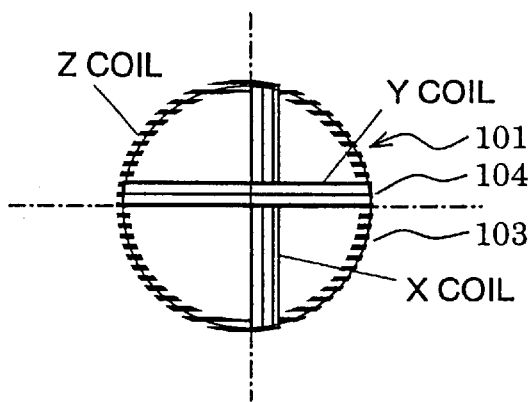
Figure 32:
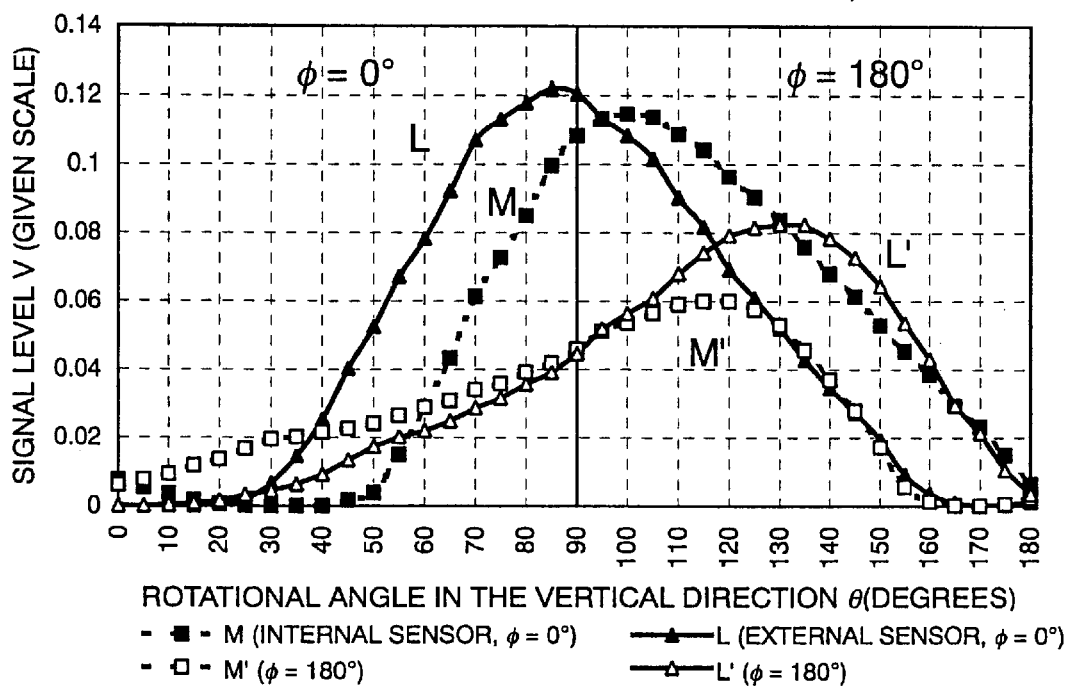
FIG. 32 is a characteristic diagram obtained when the orientation-designating device shown in FIGS. 30A, 30B, and 30C is used.

FIGS. 30A, 30B, and 30C illustrate an orientation-designating device 101 according to a second embodiment of the present invention. Three mutually-orthogonal orientation-designating coils 104 (X Coil, Y Coil, and Z Coil) provided for the sphere 103 are disposed and are eccentric with respect to planes passing through the center of the sphere 103. As in the case of the coils 104 shown in FIG. 7, each coil 104 is covered with a spherical shell (not shown).

The characteristics of the signals received by the sector sensors M, L, M', and L' and the circular sensor C are as shown in FIGS. 31 through 35. The above characteristics are obtained under the conditions that the diameter of the orientation-designating coil 104 is 44 mm, the orientation-designating coil 104 is eccentric 5 mm from the center axis of the sphere 103, the frequency of the transmitting/receiving signals is 375 kHz, the tilt angle $\theta$ is 60 degrees, the diameter of the sphere 103 is 70 mm, and the bottommost portion of the sphere 103 is placed 5 mm above the surface of the orientation-detecting sensor 102.

The tilt angle $\theta$ and the azimuth angle $\phi$ can be detected according to a procedure substantially similar to that by using the coil 104 which is not eccentric with respect to planes passing through the center of the sphere 103, as described in the first embodiment. In the second embodiment, however, a determination of towards which side, i.e., the front side or the rear side, the orientation-designating device 101 is directed, can be made in the following manner, as shown in FIG. 33. An expression, namely, (M/L+M'/L'), is calculated for the signal level L received by the large sector coil L, the signal level L' received by the large sector coil L', which is displaced from the sector coil L by 180 degrees, the signal level M received by the small sector coil M, which forms a pair with the sector coil L, and the signal level M' received by the small sector coil M', which forms a pair with the sector coil L'. FIG. 33 reveals that the dependency characteristic represented by the above expression upon the tilt angle θ is asymmetrical with respect to the value when θ=90 degrees. That is, by utilizing the above characteristics, it is possible to determine towards which side the orientation-designating device 101 is directed according to whether the value (M/L+M'/L') is greater or smaller relative to the value when θ is 90 degrees.

Accordingly, the orientation can be detected entirely as absolute values, thereby eliminating the need for setting the initial direction when the power is turned on. It is also unnecessary to compare the current azimuth angle φ with the previous azimuth angle φ, which is required for preventing the inversion of signals.

Figure 34:
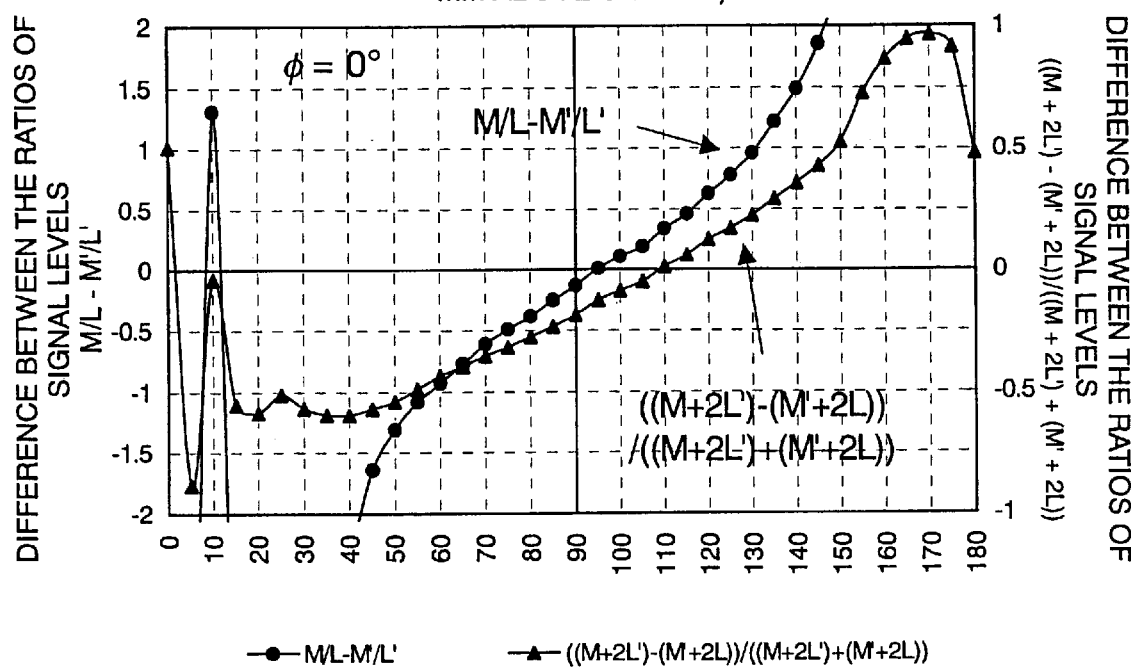
FIG. 34 is a characteristic diagram obtained when the orientation-designating device shown in FIGS. 30A, 30B, and 30C is used.
Figure 35:
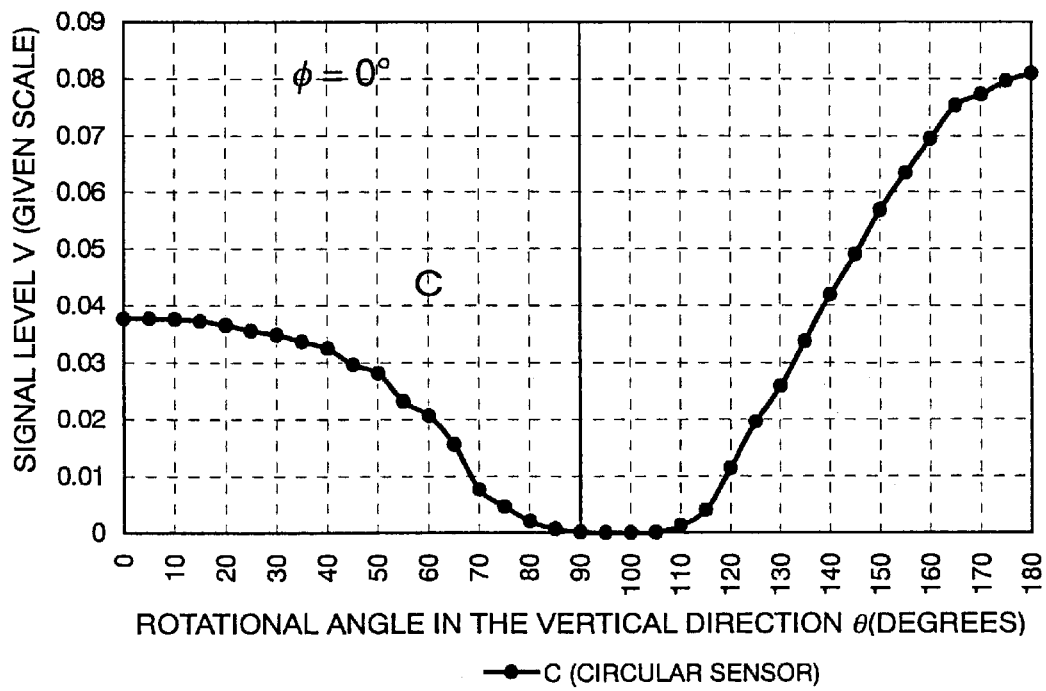
FIG. 35 is a characteristic diagram obtained when the orientation-designating device shown in FIGS. 30A, 30B, and 30C is used.

As in the case of the first embodiment, the expression ((M+2L')−(M'+2L))/((M+2L')+(M'+2L)) exhibits a high linearity, as illustrated in FIG. 34, thereby detecting the tilt angle θ with higher precision.

Figure 36:
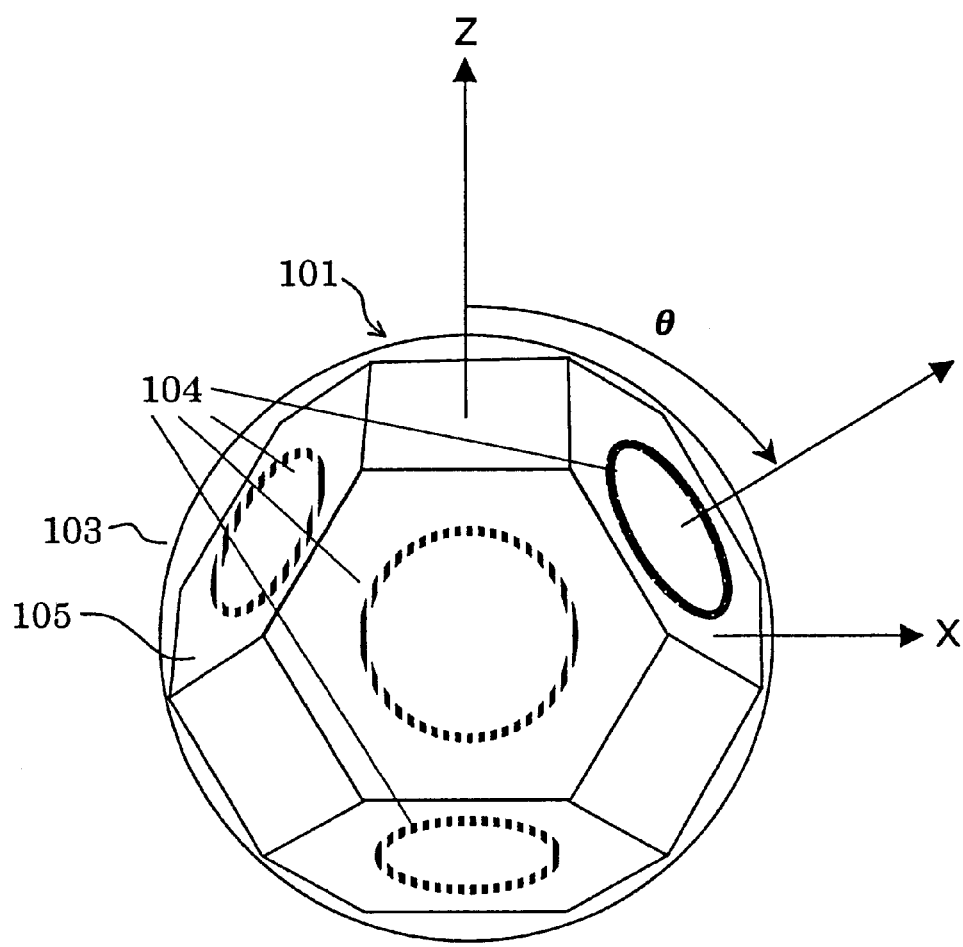
FIG. 36 illustrates an orientation-designating device according to a third embodiment of the present invention.
Figure 37:
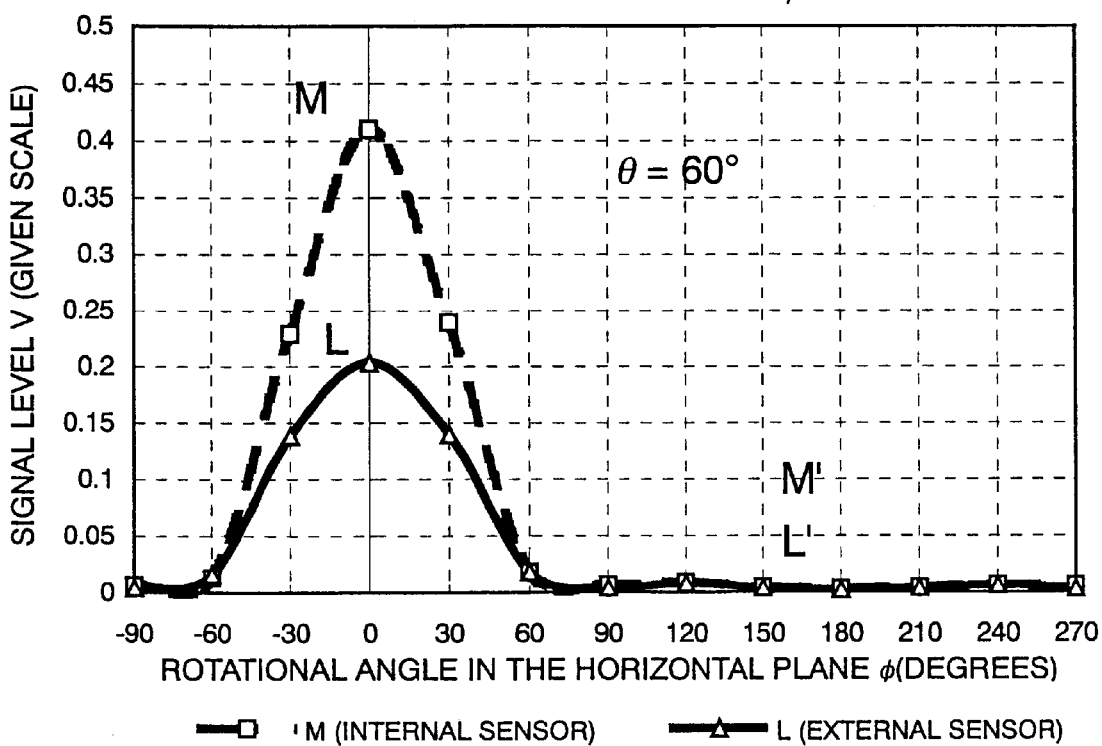
FIG. 37 is a characteristic diagram obtained when the orientation-designating device shown in FIG. 36 is used.
Figure 38:
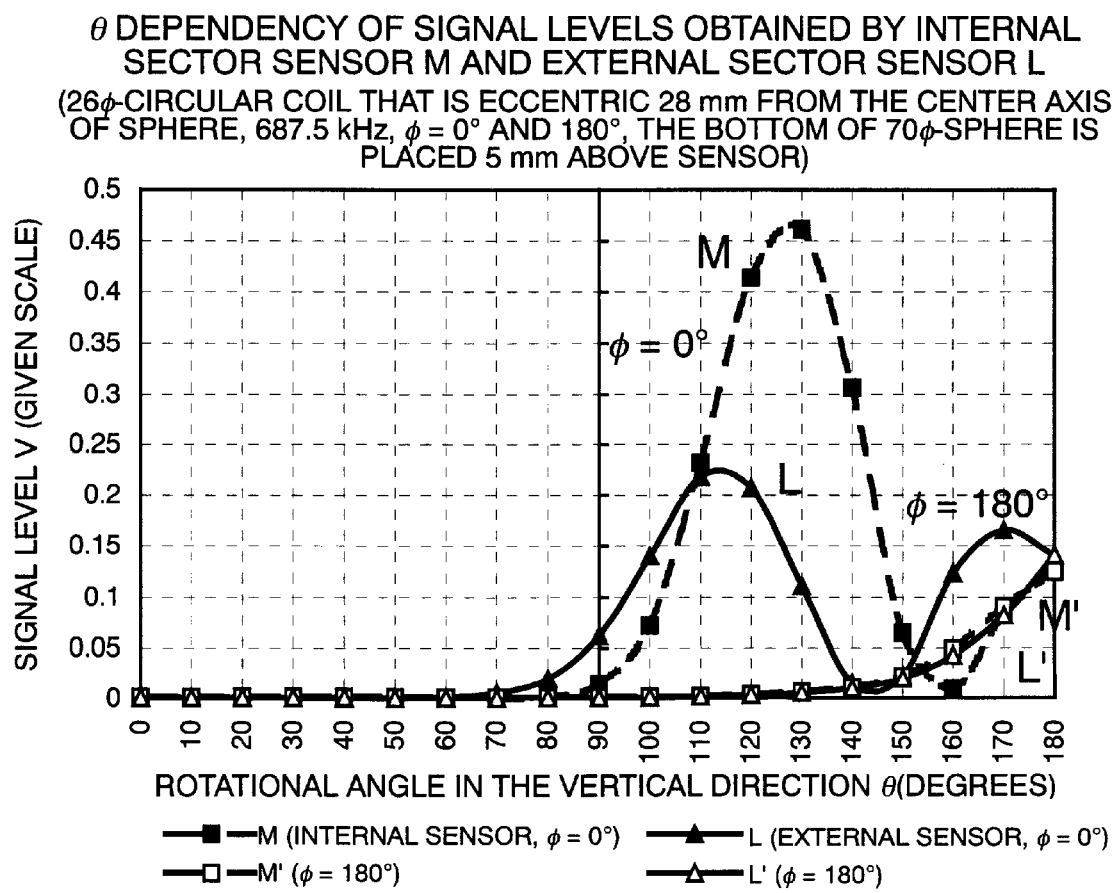
FIG. 38 is a characteristic diagram obtained when the orientation-designating device shown in FIG. 36 is used.
Figure 39:
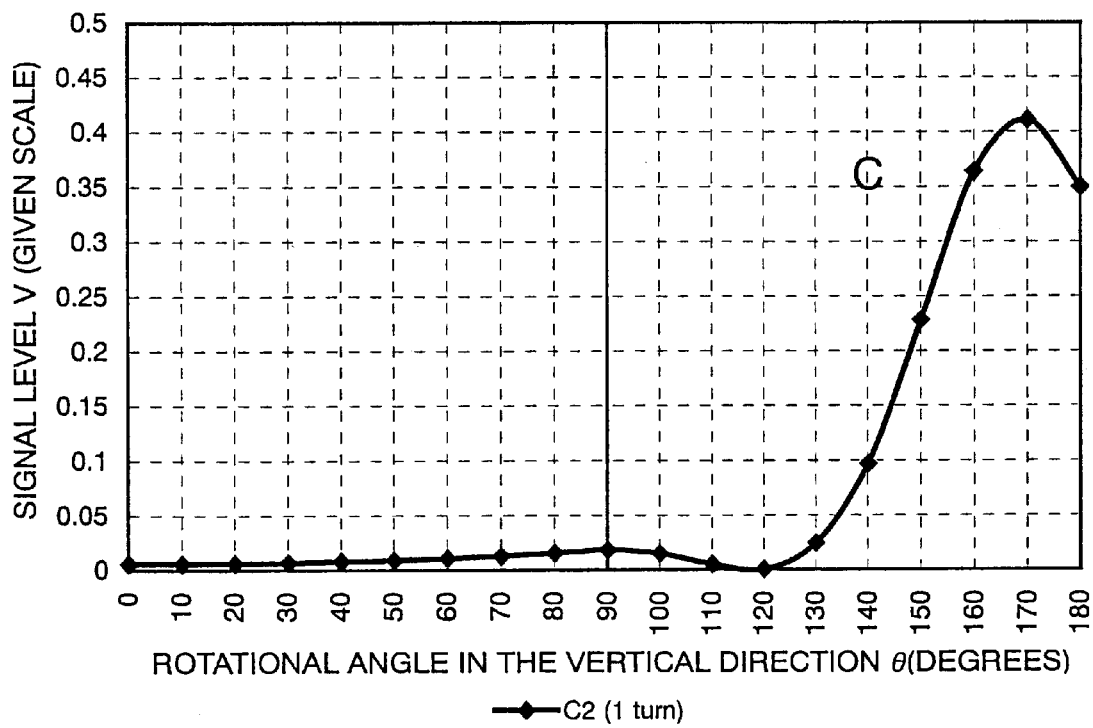
FIG. 39 is a characteristic diagram obtained when the orientation-designating device shown in FIG. 36 is used.

FIG. 36 illustrates an orientation-designating device 101 according to a third embodiment of the present invention. In this embodiment, a tetradecahedron 105 is disposed within the sphere 103, and orientation-designating coils 104 are placed on the faces of tetradecahedron 105. FIGS. 37 through 39 illustrate the characteristics of the signal levels received by the sector coils M, L, M', and L', and the circular coil C obtained when the orientation-designating device 101 shown in FIG. 36 is used. The above characteristics are obtained under the conditions that the diameter of the orientation-designating coil 104 is 26 mm, the orientation-designating coils 104 are eccentric 28 mm from the center axis of the sphere 103, the frequency of the transmitting/receiving signals is 687.5 kHz, the tilt angle θ is 60 degrees, the diameter of the sphere 103 is 70 mm, and the bottommost portion of the sphere 103 is located 5 mm above the surface of orientation-detecting sensor 102. FIG. 37 shows that a single peak appears in the azimuth angle φ characteristics. Although in this embodiment the tetradecahedron 105 is used as an example, other types of polyhedrons may be used.

Figure 40:
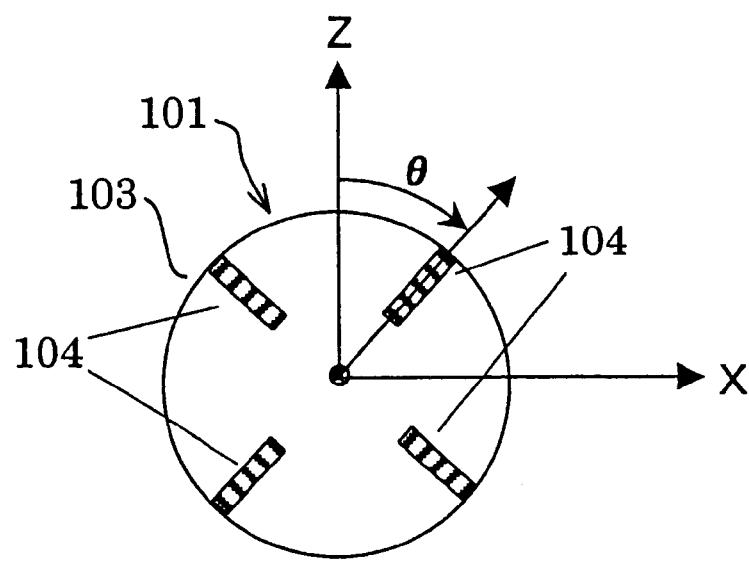
FIG. 40 illustrates an orientation-designating device according to a fourth embodiment of the present invention.

FIG. 40 illustrates an orientation-designating device 101 according to a fourth embodiment of the present invention. In this embodiment, orientation-designating coils 104 formed of ferrite coils and extending in the radial directions are disposed in the sphere 103.

Figure 41:
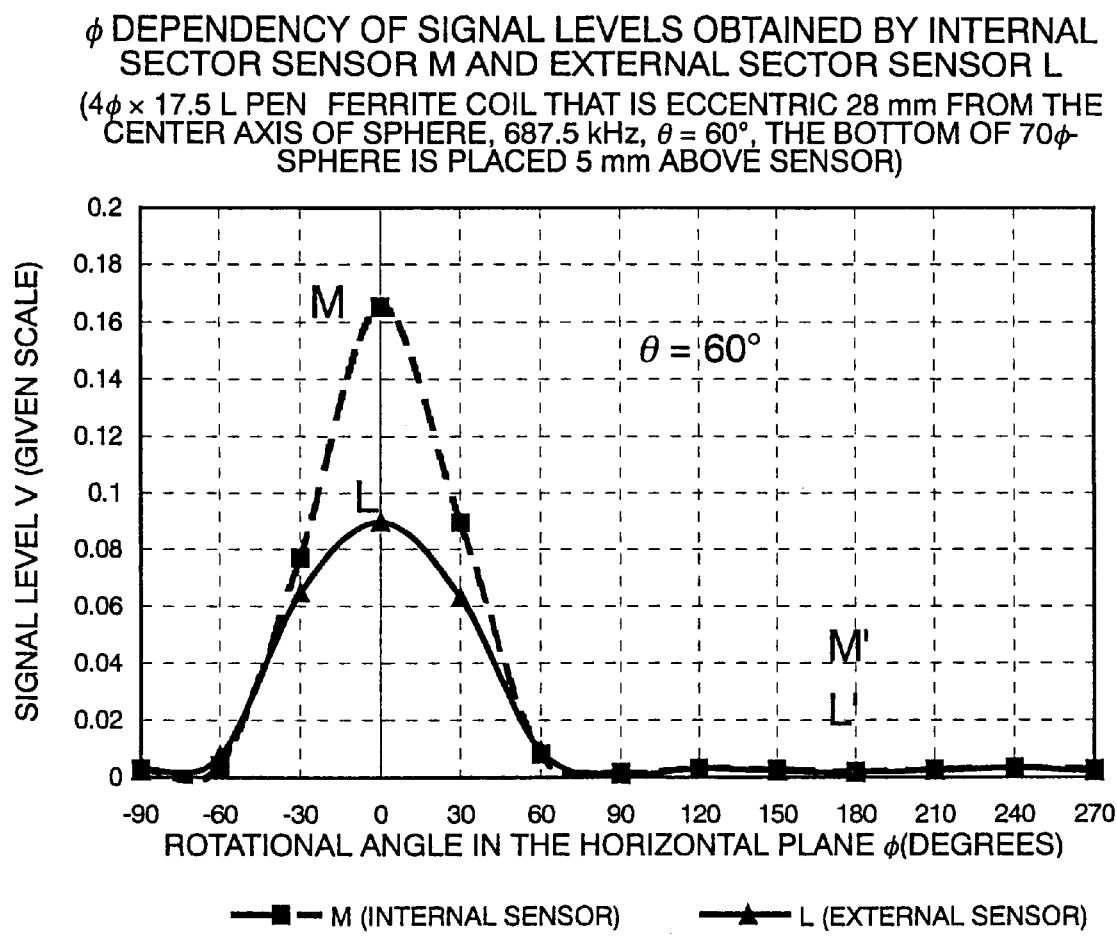
FIG. 41 is a characteristic diagram obtained when the orientation-designating device shown in FIG. 40 is used.
Figure 42:
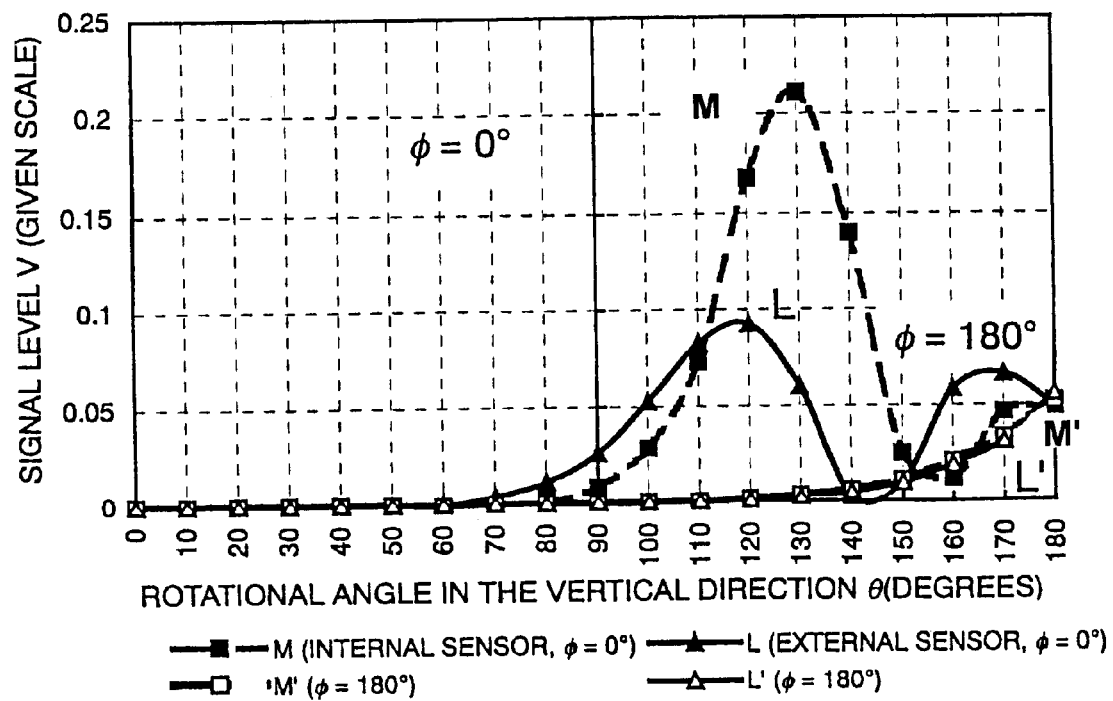
FIG. 42 is a characteristic diagram obtained when the orientation-designating device shown in FIG. 40 is used.
Figure 43:
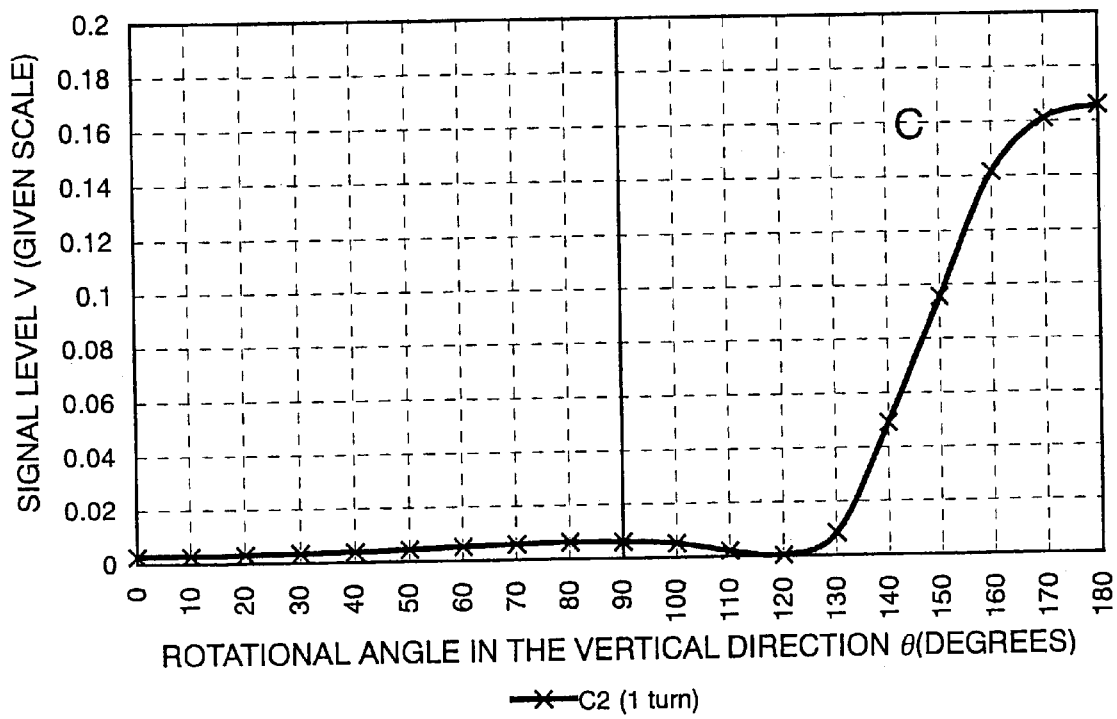
FIG. 43 is a characteristic diagram obtained when the orientation-designating device shown in FIG. 40 is used.

FIGS. 41 through 43 illustrate the output characteristics of the sector coils M, L, M' and L', and the circular coil C obtained when the orientation-designating device 101 shown in FIG. 40 is used. The above-characteristics are obtained under the conditions that the ferrite coil has a diameter of 4 mm and a length of 17.5 mm, the orientation-designating coils 104 are eccentric 28 mm from the center axis of the sphere 103, the frequency of the transmitting/receiving signal is 687.5 kHz, the tilt angle θ is 60 degrees, the diameter of the sphere 103 is 70 mm, and the bottommost portion of the sphere 103 is placed 5 mm above the surface of the orientation-detecting sensor 102. FIGS. 41 through 43 show that a single peak appears in the azimuth angle φ characteristics.

Figure 44:
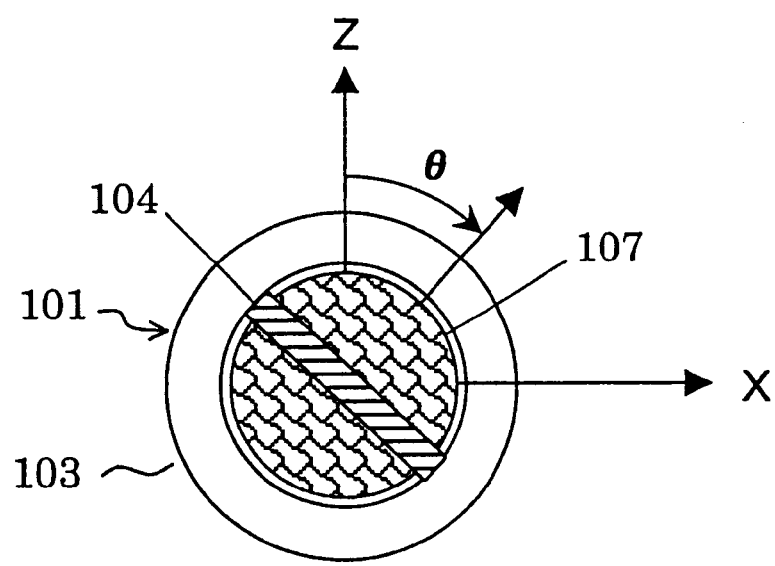
FIG. 44 illustrates an orientation-designating device according to a fifth embodiment of the present invention.
Figure 45:
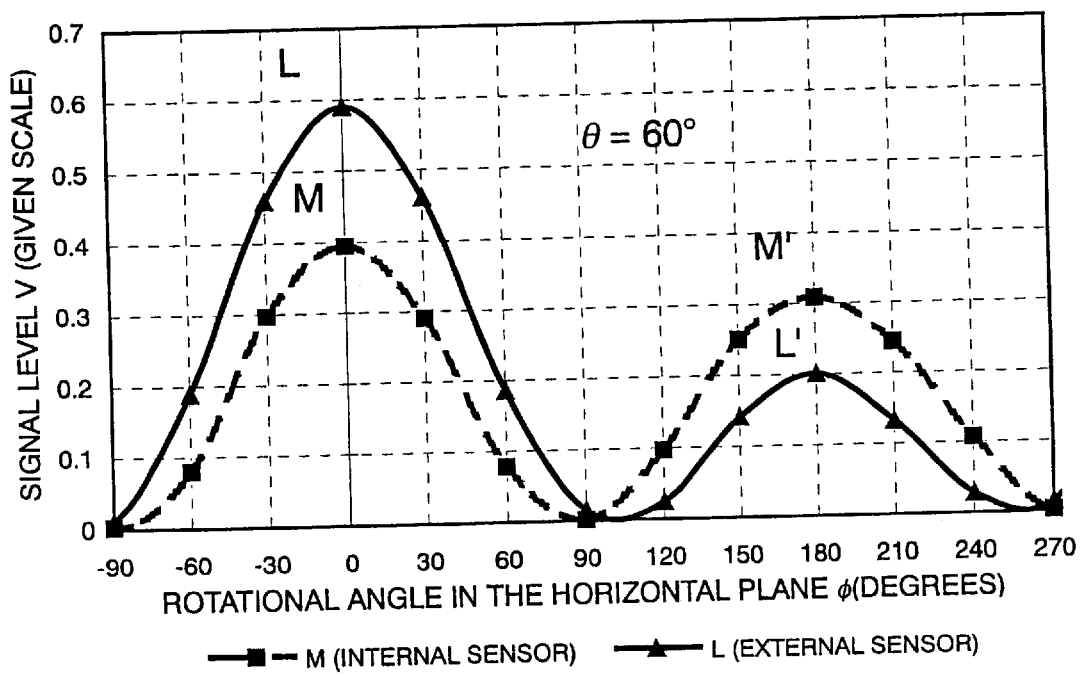
FIG. 45 is a characteristic diagram obtained when the orientation-designating device shown in FIG. 44 is used.
Figure 47:
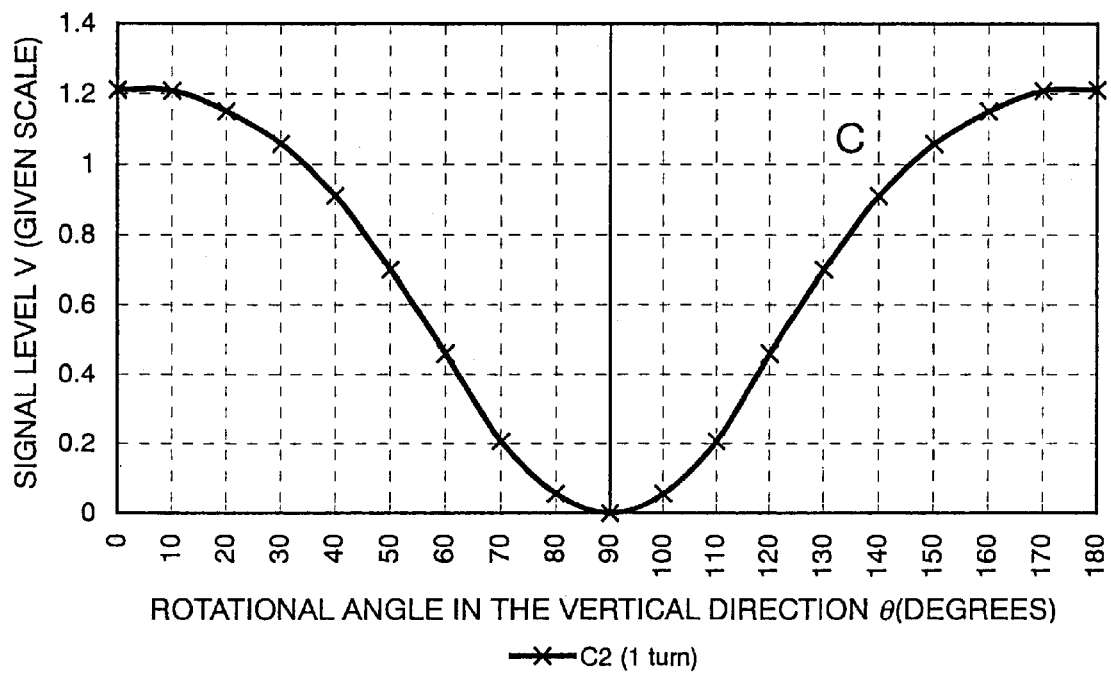
FIG. 47 is a characteristic diagram obtained when the orientation-designating device shown in FIG. 44 is used.

FIG. 44 illustrates an orientation-designating device 101 according to a fifth embodiment of the present invention. According to this embodiment, a sphere 107 formed from an amorphous magnetic alloy powder is disposed at the central portion of the sphere 103, and three mutually-orthogonal circular orientation-designating coils 104 are provided around the sphere 107. Only a single orientation-designating coil 104 is shown in FIG. 44.

FIGS. 45 through 49 illustrate the characteristics of the signals received by the sector coils M, L, M' and L', and the circular coil C obtained when the orientation-designating device 101 shown in FIG. 44 is used. The above-characteristics are obtained under the conditions that the diameter of the sphere 107 is 45 mm, the orientation-designating coils 104 have a diameter of 49 mm and are not eccentric with respect to planes passing through the center of the sphere 103, the frequency of the transmitting/receiving signal is 687.5 kHz, the tilt angle θ is 60 degrees, the diameter of the sphere 103 is 70 mm, and the bottommost portion of the sphere 103 is placed 5 mm above the surface of the orientation-detecting sensor 102.

Figure 50A:
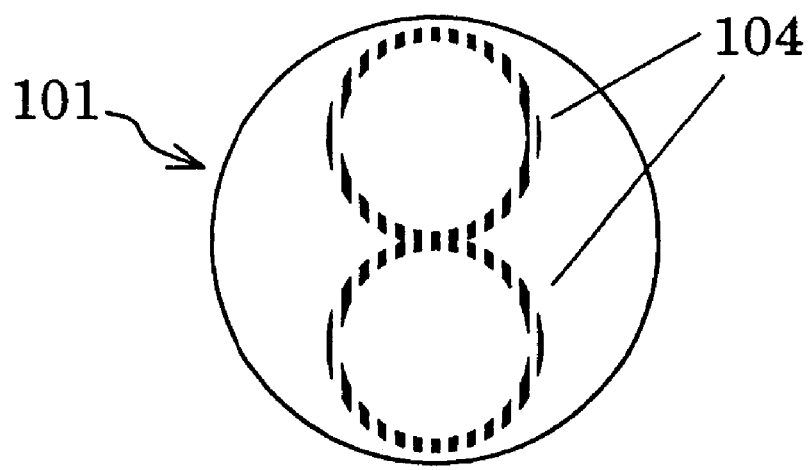
FIGS. 50A and 50B illustrate an orientation-designating device according to a sixth embodiment of the present invention.
Figure 50B:
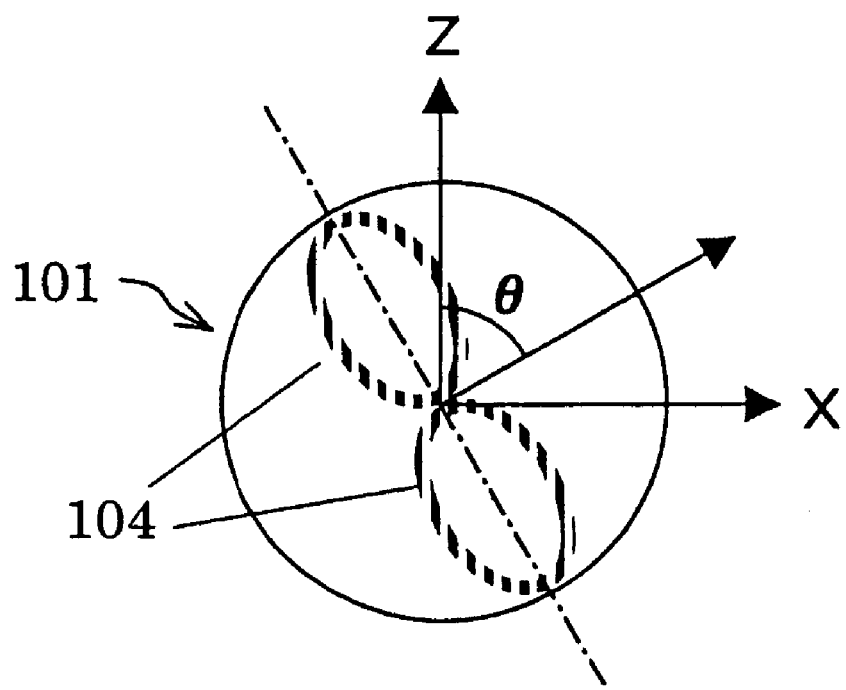

FIGS. 50A and 50B illustrate an orientation-designating device 101 according to a sixth embodiment of the present invention. According to this embodiment, figure-eight-shaped coils each having two circles, which are symmetrical to each other with respect to the center of the sphere 103, are disposed within the sphere 103. Only a single orientation-designating coil 104 is shown in FIGS. 50A and 50B.

Figure 51:
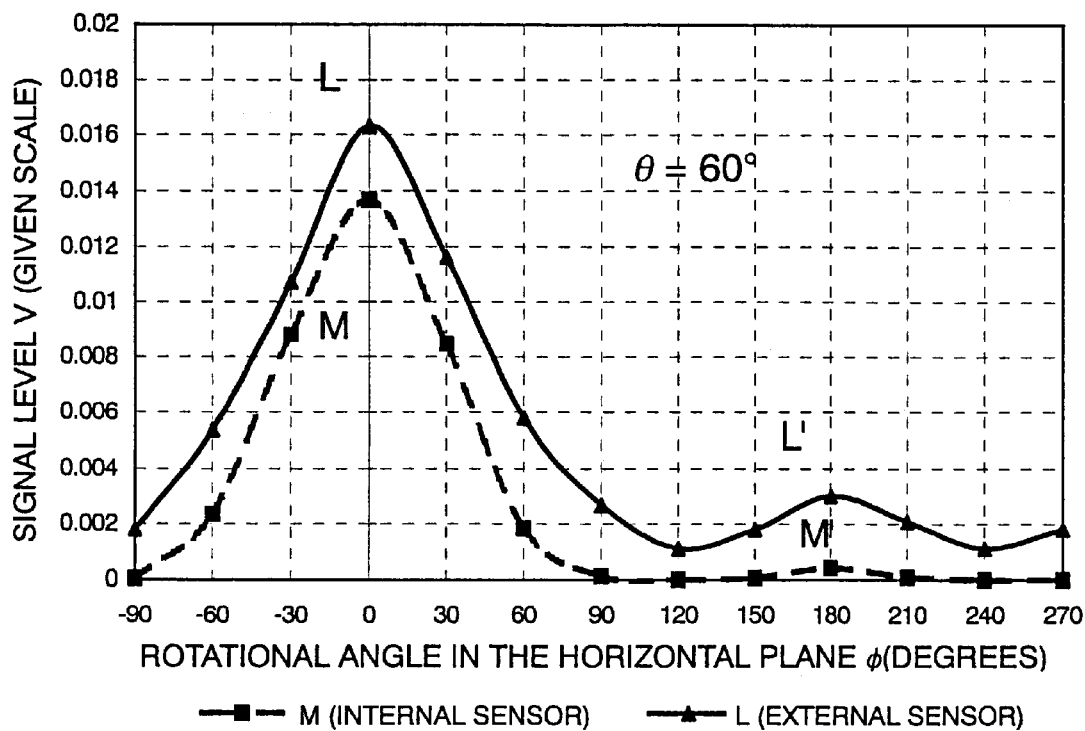
FIG. 51 is a characteristic diagram obtained when the orientation-designating device shown in FIGS. 50A and 50B is used.
Figure 52:
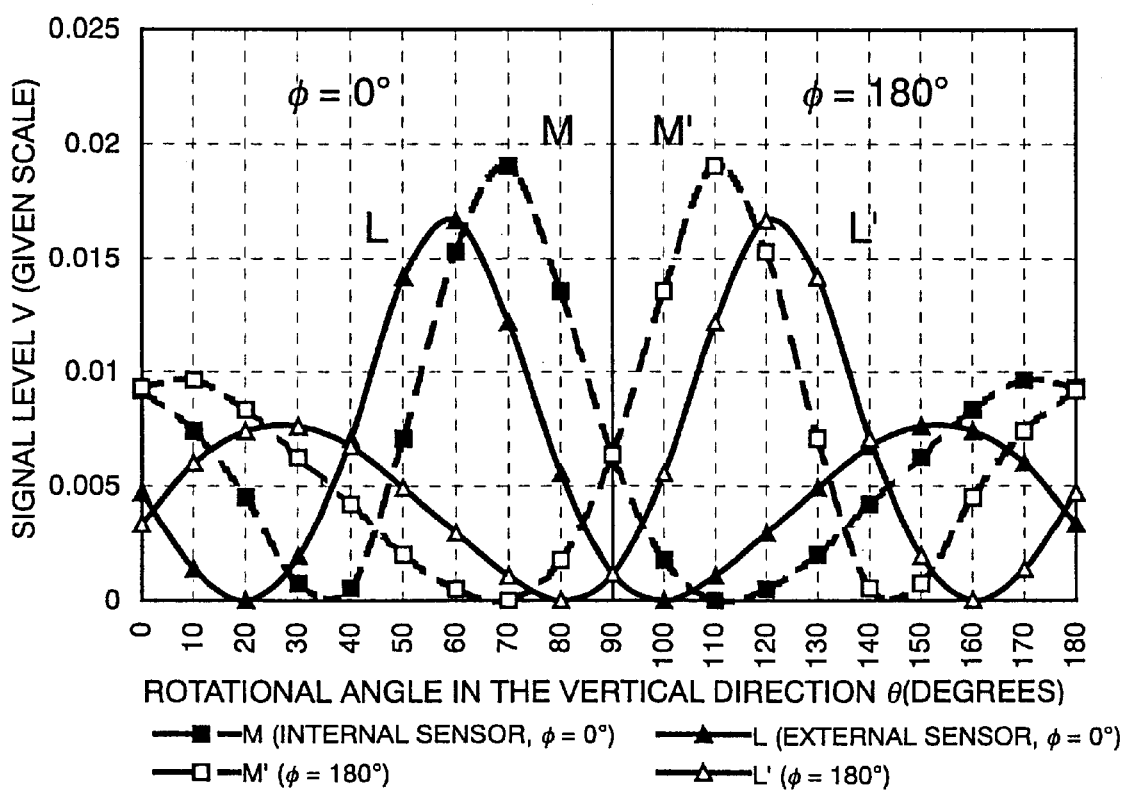
FIG. 52 is a characteristic diagram obtained when the orientation-designating device shown in FIGS. 50A and 50D is used.
Figure 53:
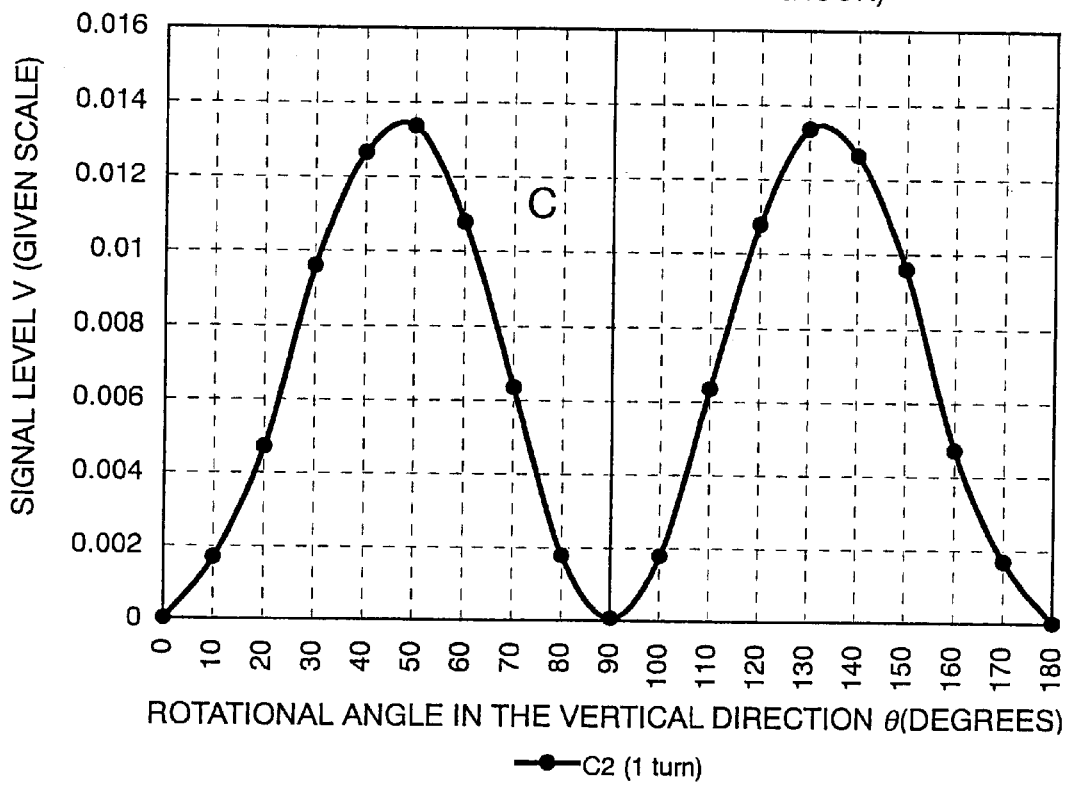
FIG. 53 is a characteristic diagram obtained when the orientation-designating device shown in FIGS. 50A and 50B is used.

FIGS. 51 through 53 illustrate the characteristics of the signals received by the sector coils M, L, M', and L', and the circular coil C obtained when the orientation-designating device 101 shown in FIGS. 50A and 50B is used. The above characteristics are obtained under the conditions that each of the two circles forming the figure-eight-shaped coil is 26 mm, the orientation-designating coils 104 are not eccentric with respect to planes passing through the center of the sphere 103, the frequency of the transmitting/receiving signals is 687.5 kHz, the tilt angle θ is 60 degrees, the diameter of the sphere 103 is 70 mm, and the bottommost portion of the sphere 103 is placed 5 mm above the surface of the orientation-detecting sensor 102.

Figure 54A:
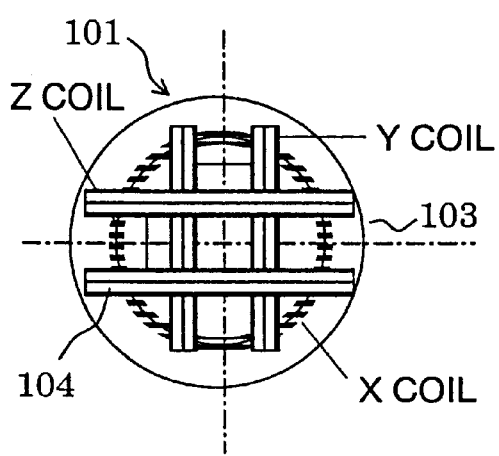
FIGS. 54A and 54B illustrate an orientation-designating device according to a seventh embodiment of the present invention.
Figure 54B:
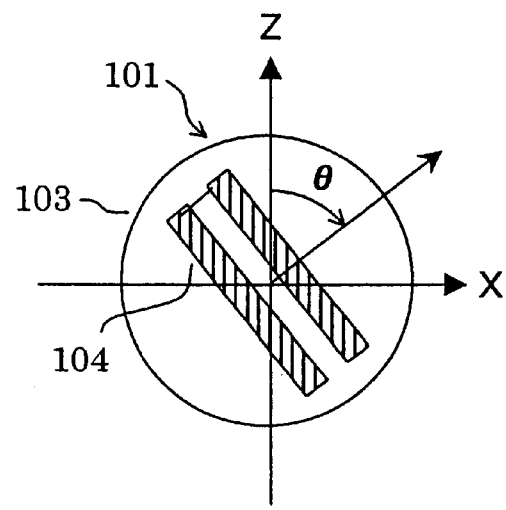
Figure 57:
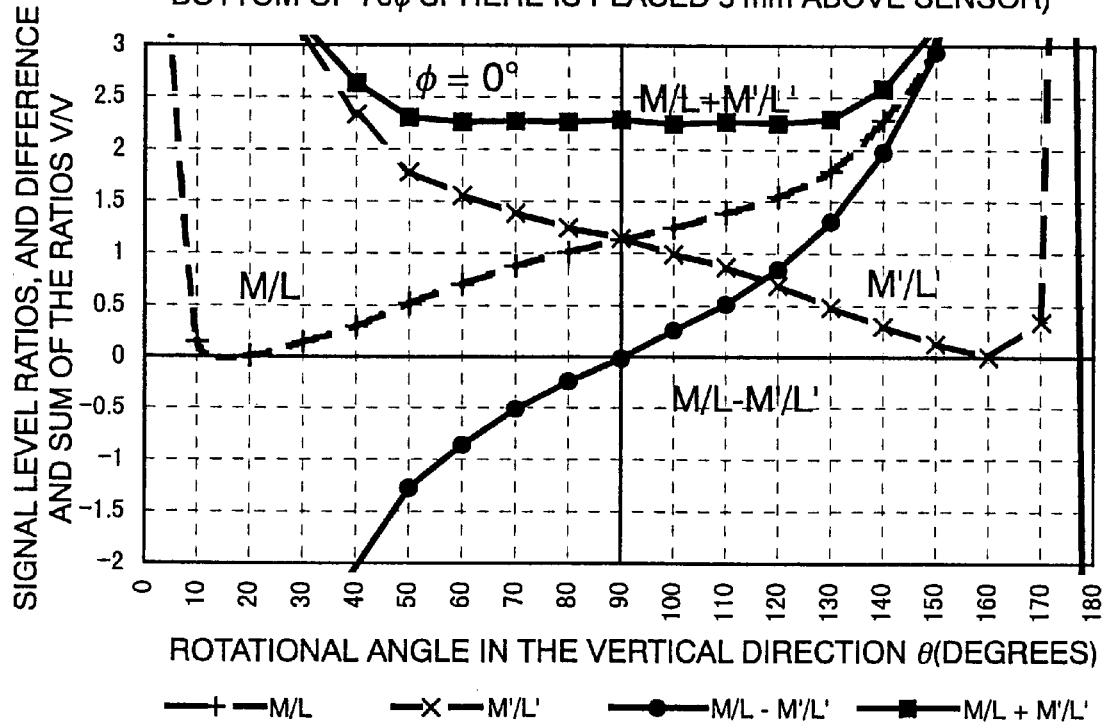
FIG. 57 is a characteristic diagram obtained when the orientation-designating device shown in FIGS. 54A and 54B is used.
Figure 59:
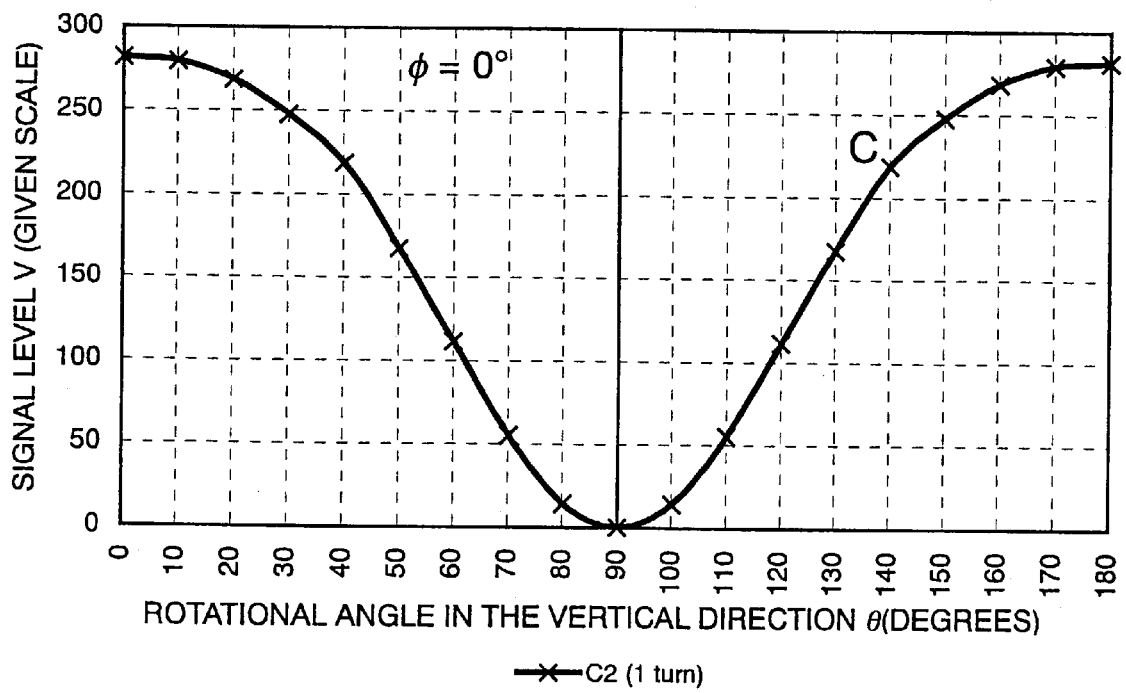
FIG. 59 is a characteristic diagram obtained when the orientation-designating device shown in FIGS. 54A and 54B is used.

FIGS. 54A and 54B illustrate an orientation-designating device 101 according to a seventh embodiment of the present invention. According to this embodiment, three mutually-orthogonal orientation-designating coils 104 (X Coil, Y Coil, and Z Coil) are disposed in the sphere 103. Each orientation-designating coil 104 is divided into two portions, which are located symmetrically to each other with respect to planes passing through the center of the sphere 103. The two divided coil portions are connected in series or in parallel to each other so that the currents flow in the same direction. Accordingly, the orientation-designating coils 104 are not eccentric with respect to planes passing through the center of the sphere 103.

FIGS. 55 through 59 illustrate the characteristics of the signals received by the sector coils M, L, M', and L', and the circular coil C obtained when the orientation-designating device 101 shown in FIGS. 54A and 54B is used. The above characteristics are obtained under the conditions that each of the two coils forming a single orientation-designating coil 104 has a diameter of 49 mm and 15 turns, the two coils being separated from each other with a 10 mm space therebetween, the frequency of the transmitting/receiving signals is 687.5 kHz, the tilt angle θ is 60 degrees, the diameter of the sphere 103 is 70 mm, and the bottommost portion of the sphere 103 is placed 5 mm above the surface of the orientation-detecting sensor 102. FIGS. 55 through 59 reveal that the sensitivity is improved over the orientation-designating device 101 shown in FIG. 7. This is because the magnetic characteristics are nonlinear.

Figure 60A:
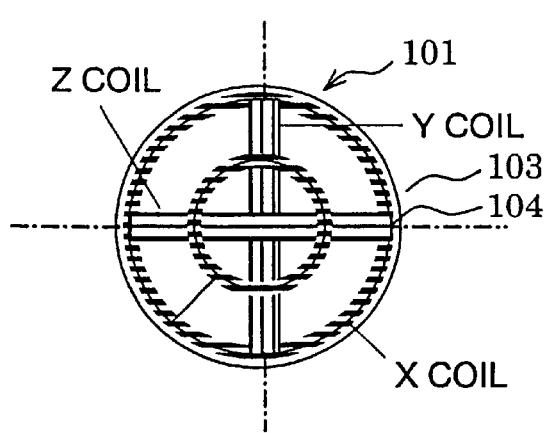
FIGS. 60A and 60B illustrate an orientation-designating device according to an eighth embodiment of the present invention.
Figure 60B:
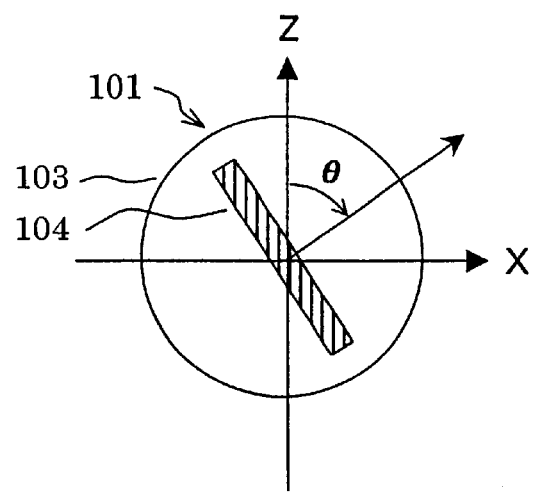
Figure 62:
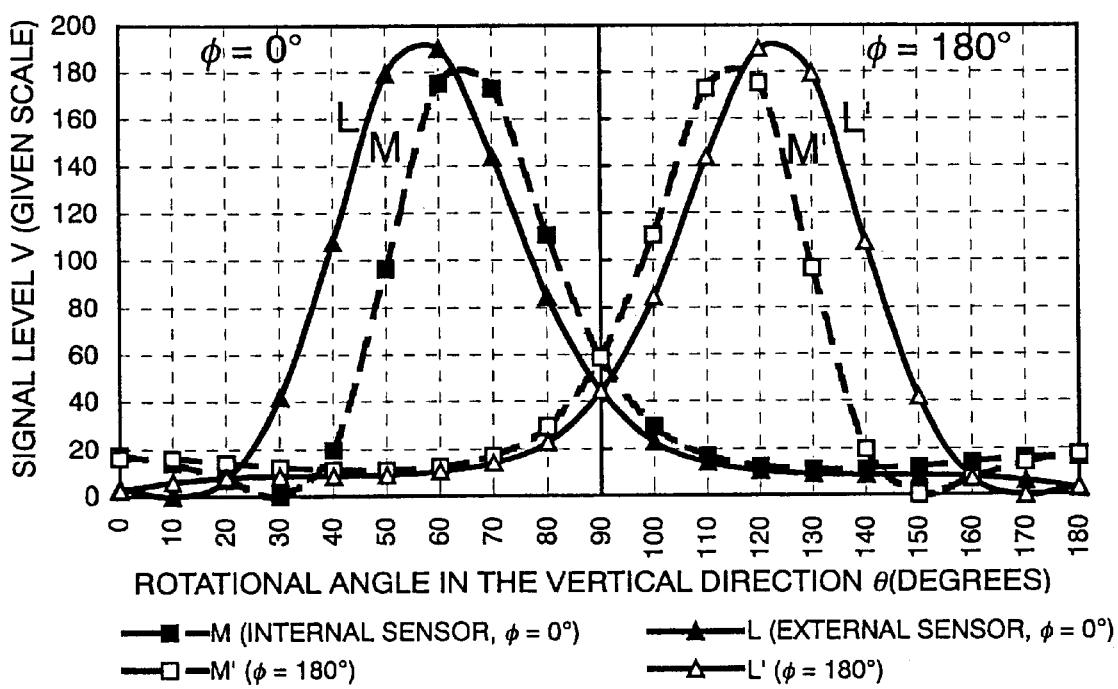
FIG. 62 is a characteristic diagram obtained when the orientation-designating device shown in FIGS. 60A and 60B is used.
Figure 64:
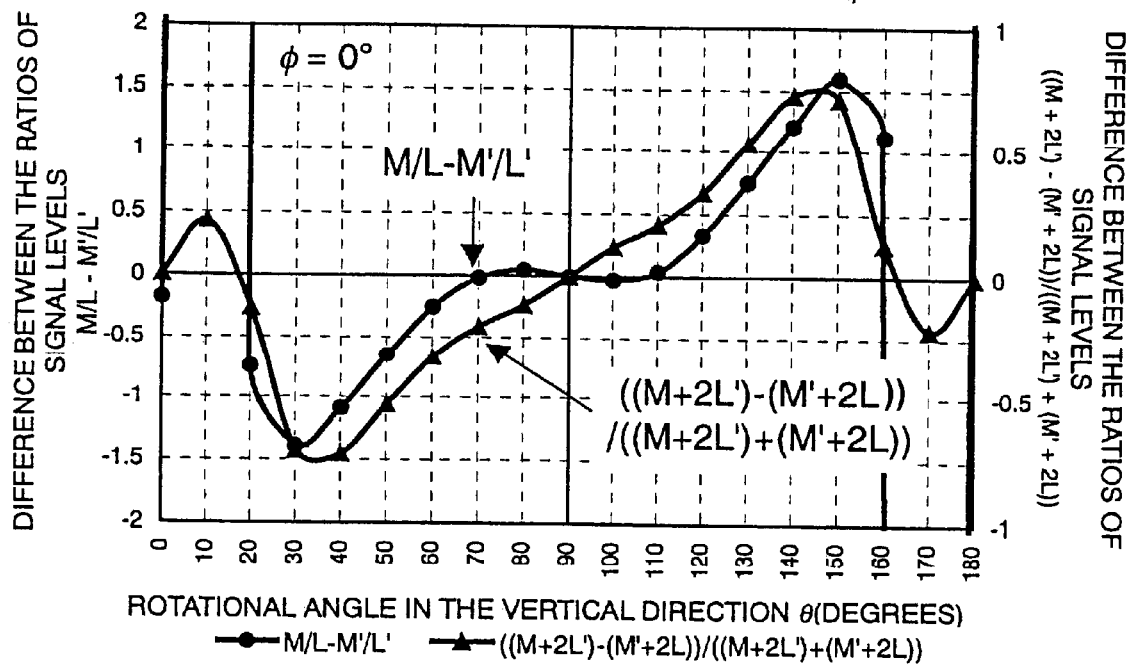
FIG. 64 is a characteristic diagram obtained when the orientation-designating device shown in FIGS. 60A and 60B is used.
Figure 65:
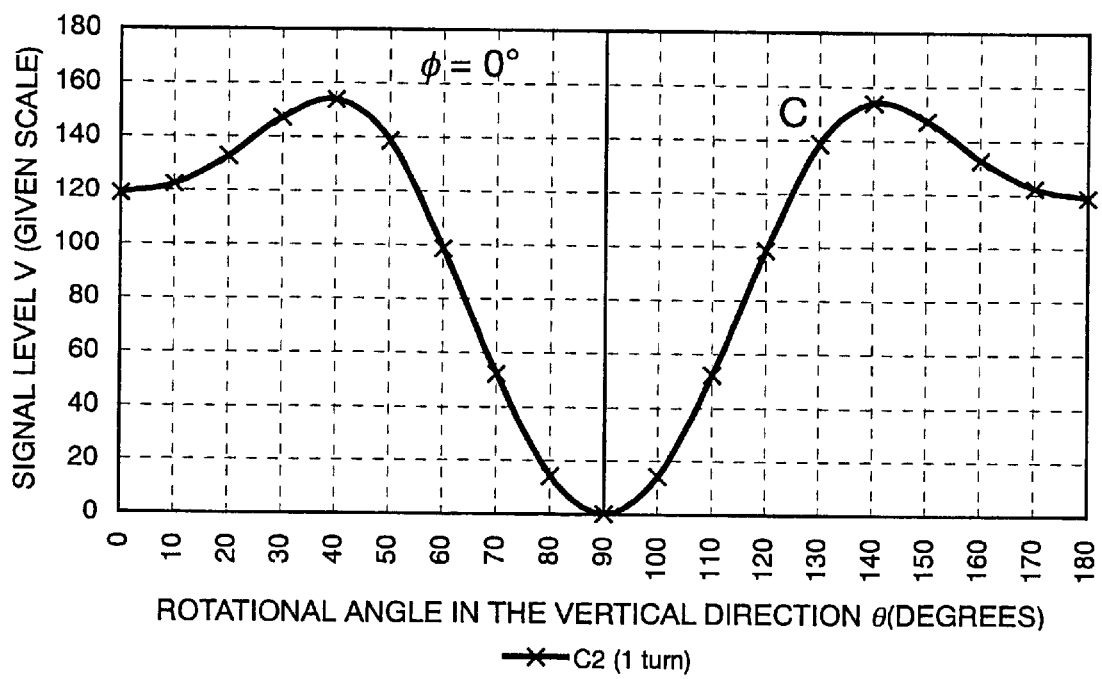
FIG. 65 is a characteristic diagram obtained when the orientation-designating device shown in FIGS. 60A and 60B is used.

FIGS. 60A and 60B illustrate an orientation-designating device 101 according to an eighth embodiment of the present invention. According to this embodiment, three mutually-orthogonal orientation-designating coils 104 (X Coil, Y Coil, and Z Coil) are disposed in the sphere 103. Each orientation-designating coil 104 has a small circular coil disposed close to the center of the sphere 103 and a large circular coil disposed away from the center of the sphere 103. The two coils are connected to form a donut shape so that they are differentially operated.

FIGS. 61 through 65 illustrate the output characteristics of the orientation-detecting coil obtained when the orientation-designating device 101 shown in FIGS. 60A and 60B is used. The above characteristics are obtained under the conditions that the diameter of the internal small circular coil is 40 mm and the diameter of the external large circular coil is 65 mm, the orientation-designating coils 104 are not eccentric with respect to planes passing through the center of the sphere 103, the frequency of the transmitting/receiving signals is 687.5 kHz, the tilt angle $\theta$ is 60 degrees, the diameter of the sphere 103 is 70 mm, and the bottommost portion of the sphere 103 is placed 5 mm above the surface of the orientation-detecting sensor 102.

Figure 66A:
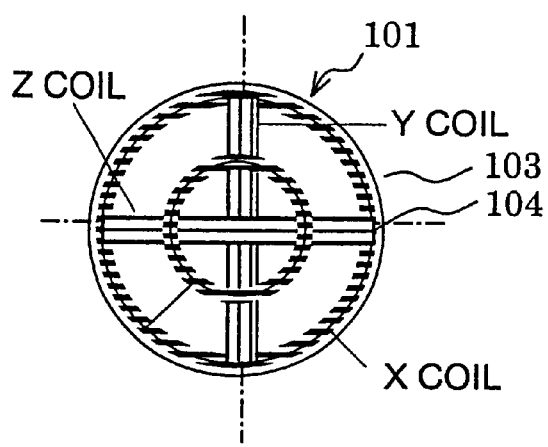
FIGS. 66A and 66B illustrate an orientation-designating device according to a ninth embodiment of the present invention.
Figure 66B:
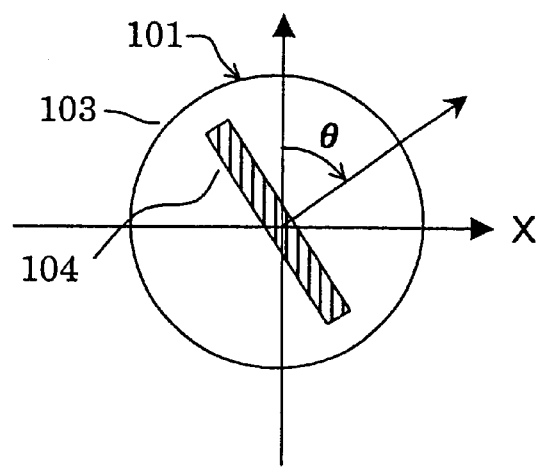
Figure 68:
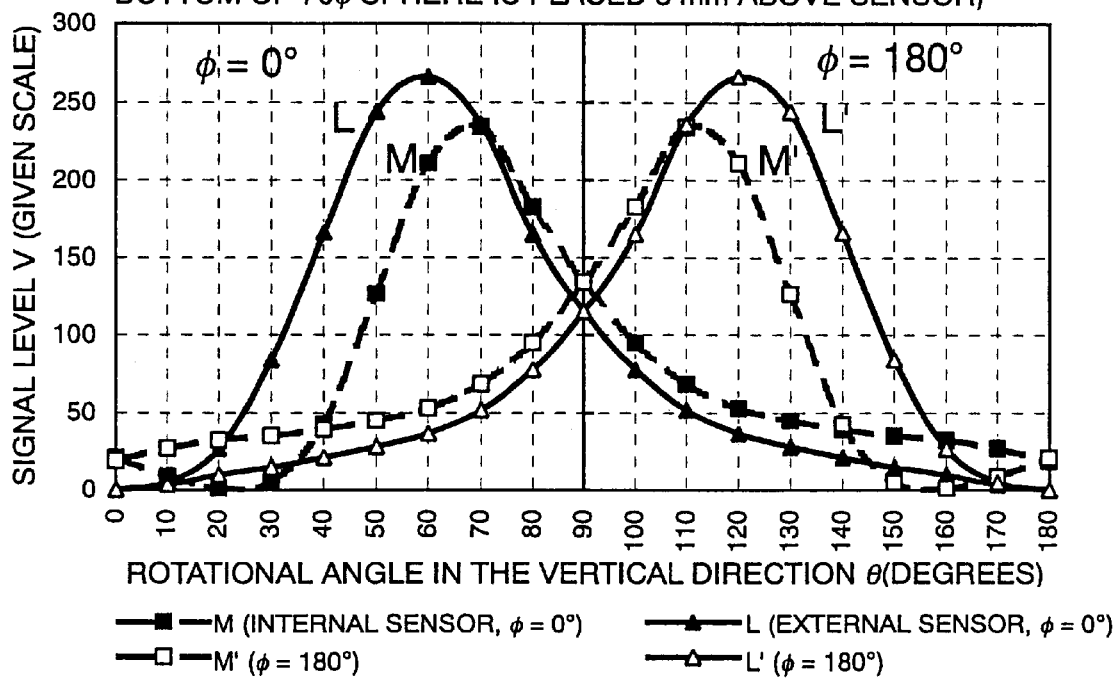
FIG. 68 is a characteristic diagram obtained when the orientation-designating device shown in FIGS. 66A and 66B is used.
Figure 69:
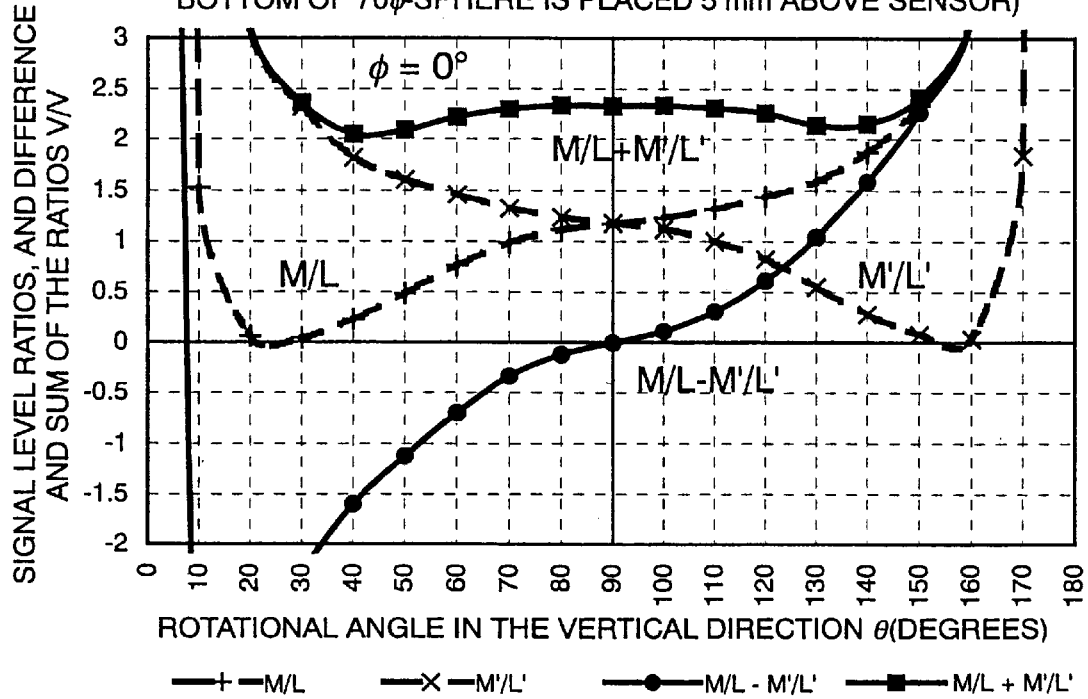
FIG. 69 is a characteristic diagram obtained when the orientation-designating device shown in FIGS. 66A and 66B is used.
Figure 70:
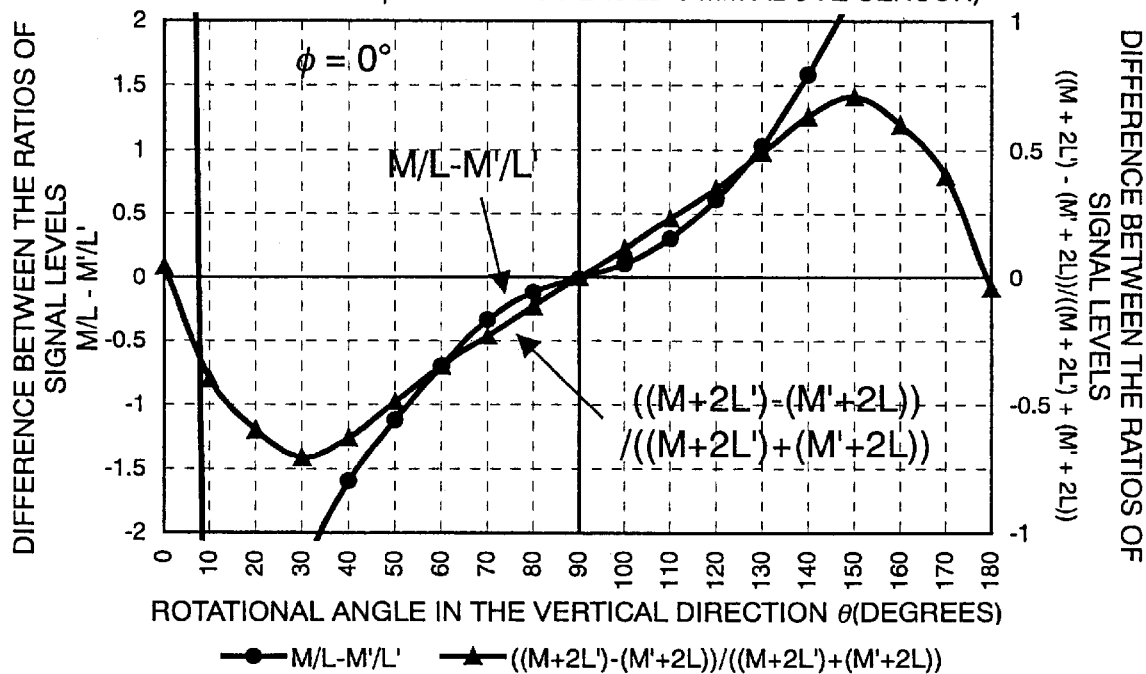
FIG. 70 is a characteristic diagram obtained when the orientation-designating device shown in FIGS. 66A and 66B is used.
Figure 71:
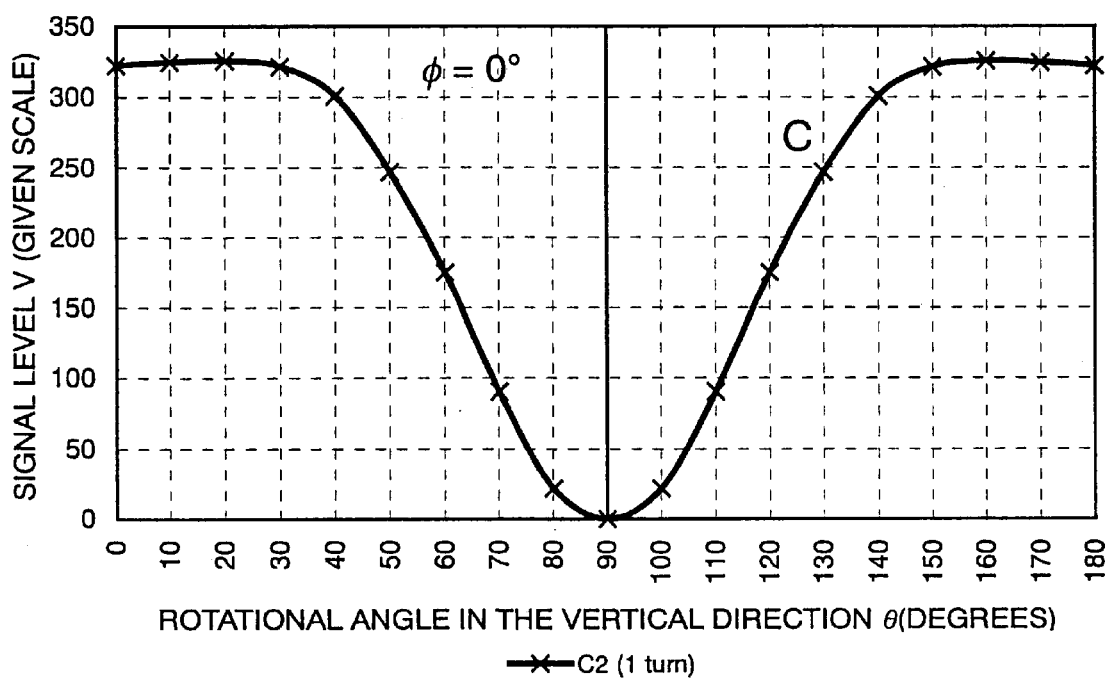
FIG. 71 is a characteristic diagram obtained when the orientation-designating device shown in FIGS. 66A and 66B is used.

FIGS. 66A and 66B illustrate an orientation-designating device 101 according to a ninth embodiment of the present invention. According to this embodiment, three mutually-orthogonal orientation-designating coils 104 (X Coil, Y Coil, and Z Coil) are disposed in the sphere 103. Each orientation-designating coil 104 has a small circular coil disposed close to the center of the sphere 103 and a large circular coil disposed away from the center of the sphere 103. The two coils are connected to form a donut shape so that they are in phase.

FIGS. 67 through 71 illustrate the output characteristics of the orientation-detecting coil obtained when the orientation-designating device 101 shown in FIGS. 66A and 66B is used. The above characteristics are obtained under the conditions that the diameter of the internal small circular coil is 40 mm and the diameter of the external large circular coil is 65 mm, the orientation-designating coils 104 are not eccentric with respect to planes passing through the center of the sphere 103, the frequency of the transmitting/receiving signals is 687.5 kHz, the tilt angle $\theta$ is 60 degrees, the diameter of the sphere 103 is 70 mm, and the bottommost portion of the sphere 103 is placed 5 mm above the surface of the orientation-detecting sensor 102.

Figure 72A:
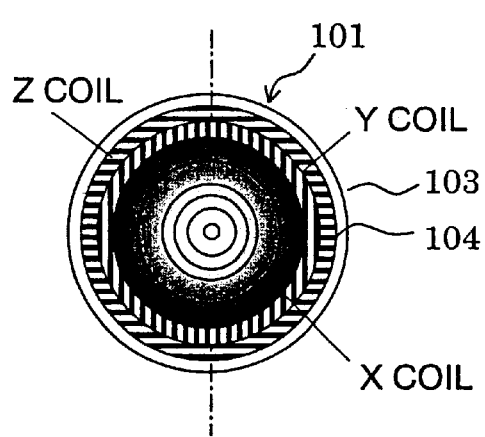
FIGS. 72A and 72B illustrate an orientation-designating apparatus according to a tenth embodiment of the present invention.
Figure 72B:
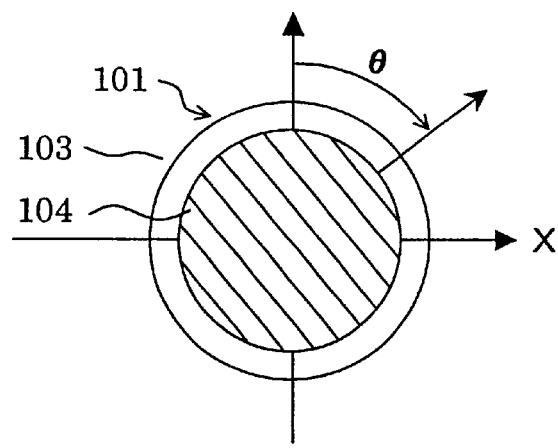
Figure 75:
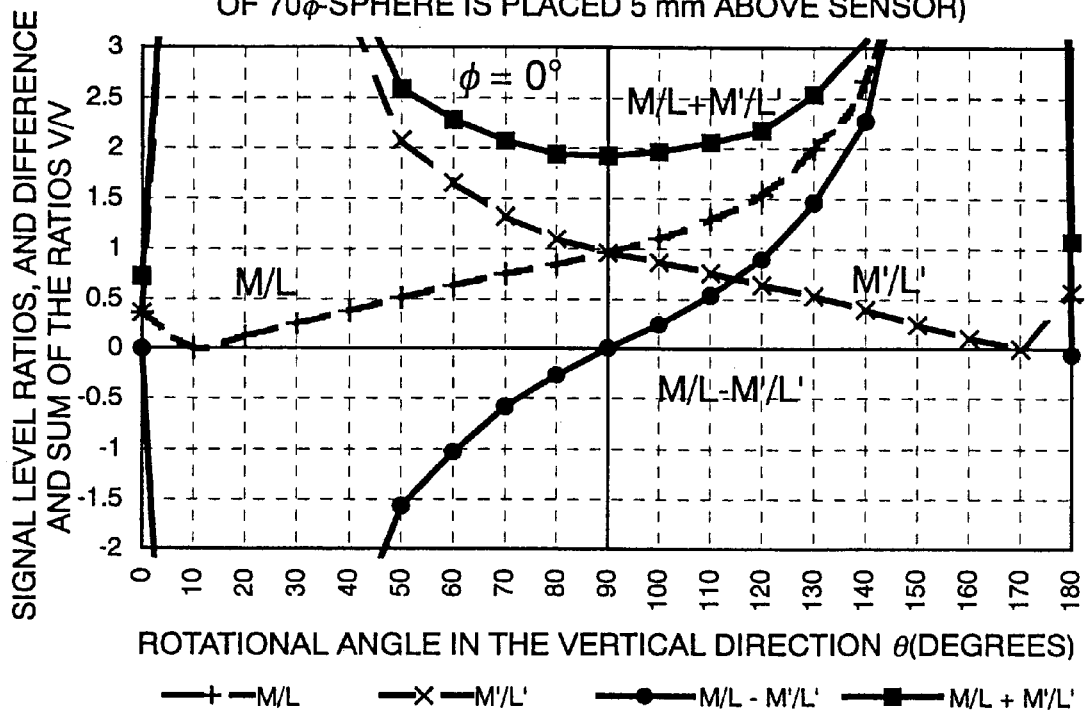
FIG. 75 is a characteristic diagram obtained when the orientation-designating device shown in FIGS. 72A and 72B is used.
Figure 76:
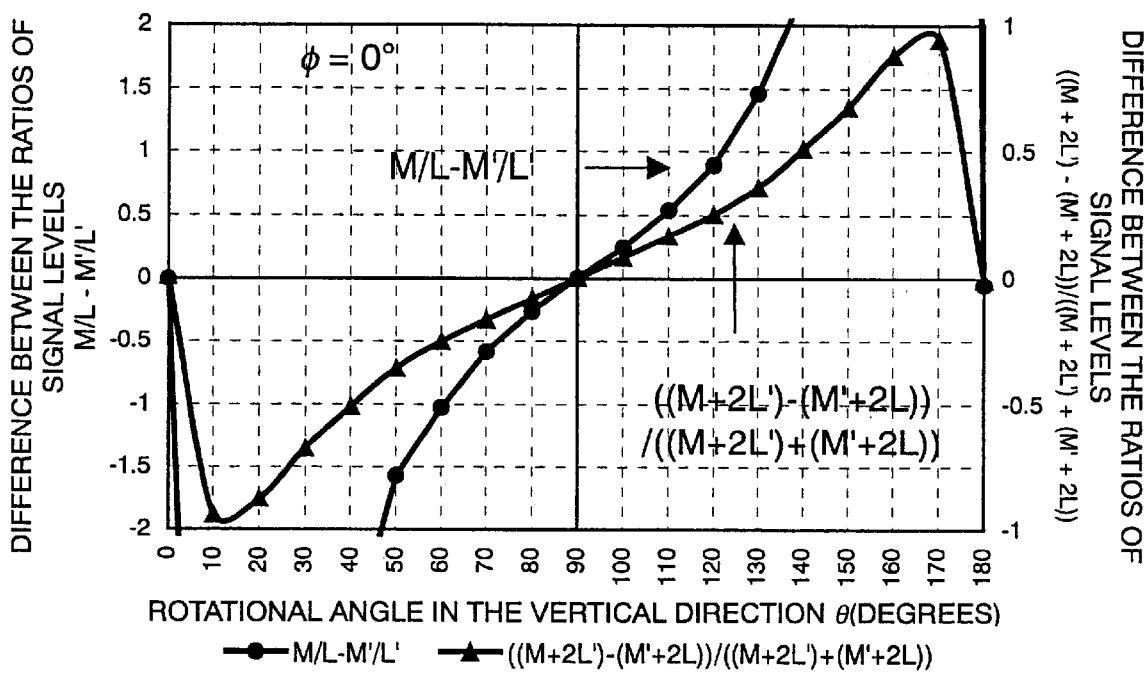
FIG. 76 is a characteristic diagram obtained when the orientation-designating device shown in FIGS. 72A and 72B is used.

FIGS. 72A and 72B illustrate an orientation-designating device 101 according to a tenth embodiment of the present invention. According to this embodiment, three mutually-orthogonal orientation-designating coils 104 (X Coil, Y Coil, and Z Coil) are disposed in the sphere 103. Each orientation-designating coil 104 is wound in a spherical form without disturbing the symmetrical characteristics around the axis, and the wound portions are connected in series. Then, the overall orientation-designating coils 104 are not eccentric with respect to planes passing through the center of the sphere 103.

FIGS. 73 through 77 illustrate the output characteristics of the orientation-detecting coil obtained when the orientation-designating device 101 shown in FIGS. 72A and 72B is used. The above characteristics are obtained under the conditions that the orientation-designating coils 104 are not eccentric with respect to planes passing through the center of the sphere 103, the frequency of the transmitting/receiving signals is 687.5 kHz, the tilt angle $\theta$ is 60 degrees, the diameter of the sphere 103 is 70 mm, and the bottommost portion of the sphere 103 is placed 5 mm above the surface of the orientation-detecting sensor 102. FIGS. 73 through 77 reveal that the sensitivity is improved over an orientation-designating circular coil having the same diameter and the same number of turns. This is because the magnetic characteristics are nonlinear.

Figure 78A:
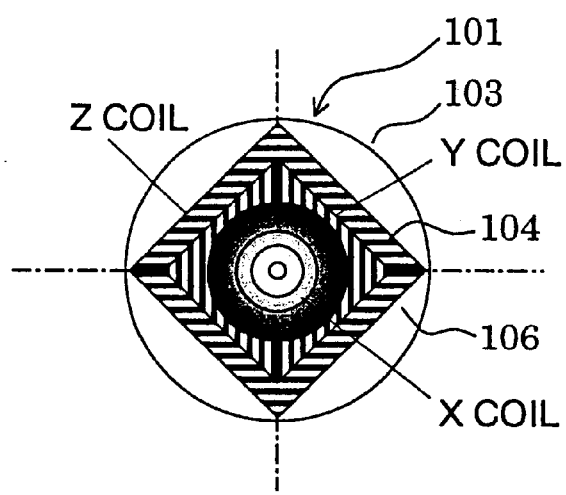
FIGS. 78A and 78B illustrate an orientation-designating device according to an eleventh embodiment of the present invention.
Figure 78B:
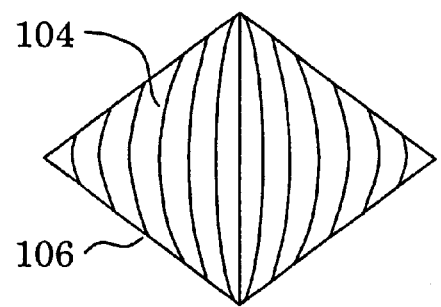

FIGS. 78A and 78B illustrate an orientation-designating coil 104 according to an eleventh embodiment of the present invention. According to this embodiment, three mutually-orthogonal orientation-designating coils 104 (X Coil, Y Coil, and Z Coil) are disposed in the sphere 103. Each orientation-designating coil 104 is configured such that a circular coil is spirally wound around the faces of two circular cones 106 facing each other at bottoms thereof.

Figure 79:
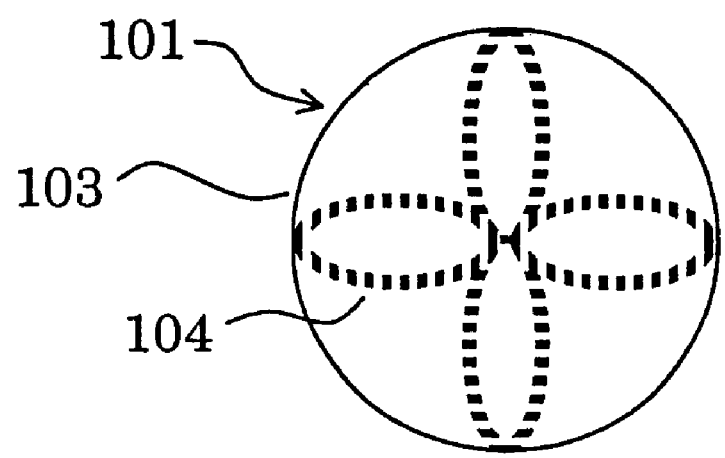
FIG. 79 illustrates an orientation-designating device according to a twelfth embodiment of the present invention.

FIG. 79 illustrates an orientation-designating coil 104 according to a twelfth embodiment of the present invention. According to this embodiment, three mutually-orthogonal orientation-designating coils 104 (X Coil, Y Coil, and Z Coil) are disposed in the sphere 103, and each orientation-designating coil 104 is formed by a four-leaf-clover-shaped coil.

Figure 80:
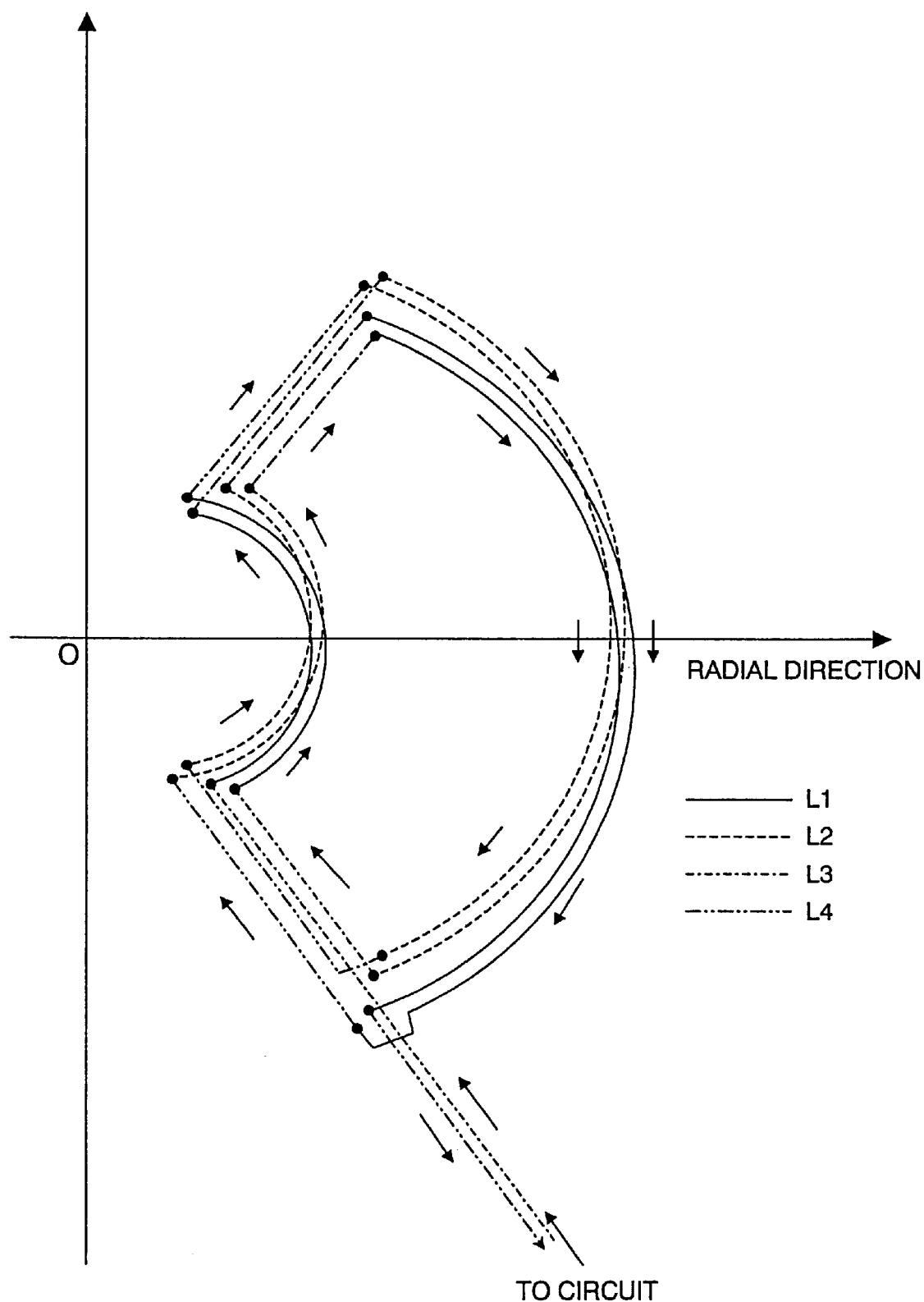
FIG. 80 illustrates a detailed configuration of a sector coil according to an embodiment of the present invention.

FIG. 80 illustrates a detailed configuration of the sector coil shown in FIGS. 3 and 4. Four sector coil elements are overlaid as four layers to form a multi-layered substrate. The four coil elements are averaged to form a single sector coil having an ideal shape. That is, the sector coil elements are formed as different layers L1, L2, L3, and L4 of the multi-layered substrate, thereby forming a single sector coil by connecting the four coil elements, as indicated by the arrows in FIG. 80.

In FIG. 4, the uppermost sector coil elements are shown by the solid line. The four sector coil elements are located with a twist with respect to arcs centered on the center position O, indicated by the dotted lines in FIG. 4. With this arrangement, adjacent orientation-detection coils can be easily positioned, and also, equivalent sector coils are disposed along arcs, thereby enhancing symmetrical characteristics.

Figure 81:
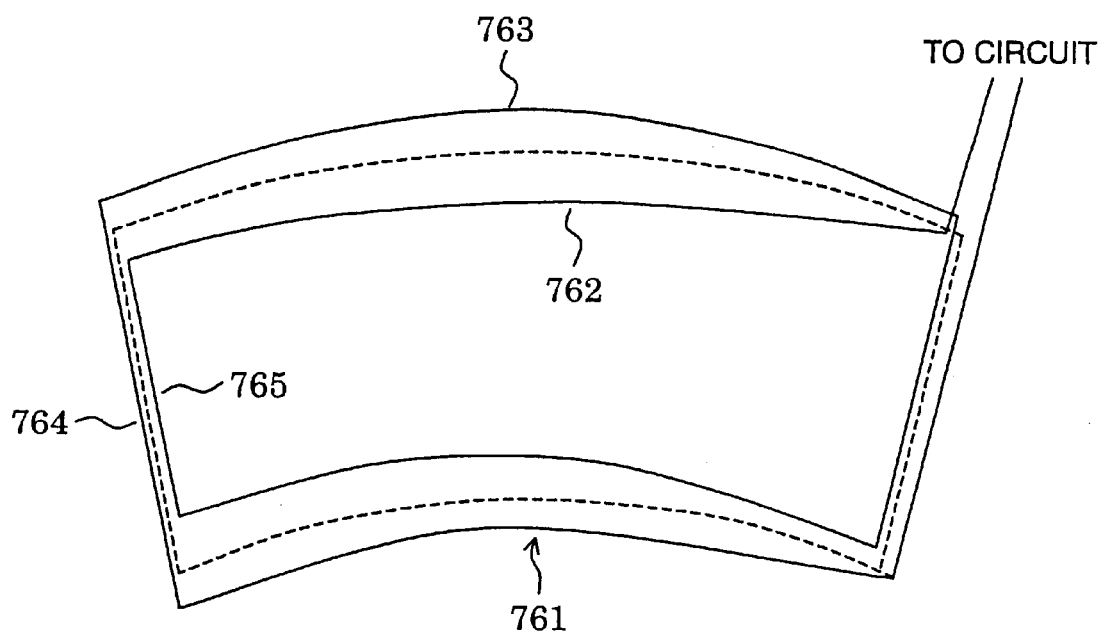
FIG. 81 illustrates a modification made to the sector coil according to the present invention.

FIG. 81 illustrates a modification made to the sector coil. A sector coil 761 is formed of a large sector coil element 763 and a small sector coil element 762, a long linear portion 764 of the large sector coil element 763 and a short linear portion 765 of the small sector coil element 762 facing each other. Thus, by using such a two-layered substrate, the equivalent sector coil 761 can be formed, as a whole.

Figure 82:
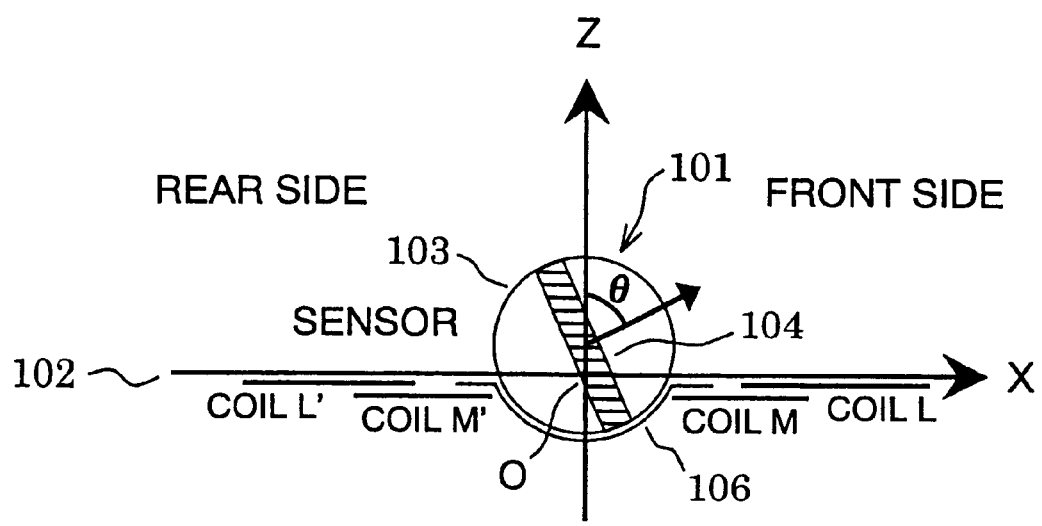
FIG. 82 illustrates a detailed configuration of an orientation-detecting sensor according to an embodiment of the present invention.

FIG. 82 illustrates a detailed configuration of the orientation-detecting sensor 102. In this example, a recessed portion 106 is formed at the center position O so as to receive the orientation-designating device 101. In this case, the bottommost portion of the orientation-designating device 101 is placed below the level of the orientation-detecting sensor 102. However, the recessed portion 106 may be positioned above the orientation-detecting sensor 102 so that the bottommost portion of the orientation-designating device 101 is located above the level of the orientation-detecting sensor 102.

Figure 83:
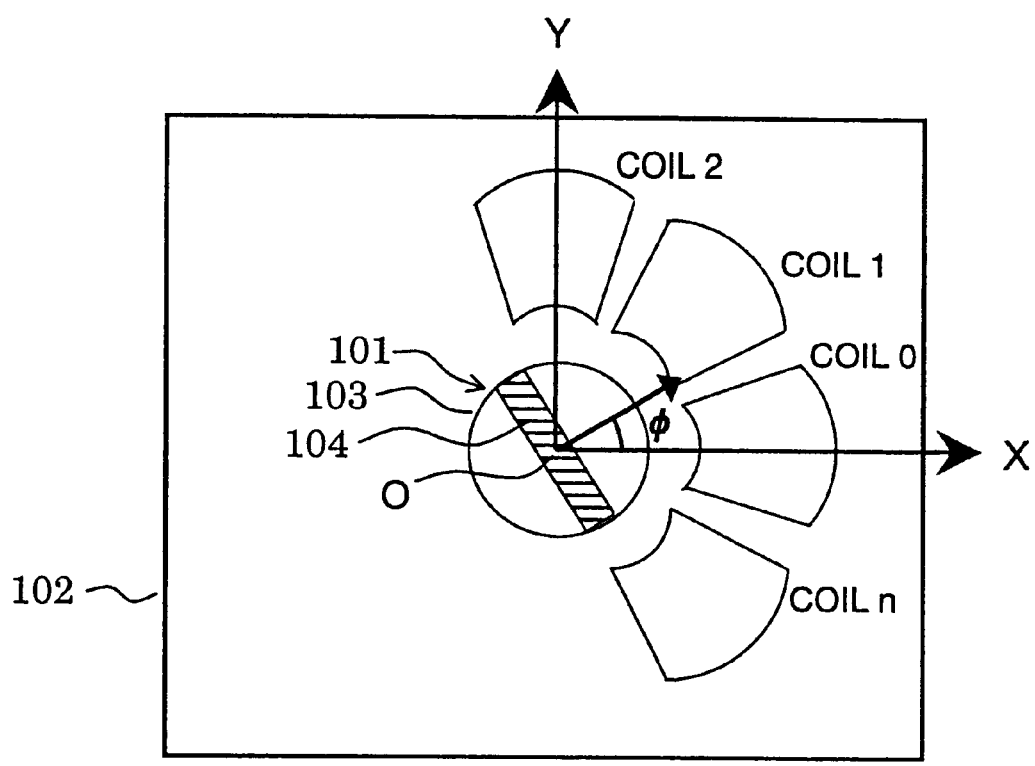
FIG. 83 illustrates a modification made to the orientation-detecting sensor according to the present invention.

FIG. 83 illustrates a modification of the orientation-detecting sensor 102. The sector coils 0 through 2 are radially disposed around the center position O and do not overlap with each other in the direction of the azimuth angle $\phi$. Circular coils and donut-shaped coils are not shown.

Figure 84:
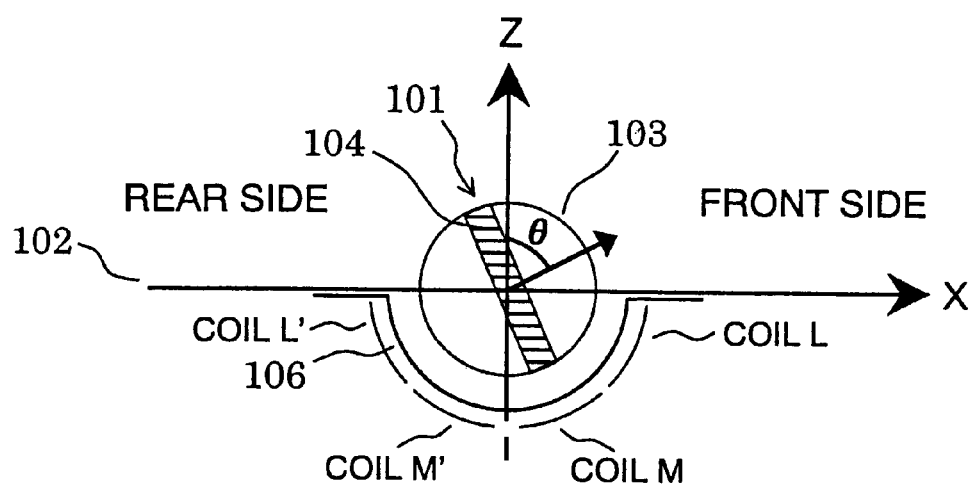
FIG. 84 illustrates another modification made to the orientation-detecting sensor according to the present invention.

FIG. 84 illustrates another modification of the orientation-detecting sensor 102. At least one type of large and small sector coils, circular coils, and donut-shaped coils is disposed in the spherical or polyhedral recessed portion 106, so that the distance from the center of the spherical orientation-designating device 101 to each of the coils disposed in the recessed portion 106 is the same.

In this modification, the recessed portion 106 for receiving the orientation-designating device 101 is formed at the center position O, and the large and small sector coils L, L', M, and M' are disposed in the recessed portion 106. In this case, the circular coils C and the donut-shaped coils D may also be disposed in the recessed portion 106. Alternatively, at least one type of sector coils, circular coils, and donut-shaped coils may be formed in the recessed portion 106.

In the foregoing embodiments, upon receiving a signal generated from a sensor coil of the orientation-detecting device, the orientation-designating device 101 returns a signal to the orientation-detecting device. This signal is received by the same sensor coil as that generated the signal to the orientation-designating device 101. With this arrangement, the orientation of the orientation-designating device 101 is detected by the orientation-detecting device. However, a sensor coil which transmits/generates a signal and a sensor coil which receives a signal from the orientation-designating device 101 may be different.

Alternatively, the orientation-designating coil 104 of the orientation-designating device 101 and the sensor coil of the orientation-detecting device may form an oscillation circuit, in which case, the orientation-detecting device may self-oscillate when sensing the presence of the orientation-designating device 101.

A power supply or a power supply circuit for receiving power from an external source may be provided within the orientation-designating device 101, and a signal-forming circuit for forming a signal to be transmitted and received with the orientation-detecting device may also be provided.

Alternatively, the orientation-designating device 101 may integrate a power supply or a power supply circuit for receiving power from an external source, a signal-forming circuit for forming a signal to be transmitted and received, a transmitting/receiving circuit for the signal formed by the signal-forming circuit, an orientation calculator, and a transmitting circuit for transmitting the orientation calculated by the orientation calculator through wireless transmission, such as infrared rays or electromagnetic waves. Meanwhile, a plurality of coils having planar surfaces or curved surfaces, which each form a resonance circuit, may be disposed on a support portion on which the orientation-designating device 101 is placed. With this configuration, the support portion receives a signal transmitted from the orientation-designating device 101 and returns a signal to the orientation-designating device 101. Then, the transmitting/receiving circuit of the orientation-designating device 101 may receive the signal from the support portion, and the orientation may be calculated by the orientation calculator. The calculated result may then be transmitted to another apparatus, such as a host apparatus, by the transmitting circuit.

Alternatively, the orientation-designating device 101 may integrate a power supply or a power supply circuit for receiving power from an external source, a signal-forming circuit for forming a signal to be transmitted and received, a transmitting/receiving circuit for the signal formed by the signal-forming circuit, a signal processor for processing a received signal into a predetermined transmission format, and a transmitting circuit for transmitting the processed result through wireless transmission, such as infrared rays or electromagnetic waves. Meanwhile, a plurality of coils having planar surfaces or curved surfaces, which each form a resonance circuit, may be disposed on a support portion on which the orientation-designating device 101 is placed. The support portion may also be provided with a calculator for calculating the orientation of the orientation-designating device 101 by receiving the signal from the transmitting circuit.

Alternatively, the orientation-designating device 101 may integrate a power supply or a power supply circuit for receiving power from an external source, a receiver for receiving a signal, a signal processor for processing a received signal into a predetermined transmission format, and a transmitting circuit for transmitting the processed result through wireless transmission, such as infrared rays or electromagnetic waves. Meanwhile, a support portion on which the orientation-designating device 101 is placed may be provided with a plurality of orientation-detecting coils, each forming a resonance circuit, a selection circuit for selectively switching the orientation-detecting coil, a signal-forming circuit for forming a signal to be transmitted and received, and a calculator for calculating the orientation of the orientation-designating device 101 by receiving the signal from the transmitting circuit.

Alternatively, the orientation-designating device 101 may integrate a power supply or a power supply circuit for receiving power from an external source, a receiver for receiving a signal, an orientation calculator, and a transmitting circuit for performing wireless transmission by using, for example, infrared or electromagnetic waves, on the orientation calculated by the orientation calculator. Meanwhile, a support portion on which the orientation-designating device 101 may be provided with a plurality of orientation-detecting coils, which each form a resonance circuit, and a signal-forming circuit. With this arrangement, a signal from the signal-forming circuit may be transmitted to the orientation-designating device 101 while selecting the orientation-detecting coil, and the orientation may be calculated by the orientation-designating device 101 and may be transmitted to another apparatus, such as a host apparatus, by wireless transmission.

If an oscillation circuit is provided for the orientation-designating device 101, the orientation-designating coil 104 may be configured not to form a resonance circuit.

Conversely, if an oscillation circuit is provided for the orientation-detecting device, the orientation-detecting coil may be configured not to form a resonance circuit.

If the orientation-designating coil 104 or the orientation-detecting sensor 102 forms a resonance circuit, it is not essential that a signal to be transmitted and received completely match the resonant frequency of the above-mentioned resonance circuit. A signal which is different from the resonant frequency to such a degree as to substantially obtain the received signal, i.e., the signal related to the resonant frequency, is sufficient.

According to the foregoing embodiments, the orientation-detecting apparatus has the following features.

The orientation-detecting apparatus includes the orientation-designating device 101 having a plurality of (for example, three) orientation-designating coils 104 whose coil planes face in different directions. The orientation-detecting sensor 102 has a plurality of orientation-detecting coils which are radially disposed from the center position O and are electromagnetically coupled to the orientation-designating coils 104. The coil selector 802 selectively switches the orientation-detecting coils. The transmitter 801 transmits and receives signals having a plurality of (for example, three) frequencies between the orientation-designating coil 104 and the selected orientation-detecting coil by electromagnetic coupling therebetween. The signal-receiver 805 receives a signal received by the orientation-detecting coil or the orientation-designating coil 104. The orientation calculator calculates an orientation of the orientation-designating device 101 from the signal received by the signal receiver 805. With this arrangement, the orientation of the orientation-designating device 101 disposed at the center position O is detected.

Each of the orientation-designating coils 104 may form a resonance circuit having a resonant frequency different from the resonant frequencies of the other resonance circuits. The transmitter 801 may form signals having a plurality of frequencies (the same number as that of the orientation-designating coils 104) related to the above-mentioned resonant frequencies.

The orientation-detecting coils may include sector coils. The orientation-detecting coils may include a plurality of pairs of the sector coils L and L' positioned away from the center position O and the sector coils M and M' positioned close to the center position O in the circumferential direction.

Circular coils may further be provided around the center position O. Donut-shaped coils may further be provided around the center position O.

The orientation-designating device 101 may be formed of a sphere 103, and each of the plurality of orientation-designating coils 104 may be disposed in such a manner that it is not eccentric with respect to the center of the sphere 103.

The orientation-designating device 101 may be formed of a sphere 103, and each of the plurality of orientation-designating coils 104 may be disposed in such a manner that it is eccentric with respect to the center of the sphere 103.

The coil selector 802, the transmitter 801, the signal receiver 805, and the orientation calculator 806 may be integrally disposed with the sensor coil 102.

The same orientation-detecting coil may be used for generating and detecting/receiving a wave or signal to and from the orientation-designating coil 104.

Different orientation-detecting coils may be used for generating and detecting/receiving a wave or signal to and from the orientation-designating coil 104.

The transmitter 801, the signal receiver 805, the orientation calculator 806, and a power supply may be disposed within the orientation-designating device 101. A transmitter for transmitting a calculation result obtained by the orientation calculator 806 may be integrated in the orientation-designating device 101.

The transmitter 801 may be disposed within the orientation-designating device 101, thereby detecting the orientation of the orientation-designating device 101 based on the signal received by the orientation-detecting coil.

A plurality of first sector sensors may be disposed away from the center position O, while a plurality of second sector sensors corresponding to the plurality of first sector sensors may be disposed close to the center position O, and a plurality of third sector sensors may be disposed away from the center position O, while a plurality of fourth sector sensors corresponding to the plurality of third sector sensors may be disposed close to the center position O, the third sector sensors and the fourth sector sensors being displaced from the first and second sector sensors, respectively, by 180 degrees in a direction of an azimuth angle. When signals received by the first sector sensors and the second sector sensors are indicated by L and M, respectively, and when signals received by the third sector sensors and the fourth sector sensors are represented by L' and M', respectively, the orientation calculator 806 may calculate the orientation of the orientation-designating device 101 based on the received signals L, M, L', and M'.

The orientation calculator 806 may determine towards which side, a front side or a rear side, the orientation-designating device 101 is directed by utilizing asymmetric characteristics of an expression consisting of the received signals L, M, L', and M'.

The orientation calculator 806 may calculate the orientation of the orientation-designating device 101 by correcting a directly detected orientation of the orientation-designating coil 104 and an indirectly detected orientation of the orientation-designating coil 104 by applying a predetermined weight.

According to the foregoing embodiments, the orientation-detecting method has the following features.

The orientation-designating device 101 is disposed at the center position O of orientation-detecting sensor 102, the orientation-designating device 101 including a plurality of orientation-designating coils 104 whose coil planes face in different directions, the orientation-detecting sensor 102 including a plurality of orientation-detecting coils which are radially disposed from the center position O and are electromagnetically coupled to the orientation-designating coils 104. Electromagnetic wave signals are generated and detected between the orientation-detecting coil selected by the coil selector 802 and the corresponding orientation-designating coil 104 by electromagnetic coupling therebetween. The signal received by the selected orientation-detecting coil or the orientation-designating coil 104 is eventually forwarded to receiver 805. An orientation of the orientation-designating device 101 in three-dimensional space is determined by calculating the orientation of the orientation-designating device 101 by the orientation calculator 806 based on the signal received by the signal receiver 805.

The orientation of the orientation-designating device 101 in three-dimensional space is detected according to values obtained by detecting azimuth angles $\phi$ and tilt angles $\theta$ or direction vectors of the plurality of orientation-designating coils 104.

According to the aforementioned method, each of the orientation-designating coils 104 may form a resonance circuit having a resonant frequency different from the resonant frequencies of the other resonance circuits.

The azimuth angle $\phi$ and the tilt angle $\theta$ or the direction vector of each of the orientation-designating coils 104 of the orientation-designating device 101 may be calculated according to a predetermined expression by using a plurality of signal levels received by the orientation-detecting coils or the orientation-designating coils 104, thereby obtaining orientation information of the orientation-designating device 101 in three-dimensional space according to the calculated values.

The orientation-designating device 101 may be provided with three orientation-designating coils 104. Two of the three orientation-designating coils 104, which allow more precise calculations of the azimuth angle $\phi$ and the tilt angle $\theta$, may be selected by calculating evaluation values according to a predetermined expression by using a plurality of signal levels received by the orientation-detecting coils or the orientation-designating coils 104. The azimuth angle $\phi$ and the tilt angle $\theta$ or the direction vector of the remaining orientation-designating coil 104 may be calculated from the azimuth angles $\phi$ and the tilt angles $\theta$ of the two selected orientation-designating coils 104, thereby obtaining orientation information of the orientation-designating device 101 in three-dimensional space.

The orientation-designating device may be provided with three orientation-designating coils 104. The azimuth angles φ and the tilt angles θ of the three orientation-designating coils 104 may be calculated, and the azimuth angle φ and the tilt angle θ of each of the orientation-designating coils 104 may be re-calculated from the azimuth angles φ and the tilt angles θ of the other two orientation-designating coils 104, and the calculated azimuth angle φ and the tilt angle θ and the recalculated azimuth angle φ and the tilt angle θ may be averaged by a predetermined weight and may be determined to be a new azimuth angle φ and a new tilt angle θ. Based on the new azimuth angle φ and the new tilt angle θ, the orientation of the orientation-designating device 101 may be calculated, thereby obtaining orientation information of the orientation-designating device 101 in three-dimensional space.

The three orientation-designating coils 104 may be disposed orthogonal to each other. The azimuth angles φ and the tilt angles θ of the two orientation-designating coils 104 may be transformed into direction vectors, and a direction vector of the remaining orientation-designating coil may be calculated from a vector product of the direction vectors of the other two orientation-designating coils 104, or the calculated direction vector may be transformed into the azimuth angle φ and the tilt angle θ. Thus, the azimuth angle φ and the tilt angle θ of each of the orientation-designating coils 104 may be calculated from the azimuth angles φ and the tilt angles θ of the other two orientation-designating coils 104.

According to the foregoing embodiments, the orientation-detecting sensor has the following features.

The orientation-detecting sensor is magnetically coupled to a plurality of orientation-designating coils 104, whose coil planes face in different directions, provided for orientation-designating device 101. The orientation-detecting sensor has a plurality of orientation-detecting coils radially disposed from the center position O.

The orientation-detecting coils may include sector coils which are positioned symmetrically to each other with respect to the center position O in the direction of an azimuth angle.

The sector coils may include a plurality of pairs of large and small sector coils disposed from the center position O in radial directions.

The sector coils may be disposed while overlapping with each other in at least one of the direction of the azimuth angle and the radial directions.

Circular coils disposed around the center position O may further be provided.

Donut-shaped coils disposed around the center position O may further be provided.

A recessed portion 106, in which the orientation-designating device 101 is placed, may be provided at the center position O. Each of the coils may be disposed in a planar shape. At least one of the coils may be disposed in a spherical or polyhedral recessed portion 106 in which the orientation-designating device 101 is disposed, so that the distances from the center of the spherical orientation-designating device 101 to the individual coils are equal.

According to the foregoing embodiments, the orientation-designating device 101 has the following features.

The orientation-designating device 101 includes a plurality of orientation-designating coils 104 which are electromagnetically coupled to an orientation-detecting sensor 102 formed of a plurality of orientation-detecting coils. The orientation-designating coils 104 are disposed in such a manner that coil planes of the orientation-designating coils 104 face in different directions.

Each of the plurality of orientation-designating coils 104 may form a resonance circuit having a resonant frequency which is different from resonant frequencies of the other resonance circuits.

The orientation-designating device 101 may be formed of a sphere 103, and each of the orientation-designating coils 104 may be disposed in such a manner that it is not eccentric with respect to the center of the sphere 103.

The orientation-designating device 101 may be formed of a sphere 103, and each of the orientation-designating coils 104 may be disposed in such a manner that it is eccentric with respect to the center of the sphere 103.

A polyhedron 105 may be contained within a sphere 103, and the orientation-designating coils 104 may be disposed on the surfaces of the polyhedron 105.

The orientation-designating coils 104 may be formed by winding coils around a spherical soft ferrite. Alternatively, the orientation-designating coils 104 may be wound in a figure-eight shape. Alternatively, the orientation-designating coils 104 may be wound in a four-leaf-clover shape. The orientation-designating coils 104 may be formed of ferrite coils.

As is seen from the foregoing description, the present invention offers the advantage of detecting orientations of the orientation-designating device in three-dimensional space as absolute values.

What is claimed is:

1. An orientation-detecting apparatus comprising:
   orientation-designating means including a plurality of orientation-designating coils whose coil planes face in different directions;
   orientation-detecting means including a plurality of orientation-detecting coils which are radially disposed from a center position and are electromagnetically coupled to said orientation-designating coils;
   selection means for selectively switching said orientation-detecting coils;
   means for transmitting and receiving signals having a plurality of frequencies between the selected orientation-detecting coil and the corresponding orientation-designating coil by electromagnetic coupling therebetween;
   signal-receiving means for receiving a signal received by one of said orientation-detecting coil and said orientation-designating coil; and
   calculation means for calculating an orientation of said orientation-designating means from the signal received by said signal-receiving means, thereby determining the orientation of said orientation-designating means disposed at the center position.

2. An orientation-detecting apparatus according to claim 1, wherein each of said plurality of orientation-designating coils forms a resonance circuit having a resonant frequency which is different from resonant frequencies of resonance circuits formed by the other orientation-designating coils, and said means for transmitting and receiving transmits signals having a plurality of frequencies related to the resonant frequencies.

3. An orientation-detecting apparatus according to claim 2, wherein said orientation-detecting coils comprise sector coils.

4. An orientation-detecting apparatus according to claim 3, wherein said orientation-detecting coils comprise a plurality of pairs disposed along a circumferential direction, each pair being formed of the sector coil positioned away from the center position and the sector coil positioned close to the center position.

5. An orientation-detecting apparatus according to claim 3, further comprising circular coils disposed around the center position.

6. An orientation-detecting apparatus according claim 4, further comprising donut-shaped coils disposed around the center position.

7. An orientation-detecting apparatus according to claim 1, wherein said orientation-designating means is formed of a sphere, and each of said plurality of orientation-designating coils is disposed in such a manner that it is not eccentric with respect to a center of the sphere.

8. An orientation-detecting apparatus according to claim 1, wherein said orientation-designating means is formed of a sphere, and each of said plurality of orientation-designating coils is disposed in such a manner that it is eccentric with respect to a center of the sphere.

9. An orientation-detecting apparatus according to claim 1, wherein said selection means, said means for transmitting and receiving, said signal-receiving means, and said calculation means are disposed integrally with said orientation-detecting means.

10. An orientation-detecting apparatus according to claim 9, wherein the orientation-detecting coil which receives a signal from said orientation-designating coil is the same coil as the orientation-detecting coil which transmits a signal to said orientation-designating coil.

11. An orientation-detecting apparatus according to claim 9, wherein the orientation-detecting coil which receives a signal from said orientation-designating coil is different from the orientation-detecting coil which transmits a signal to said orientation-designating coil.

12. An orientation-detecting apparatus according to claim 1, wherein said means for transmitting and receiving, said signal-receiving means, said calculation means, and power supply means are disposed within said orientation-designating means, and transmission means for transmitting a calculation result obtained by said calculation means is integrated in said orientation-designating means.

13. An orientation-detecting apparatus according to claim 1, wherein said means for transmitting and receiving is disposed within said orientation-designating means, thereby detecting the orientation of said orientation-designating means based on the signal detected by said orientation-detecting coil.

14. An orientation-detecting apparatus according to claim 1, wherein a plurality of first sector sensors are disposed away from the center position, a plurality of second sector sensors corresponding to said plurality of first sector sensors are disposed close to the center position, a plurality of third sector sensors are disposed away from the center position, and a plurality of fourth sector sensors corresponding to said plurality of third sector sensors are disposed close to the center position, said third sector sensors and said fourth sector sensors being displaced from said first and second sector sensors, respectively, by 180 degrees in a direction of an azimuth angle, and wherein, when signals received by said first sector sensors and said second sector sensors are indicated by L and M, respectively, and when signals received by said third sector sensors and said fourth sector sensors are represented by L' and M', respectively, said calculation means calculates the orientation of said orientation-designating means based on the received signals L, M, L', and M'.

15. An orientation-detecting apparatus according to claim 14, wherein said calculation means determines towards which side, a front side or a rear side, said orientation-designating means is directed by utilizing asymmetric characteristics of an expression consisting of the received signals L, M, L', and M'.

16. An orientation-detecting apparatus according to claim 14 wherein said calculation means calculates the orientation of said orientation-designating means by correcting a directly detected orientation of said orientation-designating coil and an indirectly detected orientation of said orientation-designating coil by applying a predetermined weight.

17. An orientation-detecting method comprising the steps of:

disposing orientation-designating means at a center position of orientation-detecting means, said orientation-designating means including a plurality of orientation-designating coils whose coil planes face in different directions, said orientation-detecting means including a plurality of orientation-detecting coils which are radially disposed from the center position and are electromagnetically coupled to said orientation-designating coils;

transmitting and receiving signals between the orientation-detecting coil selected by selection means and the corresponding orientation-designating coil by electromagnetic coupling therebetween;

receiving a signal received by one of the selected orientation-detecting coil and the orientation-designating coil; and determining an orientation of said orientation-designating means in three-dimensional space by calculating the orientation of the orientation-designating means by calculation means based on at least the signal received in said receiving step;

wherein the orientation of said orientation-designating means in three-dimensional space is determined according to values obtained by detecting azimuth angles $\phi$ and tilt angles $\theta$ or direction vectors of said plurality of orientation-designating coils.

18. An orientation-detecting method according to claim 17, wherein each of said plurality of orientation-designating coils forms a resonance circuit having a resonant frequency which is different from resonant frequencies of resonance circuits formed by the other orientation-designating coils.

19. An orientation-detecting method according to claim 18, wherein the azimuth angle $\phi$ and the tilt angle $\theta$ or the direction vector of each of said orientation-designating coils of said orientation-designating means are calculated according to a predetermined expression by using a plurality of signal levels received by one of said orientation-detecting coils and said orientation-designating coils, thereby obtaining orientation information of said orientation-designating means in three-dimensional space according to the calculated values.

20. An orientation-detecting method according to claim 17, wherein the number of said orientation-designating coils of said orientation-designating means is three, and wherein two of the three orientation-designating coils which allow more precise calculations of the azimuth angle $\phi$ and the tilt angle $\theta$ are selected by calculating evaluation values according to a predetermined expression by using a plurality of signal levels received by said orientation-detecting coils or said orientation-designating coils, and the azimuth angle $\phi$ and the tilt angle $\theta$ or the direction vector of the remaining orientation-designating coil are calculated from the azimuth angles $\phi$ and the tilt angles $\theta$ of the two selected orientation-designating coils, thereby obtaining orientation information of said orientation-designating means in three-dimensional space.

21. An orientation-detecting method according to claim 17, wherein the number of said orientation-designating coils of said orientation-designating means is three, and wherein the azimuth angles $\phi$ and the tilt angles $\theta$ of the three orientation-designating coils are calculated, and the azimuth angle $\phi$ and the tilt angle $\theta$ of each of said orientation-designating coils are re-calculated from the azimuth angles $\phi$ and the tilt angles $\theta$ of the other two orientation-designating coils, and the calculated azimuth angle $\phi$ and the tilt angle $\theta$ and the recalculated azimuth angle $\phi$ and the tilt angle $\theta$ are averaged by a predetermined weight and are determined to be a new azimuth angle $\phi$ and a new tilt angle $\theta$, and, based on the new azimuth angle $\phi$ and the new tilt angle $\theta$, the orientation of said orientation-designating means is calculated, thereby obtaining orientation information of said orientation-designating means in three-dimensional space.

22. An orientation-detecting method according to claim 20, wherein said three orientation-designating coils are disposed orthogonally to each other, and wherein the azimuth angles $\phi$ and the tilt angles $\theta$ of the two orientation-designating coils are transformed into direction vectors, and a direction vector of the remaining orientation-designating coil is calculated from a vector product of the direction vectors of the other two orientation-designating coils, or the calculated direction vector is transformed into the azimuth angle $\phi$ and the tilt angle $\theta$, whereby the azimuth angle $\phi$ and the tilt angle $\theta$ of each of said orientation-designating coils are calculated from the azimuth angles $\phi$ and the tilt angles $\theta$ of the other two orientation-designating coils.

23. An orientation-detecting sensor device which is magnetically coupled to a plurality of orientation-designating coils, whose coil planes face in different directions, provided for orientation-designating means, said orientation-detecting sensor device comprising a plurality of orientation-detecting coils extending in a radially spaced orientation from a center position, said orientation-detecting coils cooperating to detect said orientation-designation coils.

24. An orientation-detecting sensor device according to claim 23, wherein said orientation-detecting coils comprise sector coils which are positioned symmetrically to each other with respect to the center position in a direction of an azimuth angle.

25. An orientation-detecting sensor device according to claim 24, wherein said sector coils comprise a plurality of large and small sector coils disposed from the center position in radial directions.

26. An orientation-detecting sensor device according to claim 24, wherein said sector coils are disposed while overlapping with each other in at least one of the direction of the azimuth angle and the radial directions.

27. An orientation-detecting sensor device according to claim 26, further comprising circular coils disposed around the center position.

28. An orientation-detecting sensor device according to claim 26, further comprising donut-shaped coils disposed around the center position.

29. An orientation-detecting sensor device according to claim 23, wherein a recessed portion, in which said orientation-designating means is placed, is provided at the center position.

30. An orientation-detecting sensor device according to claim 23, wherein each of the coils is disposed in a planar shape.

31. An orientation-detecting sensor device according to claim 23, where in at least one of the coils is disposed in a spherical or polyhedral recessed portion in which said orientation-designating means is disposed, so that distances from a center of the spherical orientation-designating means to the individual coils are equal.

32. An orientation-designating device comprising a plurality of orientation-designating coils which are electromagnetically coupled to an orientation-detecting sensor formed of a plurality of orientation-detecting coils, wherein said plurality of orientation-designating coils are oriented so that coil planes of said orientation-designating coils face in different directions.

33. An orientation-designating device according to claim 32, wherein each of said plurality of orientation-designating coils forms a resonance circuit having a resonant frequency which is different from resonant frequencies of resonance circuits formed by the other orientation-designating coils.

34. An orientation-designating device according to claim 32, wherein said orientation-designating device is formed of a sphere, and each of said orientation-designating coils is disposed in such a manner that it is not eccentric with respect to a center of said sphere.

35. An orientation-designating device according to claim 32, wherein said orientation-designating device is formed of a sphere, and each of said orientation-designating coils is disposed in such a manner that it is eccentric with respect to a center of said sphere.

36. An orientation-designating device according to claim 32, wherein a polyhedron is contained within a sphere, and said orientation-designating coils are disposed on surfaces of the polyhedron.

37. An orientation-designating device according to claim 32, wherein said orientation-designating coils are formed by winding coils around a spherical soft ferrite.

38. An orientation-designating device according to claims 32, wherein said orientation-designating coils are wound in a figure-eight shape.

39. An orientation-designating device according to claim 32, wherein said orientation-designating coils are wound in a four-leaf-clover shape.

40. An orientation-designating device according to claim 33, wherein said orientation-designating coils are formed of ferrite coils.

* * * * *